(12) United States Patent
Kumar et al.

(10) Patent No.: US 7,672,865 B2
(45) Date of Patent: Mar. 2, 2010

(54) METHOD AND APPARATUS FOR RETAIL DATA MINING USING PAIR-WISE CO-OCCURRENCE CONSISTENCY

(75) Inventors: Shailesh Kumar, San Diego, CA (US); Edmond D. Chow, Encinitas, CA (US); Michinari Momma, San Diego, CA (US)

(73) Assignee: Fair Isaac Corporation, Minneapolis, MN (US)

( * ) Notice: Subject to any disclaimer, the term of this patent is extended or adjusted under 35 U.S.C. 154(b) by 1120 days.

(21) Appl. No.: 11/256,386

(22) Filed: Oct. 21, 2005

(65) Prior Publication Data
US 2007/0100680 A1 May 3, 2007

(51) Int. Cl.
*G06F 17/30* (2006.01)
(52) U.S. Cl. .................................................. 705/10
(58) Field of Classification Search .................... 705/10
See application file for complete search history.

(56) References Cited

U.S. PATENT DOCUMENTS

| | | | |
|---|---|---|---|
| 5,832,457 A | | 11/1998 | O'Brien et al. |
| 5,953,707 A | * | 9/1999 | Huang et al. .................. 705/10 |
| 5,991,735 A | | 11/1999 | Gerace |
| 6,307,958 B1 | | 10/2001 | Deaton et al. |
| 6,334,108 B1 | | 12/2001 | Deaton et al. |
| 6,349,290 B1 | | 2/2002 | Horowitz et al. |
| 6,377,935 B1 | | 4/2002 | Deaton et al. |
| 6,424,949 B1 | | 7/2002 | Deaton et al. |
| 6,640,215 B1 | | 10/2003 | Galperin et al. |
| 6,684,195 B1 | | 1/2004 | Deaton et al. |
| 7,047,251 B2 | | 5/2006 | Reed et al. |
| 7,069,197 B1 | * | 6/2006 | Saidane .......................... 703/2 |
| 2002/0069115 A1 | | 6/2002 | Fitzpatrick |
| 2005/0149392 A1 | * | 7/2005 | Gold et al. ..................... 705/14 |

FOREIGN PATENT DOCUMENTS

| | | |
|---|---|---|
| EP | 1 303 822 | 4/2003 |
| WO | WO 02/06983 | 1/2002 |
| WO | WO 02/06984 | 1/2002 |

OTHER PUBLICATIONS

Cumby et al ( Predicting customer shopping lists from point-of-sale purchase data), Dec. 2004, International Conference on Knowledge Discovery and Data Mining, pages.*
Westphal et al (Data Mining Solutions) discloses the concept of using data mining for marketing.*
Bach (Data Mining Applications in Public Organisations), Jun. 2009, 25th It. Conf. Information technology Interfaces, pp. 1-6.*

* cited by examiner

*Primary Examiner*—Romain Jeanty
(74) *Attorney, Agent, or Firm*—Mintz, Levin, Cohn, Ferris, Glovsky and Popeo, P.C.

(57) ABSTRACT

The invention, referred to herein as PeaCoCk, uses a unique blend of technologies from statistics, information theory, and graph theory to quantify and discover patterns in relationships between entities, such as products and customers, as evidenced by purchase behavior. In contrast to traditional purchase-frequency based market basket analysis techniques, such as association rules which mostly generate obvious and spurious associations, PeaCoCk employs information-theoretic notions of consistency and similarity, which allows robust statistical analysis of the true, statistically significant, and logical associations between products. Therefore, PeaCoCk lends itself to reliable, robust predictive analytics based on purchase-behavior.

34 Claims, 11 Drawing Sheets

METHOD AND APPARATUS FOR RETAIL DATA MINING USING PAIR-WISE CO-OCCURRENCE CONSISTENCY

BACKGROUND OF THE INVENTION

1. Technical Field

The invention relates to data mining. More particularly, the invention relates to a method and apparatus for retail data mining using pair-wise co-occurrence consistency.

2. Description of the Prior Art

Retail leaders recognize today that the greatest opportunity for innovation lies at the interface between the store and the customer. The retailer owns vital marketing information on the purchases of millions of customers: information that can be used to transform the store from a fancy warehouse where the customer is a mere stock picker into a destination where customers go because of the value the store gives them. The opportunity is enormous: seventy to eighty percent of buying choices are made at the point of purchase, and smart retailers can influence the choices to maximize economic value and customer satisfaction. Because the retailer is closest to the consumer, he has the unique opportunity and power to create loyalty, encourage repeat purchase behavior and establish high value purchase career paths. However, to optimize the customer interface in this fashion, retailers must be extremely sophisticated with analysis of their purchase data. The sheer volume of purchase data, while offering unprecedented opportunities for such customer centric retailing, also challenges the traditional statistical and mathematical techniques at the retailer's disposal. Retail data analysts frequently find it difficult, if not impossible, to derive concrete, actionable decisions from such data. Most traditional retailers use only limited OLAP capabilities to slice and dice the transaction data to extract basic statistical reports and use them and other domain knowledge to make marketing decisions. Only in the last few years have traditional retailers started warming up to segmentation, product affinity analysis, and recommendation engine technologies to make business decisions. Traditional computational frameworks, such as classification and regression, seek optimal mappings between a set of input features that either cause or correlate-with a target variable. It would be advantageous to provide improved approaches to retail data mining.

SUMMARY OF THE INVENTION

The herein disclosed Pair-wise Co-occurrence Consistency Co-occurrence (PeaCoCk) framework seeks patterns of interest in pair-wise relationships between entities. Such a framework may be applied in a wide variety of domains with unstructured or hyper-structured data, for example in language understanding and text mining (syntactic and semantic relationships between words, phrases, named entities, sentences, and documents), bioinformatics (structural, functional, and co-occurrence relationships between nucleotides in gene sequences, proteins in amino acid sequences, and genes in gene expression experiments), image understanding and computer vision (spatial co-occurrence relationships of pixels, edges, and objects in images), transaction data analytics (consistent co-occurrence relationships between events), and retail data analytics (co-occurrence consistency relationships between products and similarity relationships between customers). The preferred embodiment of the invention disclosed herein applies the PeaCoCk framework to Retail Data Mining, i.e. finding insights and creating decisions from retail transaction data that is being collected by almost all large retailers for over a decade.

Data driven, customer-centric analyses, enabled by the herein disclosed novel data mining methodologies, are expected to open up fundamentally novel opportunities for retailers to dramatically improve customer experience, loyalty, profit margins, and customer lifetime value. The PeaCoCk retail mining framework enables mass retailers to capitalize on such opportunities. Using PeaCoCk, retailers can analyze very large scale purchase transaction data and generate targeted customer-centric marketing decisions with exceptionally high economic value. The invention provides a method and apparatus that discovers consistent relationships in massive amounts of purchase data, bringing forth product relationships based on purchase-behavior, both in market baskets and across time. It helps retailers identify opportunities for creating an efficient alignment of customer intent and store content using purchase data. This helps customers find the products they want, and be offered the products they need. It helps segment customers and products based on purchase behavior to create a differentiated customer experience and generate recommendations tailored to each customer and each store. It helps retailers analyze purchase career paths that lend themselves to generating accurate cross-sell and up-sell recommendations and targeted promotions. It helps determine bridge products that can influence future purchase sequences and help move a customer's purchase career path from one category to another higher value category. Finally it can be used to generate valuable in-the-field analyses of product purchase affinities that retailers can offer for sale to manufacturers and distributors as information products. Thus, an agile organization can harness PeaCoCk to completely redefine the retail enterprise as customer-centric, information driven business that in addition, manufactures its own value-added information products.

DETAILED DESCRIPTION OF THE INVENTION

Figure 1:
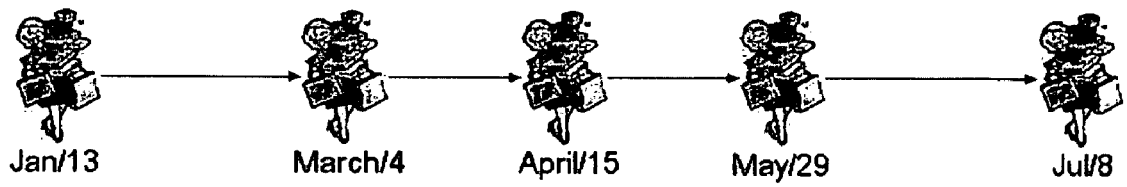
FIG. 1 shows retail transaction data as a time stamped sequence of market baskets.

The invention, referred to herein as PeaCoCk, uses a unique blend of technologies from statistics, information theory, and graph theory to quantify and discover patterns in relationships between entities, such as products and customers, as evidenced by purchase behavior. In contrast to traditional purchase-frequency based market basket analysis techniques, such as association rules which mostly generate obvious and spurious associations, PeaCoCk employs information-theoretic notions of consistency and similarity, which allows robust statistical analysis of the true, statistically significant, and logical associations between products. Therefore, PeaCoCk lends itself to reliable, robust predictive analytics based on purchase-behavior.

The invention is also unique in that it allows such product associations to be analyzed in various contexts, e.g. within individual market baskets, or in the context of a next visit market basket, or across all purchases in an interval of time, so that different kinds of purchase behavior associated with different types of products and different types of customer segments can be revealed. Therefore, accurate customer-centric and product-centric decisions can be made. PeaCoCk analysis can be scaled to very large volumes of data, and is capable of analyzing millions of products and billions of transactions. It is interpretable and develops a graphical network structure that reveals the product associations and provides insight into the decisions generated by the analysis. It also enables a real-time customer-specific recommendation engine that can use a customer's past purchase behavior and current market basket to develop accurate, timely, and very effective cross-sell and up-sell offers.

The PeaCoCk Framework

Traditional modeling frameworks in statistical pattern recognition and machine learning, such as classification and regression, seek optimal causal or correlation based mapping from a set of input features to one or more target values. The systems (input-output) approach suits a large number of decision analytics problems, such as fraud prediction and credit scoring. The transactional data in these domains is typically collected in, or converted to, a structured format with fixed number of observed and/or derived input features from which to choose. There are a number of data and modeling domains, such as language understanding, image understanding, bioinformatics, web cow-path analysis etc., in which either (a) the data are not available in such a structured format or (b) we do not seek input-output mappings, where a new computational framework might be more appropriate. To handle the data and modeling complexity in such domains, the inventors have developed a semi-supervised insight discovery and data-driven decision analytics framework, known as Pair-wise Co-occurrence Consistency or PeaCoCk that:

Seeks Pair-wise relationships between large numbers of entities,

In a variety of domain specific contexts,

From appropriately filtered and customized transaction data,

To discover insights in the form of relationship patterns of interest,

That may be projected (or scored) on individual or groups of transactions or customers, And to make data-driven-decisions for a variety of business goals.

Each of the highlighted terms has a very specific meaning as it applies to different domains. Before describing these concepts as they apply to the retail domain, consider the details of the retail process and the retail data abstraction based on customer purchases.

Retail Transaction Data

At a high level, the retail process may be summarized as Customers buying products at retailers in successive visits, each visit resulting in the transaction of a set of one or more products (market basket). In its fundamental abstraction, as used in the PeaCoCk framework, the retail transaction data is treated as a time stamped sequence of market baskets, as shown in FIG. 1.

Transaction data are a mixture of two types of interspersed customer purchases:

(1) Logical/Intentional purchases (Signal): Largely, customers tend to buy what they need/want and when they need/want them. These may be called intentional purchases, and may be considered the logical or signal part of the transaction data as there is a predictable pattern in the intentional purchases of a customer.

(2) Emotional/Impulsive purchases (Desirable Noise)—In case of most customers, the logical intentional purchase may be interspersed with emotion driven impulsive purchases. These appear to be unplanned and illogical compared to the intentional purchases. Retailers deliberately encourage such impulsive purchases through promotions, product placements, and other incentives because it increases their sales. But from an analytical and data perspective, impulsive purchases add noise, to the intentional purchase patterns of customers. This makes the problem of finding logical patterns associated with intentional purchases more challenging.

Key Challenges in Retail Data Analysis

Based on this abstraction of the transaction data that they are a mixture of both intentional and impulsive purchases, there are three key data mining challenges:

(a) Separating Intentional (Signal) from Impulsive (Noise) purchases: As in any other data mining problem, it is important to first separate the wheat from the chaff or signal from the noise. Therefore, the first challenge is to identify the purchase patterns embedded in the transaction data that are associated with intentional behaviors.

(b) Complexity of Intentional behavior: The intentional purchase part of the transaction data is not trivial. It is essentially a mixture of projections of (potentially time-elapsed) latent purchase intentions. In other words:

(i) a customer purchases a particular product at a certain time in a certain store with a certain intention, e.g. weekly grocery, back-to-school, etc.
(ii) Each visit by a customer to the store may reflect one or more (mixture of) intention(s).
(iii) Each intention is latent, i.e. they are not obvious or announced although they may be deduced from the context of the products purchased.
(iv) Each intention may involve purchase of one or more products. For a multi-product intention, it is possible that the customer may not purchase all the products associated with that intention either at the same store or in the same visit. Hence, the transaction data only reflects a subset or a projection of a latent intention for several reasons: Maybe the customer already has some products associated with the intention, or he got them as a gift, or he purchased them at a different store, etc.
(v) Finally, an intention may be spread across time. For example, an intention such as garage re-modeling or setting up a home office may take several weeks and multiple visits to different stores.

Finding patterns in transaction data with noisy (due to impulsive), incomplete (projections of intentions), overlapping (mixture of intentions), and indirect (latent intentions) underlying drivers presents a unique set of challenges.

(c) Matching the right impulses to the right intentions

As mentioned above, the customer's impulsive behavior is desirable for the retailer. Therefore instead of ignoring the noise associated with it, the retailers might be interested in finding patterns associating the right kind of impulsive buying purchases with specific intentional purchases.

Overview

In the following discussion, a high level overview of the PeaCoCk framework is given. The terminology used to define the PeaCoCk framework is described. The PeaCoCk process and benefits of the PeaCoCk framework are also provided.

Entities in Retail Domain

In the retail domain, there are a number of entity-types: Products, Customers, Customer segments, Stores, Regions Channels, Web pages, Offers, etc. PeaCoCk primarily focuses on two main entity types: Products and Customers.

Products are goods and services sold by a retailer. We refer to the set of all products and their associated attributes including hierarchies, descriptions, properties, etc. by an abstraction called the product space. A typical product space exhibits the following four characteristics:

Large—A typical retailer has thousands to hundreds of thousands of products for sale.
Heterogeneous—Products in a number of different areas might be sold by the retailer.
Dynamic—New products are added and old products removed frequently.
Multi-Resolution—Products are organized in a product hierarchy for tractability The set of all customers that have shopped in the past forms the retailer's customer base. Some retailers can identify their customers either through their credit cards or retailer membership card. However, most retailers lack this ability because customers are using either cash or they do not want to participate in a formal membership program. Apart from their transaction history, the retailer might also have additional information on customers, such as their demographics, survey responses, market segments, life stage, etc. The set of all customers, their possible organization in various segments, and all additional information known about the customers comprise the customer space. Similar to a product space, a typical customer space exhibits the following four characteristics:

Large—A customer base might have hundreds of thousands to millions of customers.
Heterogeneous—Customers are from various demographics, regions, life styles/stages.
Dynamic—Customers are changing over time as they go through different life stages.
Multi-Resolution—Customers may be organized by household, various segmentations.

Relationships in Retail Domain

There are different types of relationships in the retail domain. The three main types of relationships considered by PeaCoCk are:
1. First order, explicit purchase-relationships between customers and products, i.e. who purchased what, when, for how much, and how (channel, payment type, etc.)?
2. Second order, implicit consistency-relationships between two products, i.e. how consistently are two products co-purchased in a given context?
3. Second order, implicit similarity-relationships between two customers, i.e. how similar are the purchase behaviors exhibited by two customers?

While the purchase relationships are explicit in the transaction data, the PeaCoCk framework is used primarily to infer the implicit product-product consistency relationships and customer-customer similarity relationships. To do this, PeaCoCk views products in terms of customers and views customers in terms of products.

PeaCoCk Graphs

The most natural representation of pair-wise relationships between entities abstraction is a structure called Graph. Formally, a graph contains
    a set of Nodes representing entities (products or customers); and
    a set of Edges representing strength of relationships between pairs of nodes (entities).

Figure 2:
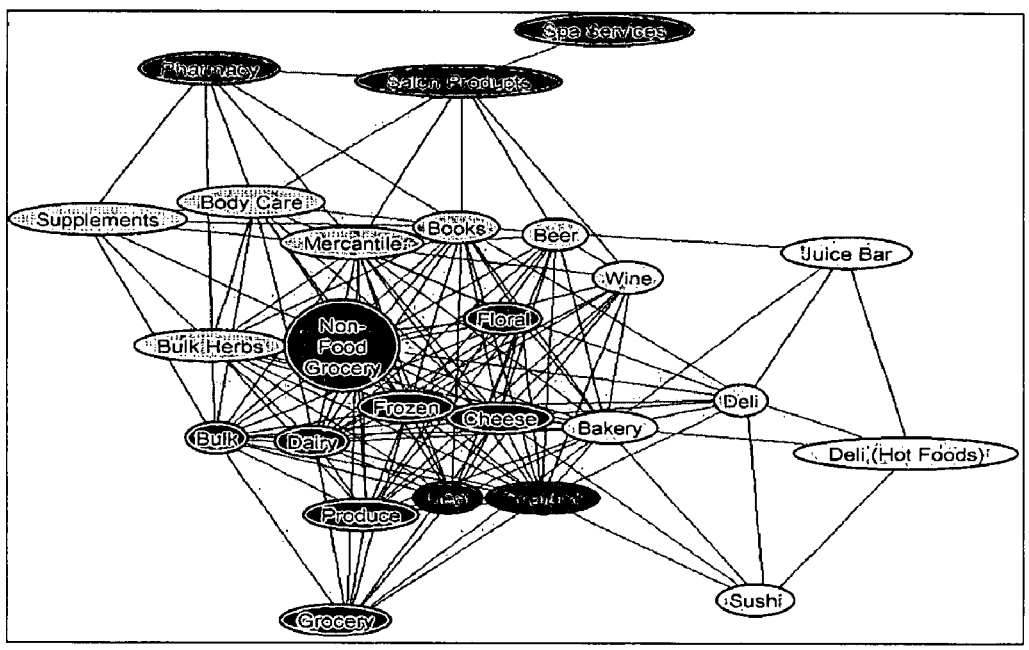
FIG. 2 shows an example of a PeaCoCk consistency graph for a grocery retailer, in which nodes represent products and edges represent consistency relationships between pairs of nodes.

FIG. 2 shows an example of a PeaCoCk Consistency Graph created using the transaction data from a Grocery retailer. In FIG. 2, nodes represent products and edges represent consistency relationships between pairs of nodes. This graph has one node for each product at a category level of the product hierarchy. These nodes are further annotated or colored by department level. In general, these nodes could be annotated by a number of product properties, such as total revenue, margin per customers, etc. There is a weighted edge between each pair of nodes. The weight represents the consistency with which the products in those categories are purchased together. Edges with weights below a certain threshold are ignored. For visualization purposes, the graph is projected on a two-dimensional plane, such that edges with high weights are shorter or, in other words, two nodes that have higher consistency strength between them are closer to each other than two nodes that have lower consistency strength between them.

PeaCoCk graphs are the internal representation of the pair-wise relationships between entities abstraction. There are three parameters that define a PeaCoCk Graph.
1. Customization defines the scope of the PeaCoCk graph by identifying the transaction data slice (customers and transactions) used to build the graph. For example, one might be interested in analyzing a particular customer segment or a particular region or a particular season or any combination of the three. Various types of customizations that are supported in PeaCoCk are described below.

2. Context defines the nature of the relationships between products (and customers) in the PeaCoCk graphs. For example, one might be interested in analyzing relationships between two products that are purchased together or within two weeks of each other, or where one product is purchased three months after the other, and so on. As described below, PeaCoCk supports both market basket contexts and purchase sequence contexts.

3. Consistency defines the strength of the relationships between products in the product graphs. There are a number of consistency measures based on information theory and statistics that are supported in the PeaCoCk analysis. Different measures have different biases. These are discussed further below.

Insight-Structures in PeaCoCk Graphs

As mentioned above, the PeaCoCk graphs may be mined to find insights or actionable patterns in the graph structure that may be used to create marketing decisions. These insights are typically derived from various structures embedded in the PeaCoCk graphs. The five main types of structures in a PeaCoCk graph that are explored are:

(1) Sub-graphs—A sub-graph is a subset of the graph created by picking a subset of the nodes and edges from the original graph. There are a number of ways of creating a sub-graph from a PeaCoCk graph. These may be grouped into two types:

Node based Sub-graphs are created by selecting a subset of the nodes and therefore, by definition, keeping only the edges between selected nodes. For example, in a product graph, one might be interested in analyzing sub-graph of all products within the electronics department or clothing merchandise, or only the top 10% high value products, or products from a particular manufacturer, etc. Similarly, in a customer graph, one might be interested in analyzing customers in a certain segment, or high value customers, or most recent customers, etc.

Edge based Sub-graphs are created by pruning a set of edges from the graph and therefore, by definition, removing all nodes that are rendered disconnected from the graph. For example, one might be interested in removing low consistency strength edges (to remove noise), and/or high consistency strength edges (to remove obvious connections), or edges with a support less than a threshold, etc.

Figure 3:
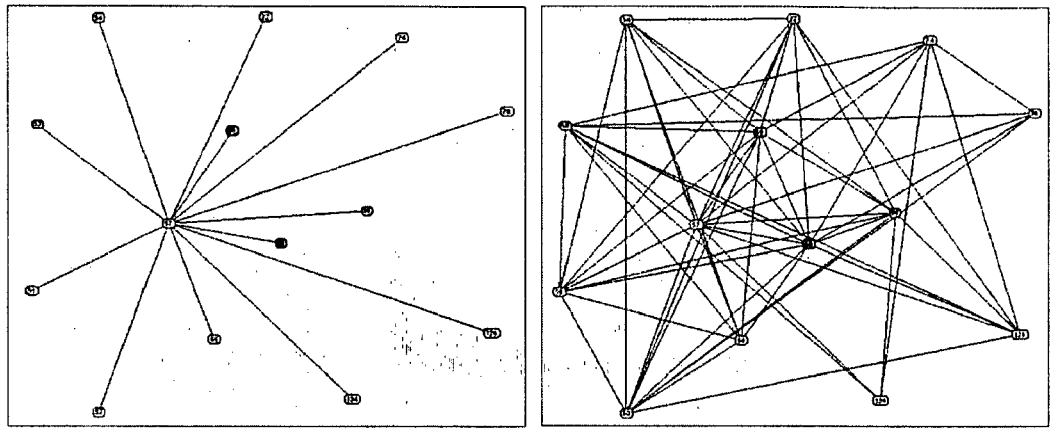
FIG. 3 shows a product neighborhood, in which a set of products is shown with non-zero consistency with the target product, where the left figure is shown without cross edges and the right figure is shown with a cross edge.

(2) Neighborhoods—A neighborhood of a target product in a PeaCoCk graph is a special sub-graph that contains the target product and all the products that are connected to the target product with consistency strength above a threshold. This insight structure shows the top most affiliated products for a given target product. Decisions about product placement, store signage, etc. can be made from such structures. A neighborhood structure may be seen with or without cross edges as shown in FIG. 3, which shows a Product Neighborhood having a set of products with non-zero consistency with the target product. In FIG. 3, the left figure is without cross edges and the right figure is with cross edges. A cross-edge in a neighborhood structure is defined as an edge between any pair of neighbors of the target product. More details on product neighborhoods are given below.

(3) Product Bundles—A bundle structure in a PeaCoCk graph is defined as a sub-set of products such that each product in the bundle has a high consistency connection with all the other products in the bundle. In other words, a bundle is a highly cohesive soft clique in a PeaCoCk graph. The standard market basket analysis tools seek to find Item-Sets with high support (frequency of occurrence). PeaCoCk product bundles are analogous to these item-sets, but they are created using a very different process and are based on a very different criterion known as bundleness that quantifies the cohesiveness of the bundle. The characterization of a bundle and the process involved in creating a product bundle exemplify the novel generalization that is obtained through the pair-wise relationships and is part of a suite of propriety algorithms that seek to discover higher order structures from pair-wise relationships.

Figure 4:
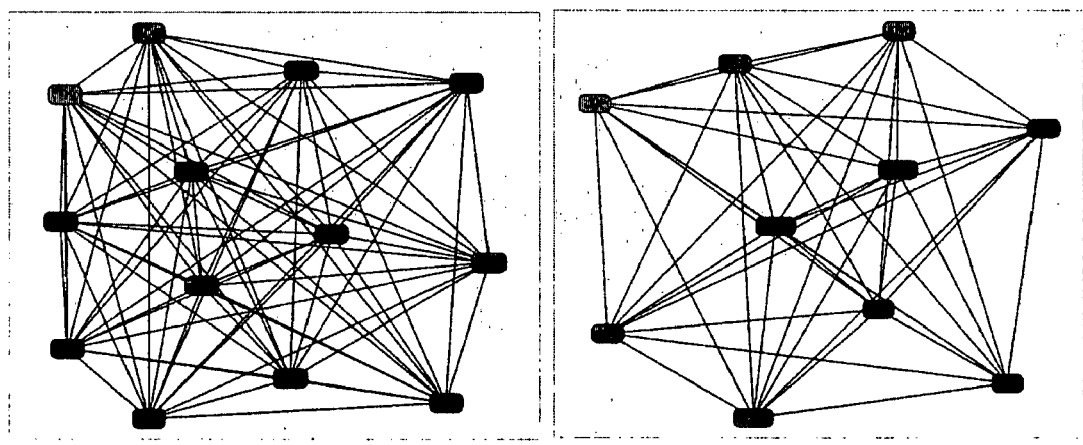
FIG. 4 shows a bridge structure in which two or more product groups are connected by a bridge product.

FIG. 4 shows two examples of product bundles. Each product in a bundle is assigned a product density with respect to the bundle. FIG. 4 shows a cohesive soft clique where each product is connected to all others in the bundle. Each product is assigned a density measure which is high if the product has high consistency connection with others in the bundle and low otherwise. Bundle structures may be used to create co-promotion campaigns, catalog and web design, cross-sell decisions, and analyze different customer behaviors across different contexts. More details on product bundles are given below.

(4) Bridge Structures—The notion of a bridge structure is inspired from that of polyseme in language where a word might have more than one meaning (or belongs to more than one semantic family). For example, the word 'can' may belong to the semantic family {'can', 'could', 'would' . . . } or {'can', 'bottle', 'canister' . . . }. In retail, a bridge structure embedded in the PeaCoCk graph is a collection of two or more, otherwise disconnected, product groups (product bundle or an individual product) that are bridged by one or more bridge product(s). For example, a wrist-watch may be a bridge product between electronics and jewelry groups of products. A bridge pattern may be used to drive cross department traffic and diversify a customer's market basket through strategic promotion and placement of products. More details on bridge structures are given below.

(5) Product Phrases—A product phrase is a product bundle across time, i.e. it is a sequence of products purchased consistently across time. For example, a PC purchase followed by a printer purchase in a month, followed by a cartridge purchase in three months is a product phrase. A product bundle is a special type of product phrase where the time-lag between successive products is zero. Consistent product phrases may be used to forecast customer purchases based on their past purchases to recommend the right product at the right time. More details about product phrases is given below.

Logical vs. Actual Structures

All the structures discussed above are created by (1) defining a template-pattern for the structure and (2) efficiently searching for those patterns in the PeaCoCk graphs. One of the fundamental differences between PeaCoCk and conventional approaches is that PeaCoCk seeks logical structures in PeaCoCk graphs while conventional approaches, such as frequent item-set mining, seek actual structures directly in transaction data.

Figure 6:
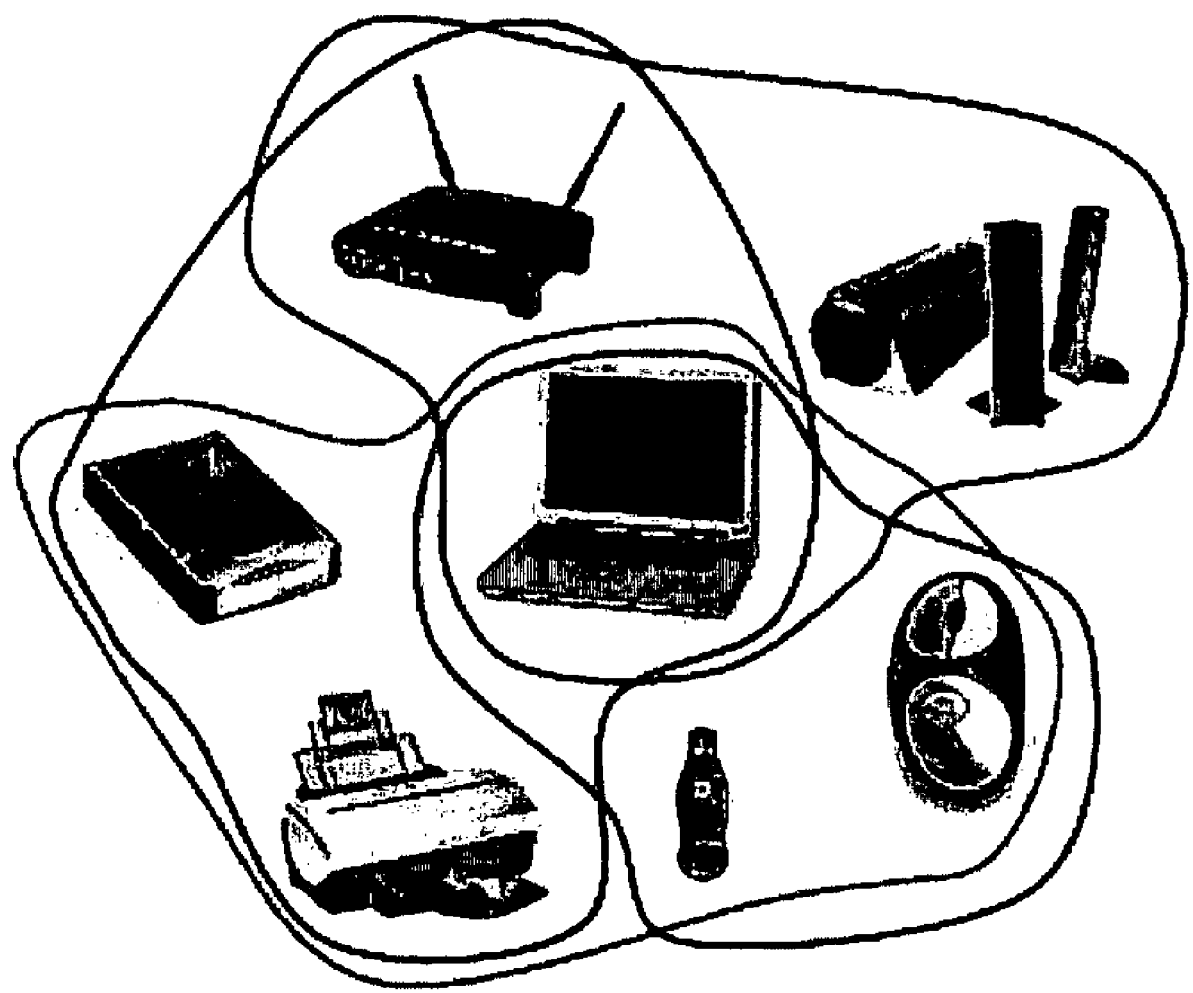
FIG. 6 shows data pre-processing, which involves both data filtering (at customer, transaction, line item, and product levels) and customization (at customer and transaction levels)

Consider, for example, a product bundle or an item-set shown in FIG. 6 with seven products. For the prior art to discover it, a large number of customers must have bought the entire item-set or, in other words, the support for the entire item-set should be sufficiently high. The reality of transaction data, however, is that customers buy projections or subsets of such logical bundles/item-sets. In the example of FIG. 6, it is possible that not a single customer bought all these products in a single market basket and, hence, the entire logical bundle never exists in the transaction data (has a support of zero) and is therefore not discovered by standard item-set mining techniques. In reality, customers only buy projections of the logical bundles. For example, some customers might buy a subset of three out of seven products, another set of customers might buy some other subset of five out of seven products, and it is possible that there is not even a single customer who bought all the seven products. There could be several reasons for this: May be they already have the other products, or they bought the remaining products in a different store or at a different time, or they got the other products as gifts, and so on.

The limitation of the transaction data that they do not contain entire logical bundles throws a set of unique challenges for retail data mining in general, and item-set mining in particular. PeaCoCk addresses this problem in a novel way. First, it uses these projections of the logical bundles by projecting them further down to their atomic pair-wise levels and strengthens only these relationships between all pairs within the actual market basket. Secondly, when the PeaCoCk graphs are ready, PeaCoCk discards the transaction data and tries to find these structures in these graphs directly. So even if edges between products A and B are strengthened because of a different set of customers, between A and C by another set of customers and between B and C by a third set of customers (because they all bought different projections of the logical bundle {A, B, C}), still the high connection strengths between A-B, B-C, and A-C result in the emergence of the logical bundle {A, B, C} in the PeaCoCk graph. Thus, the two stage process of first creating the atomic pair-wise relationships between products and then creating higher order structures from them gives PeaCoCk a tremendous generalization capability that is not present in any retail mining framework. The same argument applies to other higher order structures such as bridges and phrases as well. This provides PeaCoCk a unique ability to find very interesting, novel, and actionable logical structures (bundles, phrases, bridges, etc.) that cannot be found otherwise.

The PeaCoCk Retail Mining Process

There are three stages in the PeaCoCk retail mining process for extracting actionable insights and data-driven decisions from this transaction data:

(1) Data Pre-processing—In this stage, the raw transaction data are (a) filtered and (b) customized for the next stage. Filtering cleans the data by removing the data elements (customers, transactions, line-items, and products) that are to be excluded from the analysis. Customization creates different slices of the filtered transaction data that may be analyzed separately and whose results may be compared for further insight generation, e.g. differences between two customer segments. This stage results in one or more clean, customized data slices on which further analyses may be done. Details of the Data Pre-processing stage are provided below.

(2) PeaCoCk Graph Generation: In this stage, PeaCoCk uses information theory and statistics to create PeaCoCk Graphs that exhaustively capture all pair-wise relationships between entities in a variety of contexts. There are several steps in this stage:

Context-instance Creation—depending on the definition of the context, a number of context instances are created from the transaction data slice.

Co-occurrence Counting—For each pair of products, a co-occurrence count is computed as the number of context instances in which the two products co-occurred.

Co-occurrence Consistency—Once all the co-occurrence counting is done, information theoretic consistency measures are computed for each pair of products resulting in a PeaCoCk graph.

(3) Insight Discovery and Decisioninq from PeaCoCk Graphs: The PeaCoCk graphs serve as the model or internal representation of the knowledge extracted from transaction data. They are used in two ways:

Product Related Insight Discovery—Here, graph theory and machine learning algorithms are applied to the PeaCoCk graphs to discover patterns of interest such as product bundles, bridge products, product phrases, and product neighborhoods. These patterns may be used to make decisions, such as store layout, strategic co-promotion for increased cross department traffic, web-site layout and customization for identified customer, etc. Visualization tools such as a Product Space Browser have been developed to explore these insights.

Customer Related Decisioning—Here, the PeaCoCk graph is used as a model to decisions, such as recommendation engine that predict the most likely products a customer may buy given his past purchases. PeaCoCk recommendation engine may be used to predict not only what products the customer will buy, but also the most likely time when the customer will buy it, resulting in PeaCoCk's ability to make precise and timely recommendations. Details of the PeaCoCk recommendation engine are provided below.

PeaCoCk Benefits

The PeaCoCk framework integrates a number of desirable features in it that makes it very compelling and powerful compared to the current state of the art retail analytic approaches, such as association rule based market basket analysis or collaborative filtering based recommendation engines. The PeaCoCk framework is:

Generalizable: In association rules for a product bundle (or itemset) to be selected as a potential candidate, it must occur sufficient number of times among all the market baskets, i.e. it should have a high enough support. This criterion limits the number and kind of product bundles that can be discovered especially, for large product bundles. PeaCoCk uses only pair-wise consistency relationships and uses the resulting graph to expand the size of the candidate item-sets systematically. This approach makes PeaCoCk far more accurate and actionable compared to association rules and similar frequency based approaches.

Scalable: Again, because of pair-wise relationships among the product and customers, the PeaCoCk framework can represent a large number of sparse graphs. A typical PeaCoCk implementation on a single processor can easily handle hundreds of thousands of products, millions of customers, and billions of transactions within reasonable disk space and time complexities. Moreover, the PeaCoCk framework is highly parallelizable and, therefore, can scale well with the number of products, number of customers, and number of transactions.

Flexible: PeaCoCk is flexible in several ways: First it supports multiple contexts simultaneously and facilitates the search for the right context(s) for a given application. Secondly, it represents and analyzes graphs at possibly multiple levels of entity hierarchies. Thirdly, it represents entity spaces as graphs and therefore draws upon the large body of graph theoretic algorithms to address complex retail analytics problems. Most other frameworks have no notion of context; they can work well only at certain resolutions, and are very specific in their applications.

Adaptive: As noted before, both the product space and the customer space is very dynamic. New products are added, customers change over time, new customers get added to the market place, purchase trends change over time etc. To cope up with these dynamics of the modern day retail market, one needs a system that can quickly assimilate the newly generated transaction data and adapt its models accordingly. PeaCoCk is very adaptive as it can update its graph structures quickly to reflect any changes in the transaction data.

Customizable: PeaCoCk can be easily customized at various levels of operations: store level, sub-region level, region level, national level, international level. It can also be customized to different population segments. This feature allows store managers to quickly configure the various PeaCoCk applications to their stores or channels of interest in their local regions.

Interpretable: PeaCoCk results can be interpreted in terms of the sub-graphs that they depend upon. For example, bridge products, seed products, purchase career paths, product influences, similarity and consistency graphs, everything can be shown as two dimensional graph projections using the PeaCoCk visualization tool. These graphs are intuitive and easy to interpret by store managers and corporate executives both to explain results and make decisions.

Retail Data

In the following discussion, a formal description of the retail data is presented. Mathematical notations are introduced to define products in the product space, customers in the customer space, and their properties. Additionally, the data pre-processing step involving filtering and customization are also described in this discussion.

Product Space

A retailer's product space is comprised of all the products sold by the retailer. A typical large retailer may sell anywhere from tens of thousands to hundreds of thousands of products. These products are organized by the retailer in a product hierarchy in which the finest level products (SKU or UPC level) are grouped into higher product groups. The total numbers of products at the finest level change over time as new products are introduced and old products are removed. However, typically, the numbers of products at coarser levels are more or less stable. The number of hierarchy levels and the number of products at each level may vary from one retailer to another. The following notation is used to represent products in the product space:

Total number of product hierarchy levels is L (indexed 0 . . . L−1), 0 being the finest level Product Universe at level l is the set: $U_l = \{u_1^{(l)}, \ldots, u_m^{(l)}, \ldots, u_{M_l}^{(l)}\}$ with $M_l$ products Every product at the finest resolution is mapped to a coarser resolution product using many-to-one Product Maps that define the product hierarchy:

$M_l: U_0 \rightarrow U_l$

In addition to these product sets and mappings, each product has a number of properties as described below.

Customer Space

The set of all customers who have shopped at a retailer in the recent past form the customer base of the retailer. A typical large retailer may have anywhere from hundreds of thousands to tens of millions of customers. These customers may be geographically distributed for large retail chains with stores across the nation or internationally. The customer base might be demographically, financially, and behaviorally heterogeneous. Finally, the customer base might be very dynamic in three ways:

(i) new customers add over time to the customer base, (ii) old customers churn or move out of the customer base, and (iii) existing customers change in their life stage and life style.

Due to the changing nature of the customer base, most retail analysis including customer segmentation must be repeated every so often to reflect the current status of the customer base. We use the following formal notation to represent customers in the customer space:

Total number of customers in the customer space at any snapshot: N

Customers will be indexed by $n \in \{1 \ldots N\}$

As described below, each customer is associated with additional customer properties that may be used their retail analysis.

Retail Transaction Data

As described earlier, transaction data are essentially a time-stamped sequence of market baskets and reflect a mixture of both intentional and impulsive customer behavior. A typical transaction data record is known as a line-item, one for each product purchased by each customer in each visit. Each line-item contains fields such as customer id, transaction date, SKU level product id, and associated values, such as revenue, margin, quantity, discount information, etc.

Depending on the retailer, on an average, a customer may make anywhere from two, e.g. electronic and sports retailers, to 50, e.g. grocery and home improvement retailers, visits to the store per year. Each transaction may result in the regular purchase, promotional purchase, return, or replacement of one or more products. A line-item associated with a return transaction of a product is generally identified by the negative revenue. Herein, we are concerned only with product purchases. We use the following formal notation to represent transactions:

The entire transaction data is represented by:

$$X = \{x^{(n)}\}_{n=1}^{N},$$

where

Transactions of customer n are represented by the time-stamped sequence of market baskets:

$$x^{(n)} = (\langle t_1^{(n)}, x_1^{(n)}\rangle, \ldots, \langle t_q^{(n)}, x_q^{(n)}\rangle, \ldots, \langle t_{Q_n}^{n}, x_{Q_n}^{(n)}\rangle),$$

Where:

$t_q^{(n)}$ is the date of the $q^{th}$ transaction by the $n^{th}$ customer, and $$x_q^{(n)} = y_{0,q}^{(n)} = \{x_{q,s}^{(n)}\}_{s=1}^{S_{0,q}^{(n)}} \subseteq U_0$$

is the $q^{th}$ market basket of $n^{th}$ customer at level 0

Size of market basket at level 0 is $S_{0,q}^{(n)}$

Market basket at resolution l is defined as:

$$y_{l,q}^{(n)} = \bigcup_{x \in x_q^{(n)}} M_l(x)$$

Properties in Retail Data

There are four types of objects in the retail data:
1. Product—atomic level object in the product space
2. Line Item—each line (atomic level object) in transaction data
3. Transaction—collection of all line items associated with a single visit by a customer
4. Customer—collection of all transactions associated with a customer Typically, each of these objects is further associated with one or more properties that may be used to (i) filter, (ii) customize, or (iii) analyze the results of various retail applications. Notation and examples of properties of these four types of objects are as follows:

Product Properties

PeaCoCk recognizes two types of product properties:
(1) Given or Direct product properties that are provided in the product dictionary, e.g. manufacturer, brand name, product type (consumable, general merchandise, service, warranty, etc.), current inventory level in a store, product start date, product end date (if any), etc. These properties may also be level dependent, for example, manufacture code may be available only for the finest level.
(2) Computed or Indirect product properties are summary properties that can be computed from the transaction data using standard OLAP summarizations, e.g. average product revenue per transaction, total margin in the last one year, average margin percent, etc. Indirect properties of a coarser level product may be computed by aggregating the corresponding properties of its finer level products.

Line Item Properties

Each line item is typically associated with a number of properties such as quantity, cost, revenue, margin, line item level promotion code, return flag, etc.

Transaction Properties

PeaCoCk recognizes two types of transaction properties:
(1) Direct or Observed properties such as transaction channel, e.g. web, phone, mail, store id, etc., transaction level promotion code, transaction date, payment type used, etc. These properties are typically part of the transaction data itself.
(2) Indirect or Derived properties such as aggregates of the line item properties, e.g. total margin of the transaction, total number of products purchased, and market basket diversity across higher level product categories, etc.

Customer Properties

PeaCoCk recognizes three types of customer properties:
(1) Demographic Properties about each customer, e.g. age, income, zip code, occupation, household size, married/unmarried, number of children, owns/rent flag, etc., that may be collected by the retailer during an application process or a survey or from an external marketing database.
(2) Segmentation Properties are essentially segment assignments of each customer (and may be associated assignment weights) using various segmentation schemes, e.g. demographic segments, value based segments (RFMV), or purchase behavior based segment.
(3) Computed Properties are customer properties computed from customer transaction history, e.g. low vs. high value tier, new vs. old customer, angle vs. demon customer, early/late adopter etc.

Data Pre-processing

Figure 7:
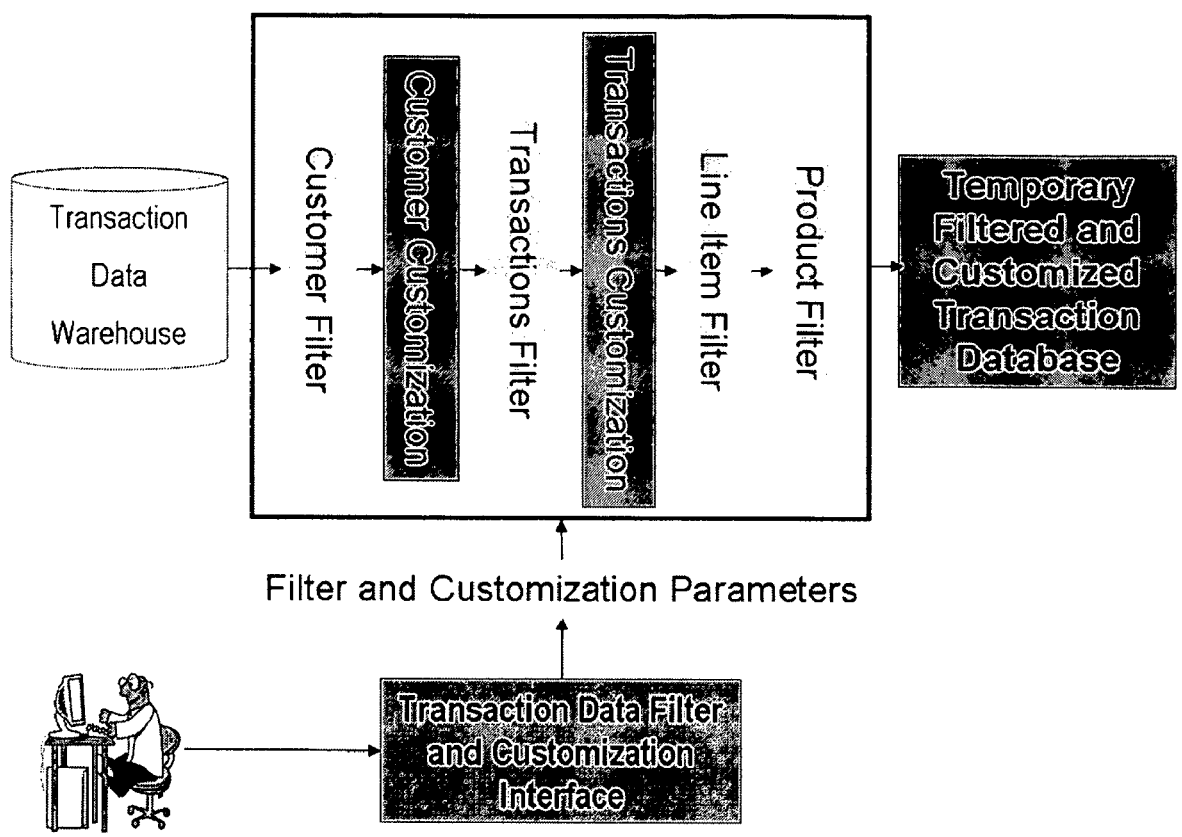
FIG. 7 shows that PeaCoCk is context rich, where there are two types of contexts in PeaCoCk: market basket context and purchase sequence context; where each type of context allows a number of parameters to define contexts as necessary and appropriate for different applications for different retailer types.

As described herein, the first step in the PeaCoCk process is data pre-processing. It involves two types of interspersed operations. As shown in FIG. 7, data pre-processing involves both data filtering (at customer, transaction, line item, and product levels) and customization (at customer and transaction levels).

Filtering

Not everything in the transaction data may be useful in a particular analysis. PeaCoCk manages this through a series of four filters based on the four object types in the transaction data: products, line items, transactions, customers.
(a) Product Filter: For some analyses, the retailer may not be interested in using all the products in the product space. A product filter allows the retailer to limit the products for an analysis in two ways:
  (1) Product Scope List allows the retailer to create a list of in-scope products. Only products that are in this list are used in the analyses. For example, a manufacturer might be interested in analyzing relationships between his own products in a retailer's data;
  (2) Product Stop List allows the retailer to create a list of out-of-scope products that must not be used in the analyses. For example, a retailer might want to exclude any discontinued products. These product lists may be created from direct and product properties.
(b) Line Item Filter: For some analyses, the retailer may not be interested in using all the line items in a customer's transaction data. For example, he may not want to include products purchased due to a promotion, or products that are returned, etc. Rules based on line item properties may be defined to include or exclude certain line items in the analyses.
(c) Transaction Filter: Entire transactions may be filtered out of the analyses based on transaction level properties. For example, one may be interested only in analyzing data from last three years or transactions containing at least three or more products, etc. Rules based on transaction properties may be used to include or exclude certain transactions from the analysis.
(d) Customer Filter: Finally, transaction data from a particular customer may be included or excluded from the analysis. For example, the retailer may want to exclude customers who did not buy anything in the last six months or who are in the bottom 30% by value. Rules based on customer properties may be defined to include or exclude certain customers from the analysis.

Customization

To create specific insights and/or tailored decisions, PeaCoCk allows customization of the analyses either by customer, e.g. for specific customer segments, or by transactions, e.g. for specific seasons or any combination of the two. This is achieved by applying the PeaCoCk analyses on a customization specific sample of the transaction data, instead of the entire data.
(a) Customer Customization: Retailers might be interested in customizing the analyses by different customer properties. One of the most common customer properties is the customer segment which may be created from a combination of demographic, relationship (i.e. how the customer buys at the retailer: recency, frequency, monetary value, (RFMV)), and behavior (i.e. what the customer buys at the retailer) properties associated with the customer. Apart from customer segments, customizations may also be done, for example, based on: customer value (high, medium, low value), customer age (old, new customers), customer membership (whether or not they are members of the retailer's program), customer survey responses, and demographic fields, e.g. region, income level, etc. Comparing PeaCoCk analyses results across different customer customizations and across all customers generally leads to valuable insight discovery.

(b) Transaction Customization: Retailers might be interested in customization of the analyses by different transaction properties. The two most common transaction customizations are: (a) Seasonal customization and (b) Channel customization. In seasonal customization the retailer might want to analyze customer behavior in different seasons and compare that to the overall behavior across all seasons. This might be useful for seasonal products, such as Christmas gifts or school supplies, etc. Channel customization might reveal different customer behaviors across different channels, such as store, web site, phone, etc.

Together all these customizations may result in specific insights and accurate decisions regarding offers of the right products to the right customers at the right time through the right channel. At the end of the data-preprocessing stage the raw transaction data is cleaned and sliced into a number of processed transaction data sets each associated with a different customization. Each of these now serve as possible inputs to the next stages in the PeaCoCk process.

Pair-wise Contextual Co-occurrences

According to the definition of PeaCoCk herein, it seeks pair-wise relationships between entities in specific contexts. In the following discussion, the notion of context is described in detail, especially as it applies to the retail domain. For each type of context the notion of a context instance, a basic data structure extracted from the transaction data, is described. These context instances are used to count how many times a product pair co-occurred in a context instance. These co-occurrence counts are then used in creating pair-wise relationships between products.

Definition of a Context

Figure 8:
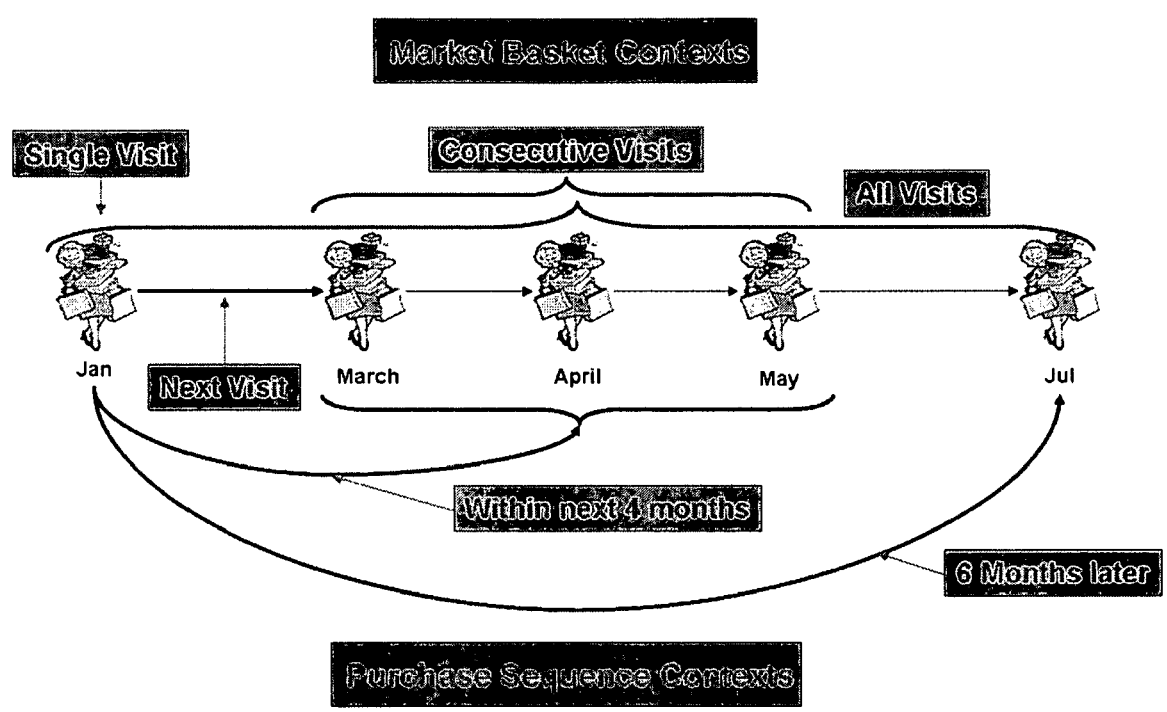
FIG. 8 is a description of Algorithm 1.

The concept of Context is fundamental to the PeaCoCk framework. A context is nothing but a way of defining the nature of relationship between two entities by way of their juxtaposition in the transaction data. The types of available contexts depend on the domain and the nature of the transaction data. In the retail domain, where the transaction data are a time-stamped sequence of market baskets, there are a number of ways in which two products may be juxtaposed in the transaction data. For example, two products may be purchased in the same visit, e.g. milk and bread, or one product may be purchased three months after another, e.g. a printer purchased three months after a PC, or a product might be purchased within six months of another product, e.g. a surround sound system may be purchased within six months of a plasma TV, or a product may be purchased between two to four months of another, e.g. a cartridge is purchased between two to four months of a printer or previous cartridge. The PeaCoCk retail mining framework is context rich, i.e. it supports a wide variety of contexts that may be grouped into two types as shown in FIG. 8: market basket context and purchase sequence context. Each type of context allows is further parameterized to define contexts as necessary and appropriate for different applications and for different retailer types.

For every context, PeaCoCk uses a three step process to quantify pair-wise co-occurrence consistencies for all product pairs: $(\alpha, \beta) \in U_l \times U_l$ for each level l at which the PeaCoCk analysis is to be done:

(1) Create context instances from filtered and customized, transaction data slice,
(2) Count the number of times the two products co-occurred in those context instances, and
(3) Compute information theoretic measures to quantify consistency between them.

These three steps are described for both the market basket and purchase sequence contexts next.

Market Basket Context

Almost a decade of research in retail data mining has focused on market basket analysis. Traditionally, a market basket is defined as the set of products purchased by a customer in a single visit. In PeaCoCk, however, a market basket context instance is defined as a SET of products purchased on one or more consecutive visits. This definition generalizes the notion of a market basket context in a systematic, parametric way. The set of all products purchased by a customer (i) in a single visit, or (ii) in consecutive visits within a time window of (say) two weeks, or (iii) all visits of a customer are all valid parameterized instantiations of different market basket contexts. A versatile retail mining framework should allow such a wide variety of choices for a context for several reasons:

Retailer specific market basket resolution—Different market basket context resolution may be more appropriate for different types of retailers. For example, for a grocery or home improvement type retailer, where customers visit more frequently, a fine time resolution, e.g. single visit or visits within a week, market basket context might be more appropriate. While for an electronics or furniture type retailer, where customers visit less frequently, a coarse time resolution, e.g. six months or a year, market basket context might be more appropriate. Domain knowledge such as this may be used to determine the right time resolution for different retailer types.

Time elapsed intentions—As mentioned above, transaction data is a mixture of projections of possibly time-elapsed latent intentions of customers. A time elapsed intention may not cover all its products in a single visit. Sometimes the customer just forgets to buy all the products that may be needed for a particular intention, e.g. a multi-visit birthday party shopping, and may visit the store again the same day or the very next day or week. Sometimes the customer buys products as needed in a time-elapsed intention for example a garage re-modeling or home theater set up that might happen in different stages, the customer may choose to shop for each stage separately. To accommodate both these behaviors, it is useful to have a parametric way to define the appropriate time resolution for a forgot visit, e.g. a week, to a intentional subsequent visit, e.g. 15 to 60 days.

For a given market basket definition, the conventional association rules mining algorithms try to find high support and high confidence item-sets. As mentioned above, these approaches fail because of two fundamental reasons: First the logical product bundles or item-sets typically do not occur as the transaction data is only a projection of logical behavior and, secondly, using frequency in a domain where different products have different frequency of purchase leads to a large number of spurious item-sets. The PeaCoCk framework corrects these problems in a novel way as described above. Now let us consider the first two steps of creating pair-wise co-occurrence counts for the market basket context.

Creating Market Basket Context Instances

A parametric market basket context is defined by a single parameter: window width: $\omega$. Algorithm 1 below describes how PeaCoCk creates market basket context instances, $B_n$, given:
- A customer's transaction history: $x^{(n)}$
- The last update date (for incremental updates): $t_{last}$ (which is 0 for the first update)
- The window width parameter $\omega$ (number of days)
- The function M that maps a SKU level market basket into a desired level basket.

---

B = CreateMarketBasketContextInstances $(x^{(n)}, t_{last}, \omega, M)$

Initialize $B \leftarrow \varnothing$; $q_{prev} \leftarrow Q_n + 1$; $q \leftarrow Q_n$
   While $(q \geq 1)$ and $(t_q \geq t_{last})$
     $q_{last} \leftarrow q$; $b_q \leftarrow M(x_q^{(n)})$; $p \leftarrow q - 1$ While $(p \geq 1)$ and $\left(\left\lfloor \dfrac{t_q^{(n)} - t_p^{(n)}}{\omega} \right\rfloor = 0 \right)$ $b_q \leftarrow b_q \cup M(x_p^{(n)})$;
        $q_{last} \leftarrow p$; $p \leftarrow p - 1$
     If $(q_{last} < q_{prev})$ and $(|b_q| > 1)$
        $B \leftarrow B \oplus b_q$
     $q_{prev} \leftarrow q_{last}$; $q \leftarrow q - 1$
   Return B

---

Algorithm 1: Create Market Basket Context Instances from a Customer's Transaction Data The algorithm returns a (possibly empty) set of market basket context instances or a set of market baskets, $B = B_n(\omega)$. The parameter $t_{last}$ is clarified later when we show how this function is used for the initial co-occurrence count and incremental co-occurrence updates since the last update.

Figure 9:
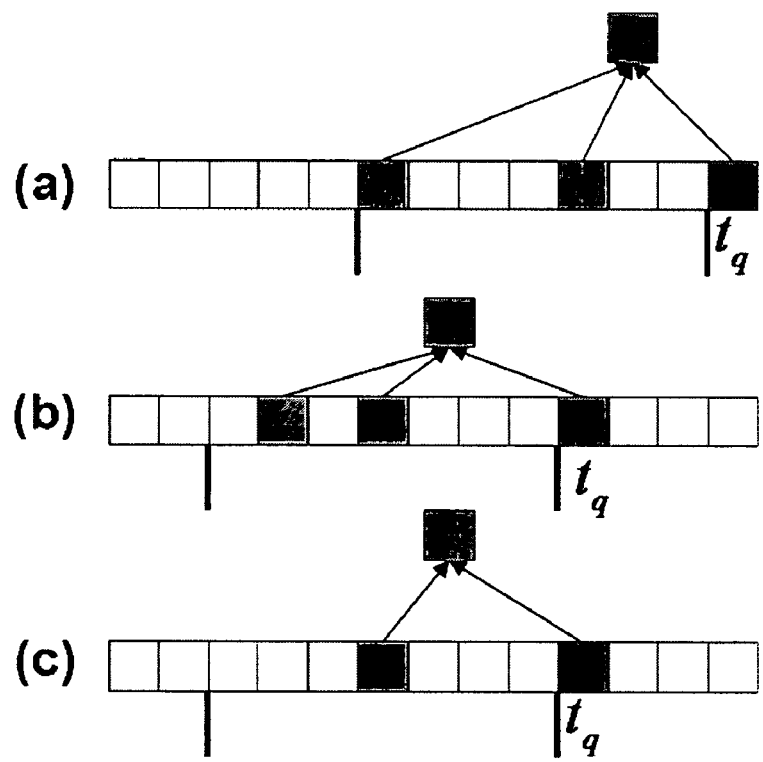
FIG. 9 is a description of Algorithm 2.

The basic idea of Algorithm 1 is as follows: Consider a customer's transaction data shown in FIG. 9(a). In FIG. 9, each cell in the three time lines represents a day. A grey cell in the time line indicates that the customer made a purchase on that day. The block above the time line represents the accumulated market basket. The thick vertical lines represent the window boundary starting from any transaction day (dark grey cell) going backwards seven (window size in this example) days in the past. We start from the last transaction, (the darkest shade of grey) and accumulate two lighter grey market baskets in the time line, i.e. take the union of the dark grey market basket with the two lighter grey market baskets as they are purchased within a window of seven days prior to it. The union of all three results in the first market basket context instance represented by the block above the time line for this customer. In the second iteration, shown in FIG. 9(b), we move to the second last transaction and repeat the process. FIG. 9(c) highlights an important caveat in this process. If FIG. 9(c) represents the customer data instead of FIG. 9(a), i.e. the lightest grey transaction in FIG. 9(a) is missing. In the second iteration on FIG. 9(c), the resulting market basket context instance should be a union of the two (dark and lighter) grey market baskets. However, these two transactions are already part of the first market basket context instance in FIG. 9(a). Therefore, if FIG. 9(c) is the transaction history, then the market basket context instance in the second iteration is ignored because it is subsumed by the market basket context instance of the first iteration.

Creating Market Basket Co-occurrence Counts

PeaCoCk maintains the following four counts for each product level 1 at which the market basket analysis is done.

Total number of market basket instances: $\eta_\omega^{mb}(\bullet, \bullet)$ $$\eta_\omega^{mb}(\cdot, \cdot) = \sum_{n=1}^{N} |B_n(\omega)|$$

Total number of market basket instances in which a product occurred, also known as product margin: $\eta_\omega^{mb}(\alpha, \bullet) = \eta_\omega^{mb}(\bullet, \alpha)$ for all products $\alpha \in U_l(\delta(e)$ is 1 if the Boolean expression e is true, otherwise it is 0)

$$\eta_\omega^{mb}(\alpha, \cdot) = \eta_\omega^{mb}(\cdot, \alpha) = \sum_{n=1}^{N} \sum_{b \in B_n(\omega)} \delta(\alpha \in b)$$

Total number of market basket instances in which the product pair $(\alpha, \beta)$: $\alpha \neq \beta$ co-occurred for all product pairs:

$$(\alpha, \beta) \in U_l \times U_l : \eta_\omega^{mb}(\alpha, \beta)$$

$$\eta_\omega^{mb}(\alpha, \beta) = \eta_\omega^{mb}(\beta, \alpha) = \sum_{n=1}^{N} \sum_{b \in B_n(\omega)} \delta(\alpha \in b) \times \delta(\beta \in b)$$

Note that the market basket context results in a symmetric co-occurrence counts matrix. Also, the diagonal elements of the matrix are zero because the product co-occurrence with itself is not a useful thing to define. A threshold is applied to each count such that if the count is less than the threshold, it is considered zero. Also note that the single visit market basket used in traditional market basket analysis tools is a special parametric case: $\omega = 0$.

Purchase Sequence Context

While market basket context is ubiquitous in the retail mining literature, it is clear that it either ignores when it uses single visits as market baskets, or looses when it uses consecutive visits as market baskets, temporal information that establishes contexts across time. These purchase sequence contexts as they are called in PeaCoCk may be very critical in making not only precise decisions about what product to offer a particular customer, but also timely decisions about when the product should be offered. For example, in grocery domain, there might be one group of customers who buy milk every week while another group who might buy milk once a month. In, for example electronics retailers, where this is even more useful, there might be one group of customers who use cartridge more quickly than others or who change their cell phones more frequently than others, etc. Further, there might be important temporal relationships between two or more products for example between a PC purchase; followed by a new printer purchase; followed by the first cartridge purchase. There might be consistent product phrases that may be result in important insights and forecasting or prediction decisions about customers. The purchase sequence type context in PeaCoCk makes such analyses possible.

Creating Purchase Sequence Context Instances

Unlike a market basket context instance, which is nothing but a market basket or a single set of products, the purchase sequence context instance is a triplet: ⟨a, b, Δt⟩ with three elements:

- The from set: a=set of products purchased at some time in the past
- The to set: b=set of products purchased at some time in the future (relative to set a)
- The time lag between the two: Δt The time t in the transaction data is in days. Typically, it is not useful to create purchase sequence context at this resolution because at this resolution we may not have enough data, moreover, this may be a finer resolution than the retailer can make actionable decisions on. Therefore, to allow a different time resolution, we introduce a parameter: ρ that quantifies the number of days in each time unit (Δt). For example, if ρ=7, the purchase sequence context is computed at week resolution. Algorithm 2 below describes the algorithm for creating a set of purchase sequence context instances, given:

- A customer's transaction history: $x^{(n)}$
- The last update date (for incremental updates): $t_{last}$ (which is 0 for the first update)
- The time resolution parameter ρ
- The function M that maps a SKU level market basket into a desired level basket.

The time in days is converted into the time units in Algorithm 2 using the function:

$$\gamma(t_{future}, t_{past}, \rho) = \left\lfloor \frac{t_{future} - t_{past}}{\rho} \right\rfloor$$

The algorithm returns a (possibly empty) set of purchase sequence context instances or a set of triplets, ⟨a, b, Δt⟩, $P=P_n(\rho)$. Again, the parameter $t_{last}$ is clarified later when we show how this function is used for the initial co-occurrence count and incremental co-occurrence updates since the last update.

---

P = CreatePurchaseSequenceContextInstances ($x^{(n)}$, $t_{last}$, ρ, M)

Initialize P ← ∅; q ← $Q_n$

While (q ≥ 2) and ($t_q$ ≥ $t_{last}$)

$b_q$ ← M ($x_q^{(n)}$); p ← q − 1;

While (p ≥ 1) and ($\gamma(t_q^{(n)}, t_p^{(n)}, \rho) = 0$) ⇒ p ← p − 1;

// Skip all market basket contexts

If (p = 0) ⇒ Break;

$a_q$ ← M ($x_p^{(n)}$); $\Delta t_{last}$ = γ ($t_q^{(n)}, t_p^{(n)}$, ρ); p ← p − 1;

While (p ≥ 1)

Δt = γ ($t_q^{(n)}, t_p^{(n)}$, ρ)

If (Δt = $\Delta t_{last}$) ⇒ $a_q$ ← $a_q$ ∪ M ($x_p^{(n)}$);

Else

If ($a_q$ ≠ ∅) and ($b_q$ ≠ ∅) ⇒ P ← P ⊕ ⟨$a_q$, $b_q$, $\Delta t_{last}$⟩

$a_q$ ← M ($x_p^{(n)}$); $\Delta t_{last}$ ← Δt p ← p − 1;

If ($a_q$ ≠ ∅) and ($b_q$ ≠ ∅) ⇒ P ← P ⊕ ⟨$a_q$, $b_q$, $\Delta t_{last}$⟩

Return P

---

Figure 10:
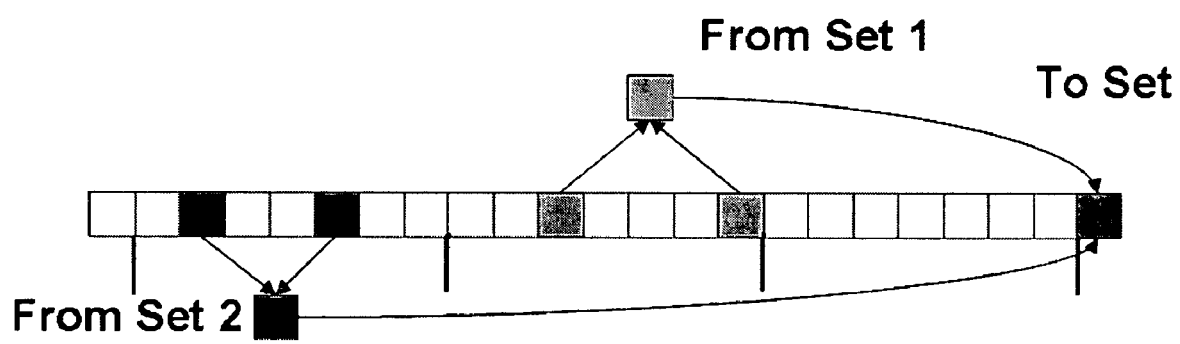
FIG. 10 shows a definition of consistency.

Algorithm 2: Create Purchase Sequence Context Instances from a Customer's Transaction Data FIG. 10 shows the basic idea of Algorithm 2. In FIG. 10, each non-empty cell represents a transaction. If the last grey square on the right is the TO transaction, then there are two FROM sets: the union of the two center grey square transactions and the union of the two left grey square transactions resulting, correspondingly, in two context instances. Essentially we start from the last transaction (far right) as in the market basket context. We ignore any transactions that might occur within the previous seven days (assuming the time resolution parameter ρ=7. Now continuing back, we find the two transactions at Δt=1 (second and third grey squares from the right). The union of the two becomes the first FROM set resulting in the purchase sequence context instance (the grey square above the time line union=FROM, last grey square on the right=TO, Δt=1. Going further back we find two transactions at Δt=2 (two left most grey squares). The union of these two becomes the second FROM set resulting in the purchase sequence context instance (grey square below the time line union=FROM, last grey square on the right=TO, Δt=1).

Creating Purchase Sequence Co-occurrence counts

In the market basket context, we have a symmetric 2-D matrix with zero diagonals to maintain the co-occurrence counts. In purchase sequence context, we use a non-symmetric, three dimensional matrix to denote the co-occurrence counts. PeaCoCk maintains the following matrices for the purchase sequence co-occurrence counts:

Total number of purchase sequence instances with each time lag $$\Delta\tau : \eta_\rho^{ps}(\cdot, \cdot \mid \Delta\tau)$$

$$\eta_\rho^{ps}(\cdot, \cdot \mid \Delta\tau) = \sum_{n=1}^{N} \sum_{(a,b,\Delta t) \in P_n(\rho)} \delta(\Delta t = \Delta\tau)$$

Total number of market basket instances in which a product occurred in the FROM set a, (From Margin) for each time lag Δτ for all products $$\alpha \in U_l : \eta_\rho^{ps}(\alpha, \cdot \mid \Delta\tau)$$

$$\eta_\rho^{ps}(\alpha, \cdot \mid \Delta\tau) = \sum_{n=1}^{N} \sum_{(a,b,\Delta t) \in P_n(\rho)} \delta(\alpha \in a) \times \delta(\Delta t = \Delta\tau)$$

Total number of market basket instances in which a product occurred in the TO set b, (To Margin) for each time lag Δτ for all products $$\beta \in U_l : \eta_\rho^{ps}(\bullet, \beta \mid \Delta\tau)$$

$$\eta_\rho^{ps}(\bullet, \beta \mid \Delta\tau) = \sum_{n=1}^{N} \sum_{(a,b,\Delta t) \in P_n(\rho)} \delta(\beta \in b) \times \delta(\Delta t = \Delta\tau)$$

Total number of market basket instances in which the product pair (α, β):α≠β co-occurred where the FROM product α occurred time lag Δt before the TO product β for all product pairs:

$$(\alpha, \beta) \in U_l \times U_l : \eta_\rho^{ps}(\alpha, \beta \mid \Delta\tau)$$

$$\eta_\rho^{ps}(\alpha, \beta \mid \Delta\tau) = \sum_{n=1}^{N} \sum_{(a,b,\Delta t) \in P_n(\rho)} \delta(\alpha \in a) \times \delta(\beta \in b) \times \delta(\Delta t = \Delta\tau)$$

$$\eta_\rho^{ps}(\alpha, \beta \mid \Delta\tau) = \eta_\rho^{ps}(\beta, \alpha \mid -\Delta\tau)$$

Note that:

Initial vs. Incremental Updates

Transaction data are collected on a daily basis as customers shop. When in operation, the PeaCoCk co-occurrence count engine uses an initial computation of the four counts: totals, margins, and co-occurrence counts using one pass through the transaction data. After that incremental updates may be done on a daily, weekly, monthly, or quarterly basis depending on how the incremental updates are set up.

Let $t_0$=the earliest date such that all transactions on or after this date to be included.

Let $t_{last}$=the last transaction date of last update

---

InitialUpdate($t_0$,ω,M)

For n = 1...N
        $B_n(\omega)$=CreateMarketBasketContextInstance($x^{(n)}$,$t_0$,ω,M)
        ProcessMarketBasketContext($B_n(\omega)$)
        $P_n(\rho)$=CreatePurchaseSequenceContextInstance($x^{(n)}$,$t_0$,ρ,M)
        ProcessPurchaseSequenceContext($P_n(\rho)$)

IncrementalUpdate($t_{last}$,ω,M)

For n = 1...N
        If( $t_{\varrho_n} > t_{last}$) // If the customer purchased since last update
            $B_n(\omega)$=CreateMarketBasketContextInstance($x^{(n)}$,$t_{last}$,ω,M)
            ProcessMarketBasket($B_n(\omega)$)
            $P_n(\rho)$=CreatePurchaseSequenceContextInstance($x^{(n)}$,$t_0$,ρ,M)
            ProcessPurchaseSequenceContext($P_n(\rho)$)

---

The time complexity of the initial update is $$O\left(\sum_{n=1}^{N} Q_n^2\right)$$

and the time complexity of the incremental update is $$O\left(\sum_{n=1}^{N} I_n^2\right)$$

where $I_n$ is the number of new transactions since the last update.

Consistency Measures

PeaCoCk framework does not use the raw co-occurrence counts (in either context) because the frequency counts do not normalize for the margins. Instead, PeaCoCk uses consistency measures based on information theory and statistics. A number of researchers have created a variety of pair-wise consistency measures with different biases that are available for use in PeaCoCk. In the following discussion, we describe how these consistency matrices may be computed from the sufficient statistics that we have already computed in the co-occurrence counts.

Definition of Consistency

Figure 11:
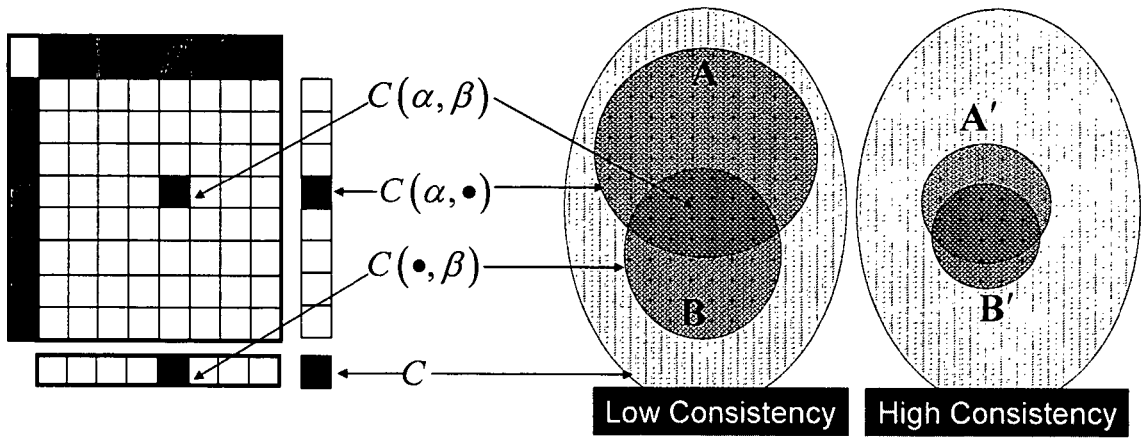
FIG. 11 shows four counts and their Venn diagram interpretation.

Instead of using frequency of co-occurrence, we use consistency to quantify the strength of relationships between pairs of products. Consistency is defined as the degree to which two products are more likely to be co-purchased in a context than they are likely to be purchased independently. There are a number of ways to quantify this definition. The four counts, i.e. the total, the two margins, and the co-occurrence, are sufficient statistics needed to compute pair-wise co-occurrence. FIG. 11 shows the four counts and their Venn diagram interpretation. For any product pair (α, β) let A denote the set of all the context instances in which product α occurred and let B denote the set of all context instances in which product β occurred and let T denote the set of all context instances.

In terms of these sets, $$\eta(\alpha,\beta)=|A \cap B|; \eta(\bullet,\bullet)=|T|$$

$$\eta(\alpha,\bullet)=|A|; \eta(\bullet,\beta)=|B|$$

In the left and the right Venn diagrams, the overlap between the two sets is the same. However, in case of sets A' and B', the relative size of the overlap compared to the sizes of the two sets is higher than that for the sets A and B and hence by our definition, the consistency between A', B' is higher than the consistency between A, B.

For the purchase sequence context, the four counts are available at each time-lag therefore all the equations above and the ones that follow can be generalized to purchase sequence as follows: $\eta(*, *) \rightarrow \eta(*, * \mid \Delta\tau)$, i.e. all pair-wise counts are conditioned on the time-lag in the purchase sequence context.

Co-occurrence counts: Sufficient Statistics

The counts, i.e. total, the margin(s), and the co-occurrence counts, are sufficient statistics to quantify all the pair-wise co-occurrence consistency measures in PeaCoCk. From these counts, we can compute the following probabilities:

$$P(\alpha, \bullet) = \frac{\eta(\alpha, \bullet)}{\eta(\bullet, \bullet)}; P(\bar{\alpha}, \bullet) = 1 - P(\alpha, \bullet) = \frac{\eta(\bullet, \bullet) - \eta(\alpha, \bullet)}{\eta(\bullet, \bullet)}$$

$$P(\beta, \bullet) = \frac{\eta(\bullet, \beta)}{\eta(\bullet, \bullet)}; P(\bullet, \bar{\beta}) = 1 - P(\beta, \bullet) = \frac{\eta(\bullet, \bullet) - \eta(\bullet, \beta)}{\eta(\bullet, \bullet)}$$

$$P(\alpha, \beta) = \frac{\eta(\alpha, \beta)}{\eta(\bullet, \bullet)};$$

$$P(\bar{\alpha}, \bar{\beta}) = \frac{\eta(\bullet, \bullet) - [\eta(\alpha, \bullet) + \eta(\bullet, \beta) - \eta(\alpha, \beta)]}{\eta(\bullet, \bullet)}$$

$$P(\alpha, \bar{\beta}) = \frac{\eta(\alpha, \bullet) - \eta(\alpha, \beta)}{\eta(\bullet, \bullet)}; P(\bar{\alpha}, \beta) = \frac{\eta(\bullet, \beta) - \eta(\alpha, \beta)}{\eta(\bullet, \bullet)}$$

There are two caveats in these probability calculations: First if any of the co-occurrence or margin counts is less than a threshold then it is treated as zero. Second, it is possible to use smoother versions of the counts, which is not shown in these equations. Finally, if due to data sparsity, there are not enough counts, then smoothing from coarser class levels may also be applied.

Consistency Measures Library

There are a number of measures of interestingness that have been developed in statistics, machine learning, and data mining communities to quantify the strength of consistency between two variables. All these measures use the probabilities discussed above. Examples of some of the consistency measures are given below.

Context between all pairs of products at any product level is stored in a Consistency Matrix: Φ

For Market Basket Context

101 =[ϕ(α,β)]:∀α,β∈$U_I$

ϕ(α,β)=f(η(●,●),η(α,●),η(●,β),η(α,β))

For Purchase Sequence Context used in product phrases:

Φ=[ϕ(α,β;Δτ)]:∀α,β∈$U_I$,Δτ∈[0 ... ΔT]

ϕ(α,β;Δτ)=f(η(●,●;Δτ),η(α,●;Δτ),η(●,β;Δτ),η(α,β;Δτ))

Before we go into the list of consistency measures, it is important to note some of the ways in which we can characterize a consistency measure. While all consistency measures normalize for product priors in some way, they may be:

- Symmetric (non-directional) vs. Non-symmetric (directional)—There are two kinds of directionalities in PeaCoCk. One is the temporal directionality that is an inherent part of the purchase sequence context and which is missing from the market basket context. The second kind of directionality is based on the nature of the consistency measure. By definition:
  - ϕ(α,β)=ϕ(β,α)⇒Symmetric Market Basket Cotisistency
  - ϕ(α|β)≠ϕ(β|α)⇒Asymmetric Market Basket Consistency
  - ϕ(α,β;Δt)=ϕ(β,α;−Δt)⇒Symmetric Purchase Sequence Consistency
  - ϕ(α|β;Δt)≠ϕ(β|α;−Δt)⇒Asymetric Purcilase Sequence Consistency
- Normalized or Un-normalized—Consistency measures that take a value in a fixed range (say 0-1) are considered normalized and those that take values from negative infinity (or zero) to positive infinity are considered un-normalized.
- Uses absence of products as information or not—Typically in retail, the probability of absence of a product either in the margins or in the co-occurrence, i.e. P($\bar{α}$, ●), P(●, $\bar{β}$), P($\bar{α}$, β), P(α, $\bar{β}$), P($\bar{α}$, $\bar{β}$) would be relatively higher than the probability of the presence of the product, i.e. P(α, ●), P(●, β), P(α, β). Some consistency measures use absence of products also as information which may bias the consistency measures for rare or frequent products.

These properties are highlighted as appropriate for each of the consistency measures in the library. For the sake of brevity, in the rest of this discussion, we use the following shorthand notation for the marginal probabilities:

P(α,●)=P(α); P(●,β)=P(β)

Statistical Measures of Consistency

Pearson's Correlation Coefficient

Correlation coefficient quantifies the degree of linear dependence between two variables which are binary in our case indicating the presence or absence of two products. It is defined as:

$$\phi(\alpha, \beta) = \frac{Cov(\alpha, \beta)}{Std(\alpha)Std(\beta)} = \frac{\chi^2}{\eta(\bullet, \bullet)} = \frac{P(\alpha, \beta)P(\bar{\alpha}, \bar{\beta}) - P(\alpha, \bar{\beta})P(\bar{\alpha}, \beta)}{\sqrt{P(\alpha, \bullet)P(\bar{\alpha}, \bullet)P(\bullet, \beta)P(\bullet, \bar{\beta})}} \in [-1, +1]$$

Comments:

Symmetric and Normalized, Related to $\chi^2$.

Uses both presence and absence of products as information. Hard to distinguish whether the correlation is high because of co-occurrence, i.e. P(α, β) or because of co-non-occurrence, i.e. P($\bar{α}$, $\bar{β}$). The latter tends to outweigh the former.

Goodman and Kruskal's λ-Coefficient

λ-coefficient minimizes the error of predicting one variable given the other. Hence, it can be used in both a symmetric and a non-symmetric version:

Asymmetric Versions:

$$\phi(\alpha | \beta) = \frac{P(\varepsilon_\alpha) - P(\varepsilon_\alpha | \beta)}{P(\varepsilon_\alpha)} = \frac{M(\alpha | \beta) + M(\alpha | \bar{\beta}) - M(\alpha)}{1 - M(\alpha)}$$

$$\phi(\beta | \alpha) = \frac{P(\varepsilon_\beta) - P(\varepsilon_\beta | \alpha)}{P(\varepsilon_\beta)} = \frac{M(\beta | \alpha) + M(\beta | \bar{\alpha}) - M(\beta)}{1 - M(\beta)}$$

Where:

$M(\alpha | \beta) = \max\{P(\alpha, \beta), P(\bar{\alpha}, \beta)\}$;

$M(\alpha | \bar{\beta}) = \max\{P(\alpha, \bar{\beta}), P(\bar{\alpha}, \bar{\beta})\}$ $M(\beta | \alpha) = \max\{P(\alpha, \beta), P(\alpha, \bar{\beta})\}$;

$M(\beta | \bar{\alpha}) = \max\{P(\bar{\alpha}, \beta), P(\bar{\alpha}, \bar{\beta})\}$ $M(\alpha) = \max\{P(\alpha), P(\bar{\alpha})\}$; $M(\beta) = \max\{P(\beta), P(\bar{\beta})\}$ Symmetric Versions:

$$\phi(\alpha, \beta) = \frac{P(\varepsilon_\alpha) + P(\varepsilon_\beta) - P(\varepsilon_\alpha | \beta) - P(\varepsilon_\beta | \alpha)}{P(\varepsilon_\alpha) + P(\varepsilon_\beta)}$$

$$= \frac{M(\alpha | \beta) + M(\alpha | \bar{\beta}) + M(\beta | \alpha) + M(\beta | \bar{\alpha}) - M(\alpha) - M(\beta)}{2 - M(\alpha) - M(\beta)}$$

Comments:

Both symmetric and non-symmetric versions available

Affected more by the absence of products than their presence

Odds Ratio and Yule's Coefficients

Odds Ratio measures the odds of two products occurring or not occurring compared to one occurring and another non-occurring: The odds ratio is given by:

$$\phi(\alpha, \beta) = odds(\alpha, \beta) = \frac{P(\alpha, \beta)P(\bar{\alpha}, \bar{\beta})}{P(\bar{\alpha}, \beta)P(\alpha, \bar{\beta})}$$

Odds may be unbounded and hence two other measures based on odds ratio are also proposed:

Youle-Q:

$$\phi(\alpha, \beta) = \frac{odds(\alpha, \beta) - 1}{odds(\alpha, \beta) + 1} = \frac{P(\alpha, \beta)P(\bar{\alpha}, \bar{\beta}) - P(\bar{\alpha}, \beta)P(\alpha, \bar{\beta})}{P(\alpha, \beta)P(\bar{\alpha}, \bar{\beta}) + P(\bar{\alpha}, \beta)P(\alpha, \bar{\beta})}$$

Youle's-Y:

$$\phi(\alpha, \beta) = \frac{\sqrt{odds(\alpha, \beta)} - 1}{\sqrt{odds(\alpha, \beta)} + 1} = \frac{\sqrt{P(\alpha, \beta)P(\overline{\alpha}, \overline{\beta})} - \sqrt{P(\overline{\alpha}, \beta)P(\alpha, \overline{\beta})}}{\sqrt{P(\alpha, \beta)P(\overline{\alpha}, \overline{\beta})} + \sqrt{P(\overline{\alpha}, \beta)P(\alpha, \overline{\beta})}}$$

Piatetsky-Shapiro's $$\phi(\alpha|\beta) = P(\alpha,\beta) - P(\alpha)P(\beta)$$

Added Value $$\phi(\alpha|\beta) = \max\{P(\beta|\alpha) - P(\beta), P(\alpha|\beta) - P(\alpha)\} = \frac{P(\alpha, \beta) - P(\beta)}{\min\{P(\alpha), P(\beta)\}}$$

Klosgen $$\phi(\alpha|\beta) = \sqrt{P(\alpha, \beta)} \max\{P(\beta|\alpha) - P(\beta), P(\alpha|\beta) - P(\alpha)\}$$
$$= \sqrt{P(\alpha, \beta)} \left[ \frac{P(\alpha, \beta) - P(\beta)}{\min\{P(\alpha), P(\beta)\}} \right]$$

Certainty Coefficients

Asymmetric Versions:

$$\phi(\alpha|\beta) = \frac{P(\alpha|\beta) - P(\beta)}{1 - P(\beta)}; \phi(\beta|\alpha) = \frac{P(\beta|\alpha) - P(\alpha)}{1 - P(\alpha)}$$

Symmetric Version:

$$\phi(\alpha, \beta) = \max\left\{ \frac{P(\alpha, \beta) - P(\beta)}{1 - P(\beta)}, \frac{P(\beta, \alpha) - P(\alpha)}{1 - P(\alpha)} \right\}$$

Data Mining Measures of Consistency

Support $$\phi(\alpha,\beta) = P(\alpha,\beta)$$

Confidence

Asymmetric Version:

$$\phi(\alpha|\beta) = P(\alpha|\beta) = \frac{P(\alpha, \beta)}{P(\beta)}; \phi(\beta|\alpha) = P(\beta|\alpha) = \frac{P(\alpha, \beta)}{P(\alpha)}$$

Symmetric Version:

$$\phi(\alpha, \beta) = \max\{P(\alpha|\beta), P(\beta|\alpha)\} = \frac{P(\alpha, \beta)}{\min\{P(\alpha), P(\beta)\}}$$

Conviction

Asymmetric Version:

$$\phi(\alpha|\beta) = \frac{P(\overline{\alpha})P(\beta)}{P(\overline{\alpha}, \beta)}; \phi(\beta|\alpha) = \frac{P(\alpha)P(\overline{\beta})}{P(\alpha, \overline{\beta})}$$

Symmetric Version:

$$\phi(\alpha, \beta) = \max\left\{ \frac{P(\overline{\alpha})P(\beta)}{P(\overline{\alpha}, \beta)}, \frac{P(\alpha)P(\overline{\beta})}{P(\alpha, \overline{\beta})} \right\}$$

Interest and Cosine

Interest: $\phi(\alpha, \beta) = \frac{P(a, b)}{P(a)P(b)} \in [0, \ldots, 1, \ldots, \infty]$ Cosine: $\phi(\alpha, \beta) = \frac{P(a, b)}{\sqrt{P(a)P(b)}} \in [0, \ldots, \sqrt{P(a)P(b)}, \ldots, 1]$ Collective Strength $$\phi(\alpha, \beta) = \left[ \frac{P(\alpha, \beta) + P(\overline{\alpha}, \overline{\beta})}{P(\alpha)P(\beta) + P(\overline{\alpha})P(\overline{\beta})} \right] \times \left[ \frac{1 - P(\alpha)P(\beta) - P(\overline{\alpha})P(\overline{\beta})}{1 - P(\alpha, \beta) - P(\overline{\alpha}, \overline{\beta})} \right]$$

Information Theoretic Measures of Consistency

Point-Wise Mutual Information $$\phi(\alpha, \beta) = \log\left[ \frac{P(a, b)}{P(a)P(b)} \right]$$

PeaCoCk Suite of Applications

PeaCoCk is a general framework that allows formulation and solution of a number of different problems in retail. For example, it may be used to solve problems as varied as:
(i) customer segmentation using pair-wise similarity relationships between customers,
(ii) creating product bundles or consistent item-sets using pair-wise consistency between products purchased in market basket context, or
(iii) predicting the time and product of the next possible purchase of a customer using pair-wise consistency between products purchased in a purchase sequence context.

From a technology perspective, the various applications of PeaCoCk are divided into three categories:
Product Affinity Applications—that use product consistency relationships to analyze the product space. For example, finding higher order structures such as bundles, bridges, and phrases and using these for cross-sell, co-promotion, store layout optimization, etc.
Customer Affinity Applications—that use customer similarity relationships to analyze the customer space. For example, doing customer segmentation based on increasingly complex definitions of customer behavior and using these to achieve higher customer centricity.

Purchase Behavior Applications—that use both the products and the customers to create decisions in the joint product, customer space. For example, recommending the right product to the right customer at the right time.

Figure 12:
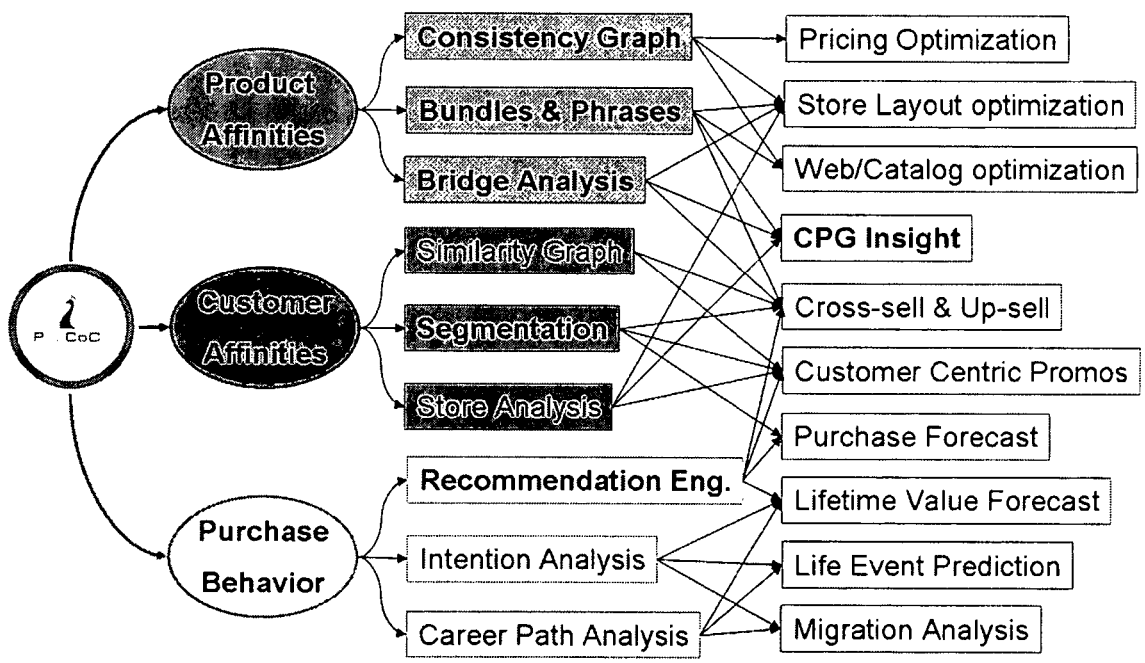
FIG. 12 shows the wide variety of PeaCoCk applications divided into three types: Product affinity applications, Customer affinity applications, and Purchase behavior applications.

FIG. 12 shows applications within each of these areas both from a technology and business perspective. The following discussion concerns the various product affinity applications created from PeaCoCk analysis.

PeaCoCk Product consistency graphs are the internal representation of the pair-wise co-occurrence consistency relationships created by the process described above. Once the graph is created, PeaCoCk uses graph theoretic and machine learning approaches to find patterns of interest in these graphs. While we could use the pair-wise relationships as such to find useful insights, the real power of PeaCoCk comes from its ability to create higher order structures from these pair-wise relationships in a very novel, scalable, and robust manner, resulting in tremendous generalization that is not possible to achieve by purely data driven approaches. The following discussion focuses on four important higher-order-structures that might constitute actionable insights:

(a) Product neighborhood,
(b) product bundles,
(c) bridge structures, and
(d) product phrases.

Before we go into these structures, however, we define a useful abstraction called the Product Space.

Product Space Abstraction

We introduced the notion of product space above as a collection of products and their properties. Now that we have a way to quantify connection strength (co-occurrence consistency) between all pairs of products, we can use this to create a discrete, finite, non-metric product space where:

- Each point in this space is a product. There are as many points as there are products.
- There is one such product space for each level in the product hierarchy and for each combination of customization, market basket context parameter, and customization.
- The pair-wise co-occurrence consistency quantifies the proximity between two points. The higher the consistency, the closer the two points are.
- The product space is not metric in the sense that it does not strength of connection between them.

Product Neighborhood

The simplest kind of insight about a product is that regarding the most consistent products sold with the target product in the PeaCoCk graph or the products nearest to a product in the Product Space abstraction. This type of insight is captured in the product neighborhood analysis of the PeaCoCk graph.

Definition of a Product Neighborhood

The neighborhood of a product is defined as an ordered set of products that are consistently co-purchased with it and satisfying all the neighborhood constraints. The neighborhood of a product $\gamma$ is denoted by $N_\lambda(\gamma|\Phi)$, where:

$\Phi$ is the consistency matrix with respect to which neighborhood is defined:

$\lambda=\{\lambda_{scope},\lambda_{size}\}$ are the neighborhood constraints based the parameters:

$$N_\lambda(\gamma|\Phi)=\{x_1,x_2,\ldots,x_K\}$$

Such that:

$$\phi(\gamma,x_k) \geq \phi(\gamma,x_{k+1}): \forall k=1\ldots K-1$$

$$g_{scope}(x_k, \lambda_{scope})=TRUE: \forall k=1\ldots k$$

$$g_{size}(N_\lambda(\gamma|\Phi),\lambda_{size})=TRUE: \forall k=1\ldots K$$

Note that the set is ordered by the consistency between the target product and the neighborhood products: The most consistent product is the first neighbor of the target product, and so on. Also note that here are two kinds of constraints associated with a neighborhood:

Scope Constraint: This constraint filters the scope of the products that may or may not be part of the neighborhood. Essentially, these scope-filters are based on product properties and the parameter $\lambda_{scope}$ encapsulates all the conditions. For example, someone might be interested in the neighborhood to be limited only to the target product's department or some particular department or to only high value products or only to products introduced in the last six months, etc. The function $g_{scope(x,\lambda scope)}$ returns a true if the product x meets all the criteria in $\lambda_{scope}$.

Size Constraint: Depending on the nature of the context used, the choice of the consistency measure, and the target product itself the size of the product neighborhood might be large even after applying the scope constraints. There are three ways to control the neighborhood size:

Limit the number of products in the neighborhood:

$$g_{size}(N_\lambda(\gamma|\Phi),\lambda_{size}^{limit})=N_\lambda(\gamma|\Phi)=K\leq \lambda_{size}^{limit}$$

Apply an absolute threshold on consistency (absolute consistency radius):

$$g_{size}(N_\lambda(\gamma|\Phi),\lambda_{size}^{absolute-threshold})=\phi(\gamma,x_K)\geq \lambda_{size}^{absolute-threshold}$$

Apply a relative threshold on the consistency between target and neighborhood product:

$$g_{size}(N_\lambda(\gamma|\Phi), \lambda_{size}) = \frac{\phi(\gamma, x_K)}{\phi(\gamma, x_1)} \geq \lambda_{size}^{relative-threshold}$$

Business Decisions based on Product Neighborhoods

Product neighborhoods may be used in several retail business decisions. Examples of some are given below:

Product Placement—To increase customer experience resulting in increased customer loyalty and wallet share for the retailer, it may be useful to organize the store in such a way that finding products that its customers need is easy. This applies to both the store and the web layout. Currently, stores are organized so all products that belong to the same category or department are placed together. There are no rules of thumb, however, how the products may be organized within a category or categories may be organized within the departments or how the departments may be organized within the store. Product neighborhood at the department and category level may be used to answer such questions. The general principle is that for every product category, its neighboring categories in the product space should be placed nearby this category.

Customized store Optimization—Product placement is a piecemeal solution for the overall problem of store optimization. PeaCoCk graphs and product neighborhoods derived from them may be used to optimize the store layout. Store layout may be formulated as a multi-resolution constrained optimization problem. First, the departments are optimally placed in the store. Second, the categories within each department are placed relative to each other in an optimal fashion, and so on. Since PeaCoCk graphs may be customized by stores, each store may be independently optimized based on its own co-occurrence consistency.

Influence based Strategic Promotions—Several retail business decisions such as pricing optimization, cross-sell, up-sell, etc. depend on how much a product influences the sale of other products. PeaCoCk graphs provide a framework for creating such product influence models based on product neighborhoods. In the next Section, two co-occurrence based product properties: product density and product diversity are defined. These properties may be used appropriately to strategically promote these products to influence the sale of other products with a wide variety of overall business goals.

Neighborhood based Product Properties

As discussed above, a number of direct and indirect product properties were introduced. The direct properties such as manufacturer, hierarchy level, etc. are part of the product dictionary. Indirect properties such as total revenue, margin percent per customer, etc. may be derived by simple OLAP statistics on transaction data. In the following discussion we introduce two more product properties that are based on the neighborhood of the product in the product graph: Value-based Product Density and Value-based Product Diversity.

Value-based Product Density

If the business goal for the retailer is to increase the sale of high margin products or high revenue products, a direct approach would be to promote those products more aggressively. An indirect approach would be to promote those products that influence the sale of high margin or high revenue products. This principle can be generalized whereby if the business goal is related to a particular product property then a value-based product density based on its product neighborhood may be defined for each product.

For a given product neighborhood, i.e. neighborhood constraints, consistency measure, and product value-property $v$ (revenue, frequency, etc.), the value-density of a product is defined as the linear combination of the follows:

$$D_v(\gamma|\lambda,\Phi,\theta) = \Sigma_{x \in N_\lambda(\gamma|\Phi)} w(x|\gamma,\theta,\Phi) v(x)$$

Where:
  $w(\gamma|x, \theta, \Phi)$=weight-of-influence of the neighboring product x on the target product $\gamma$
  $v(x)$=value of product x with respect to which the value-density is computed; and
  $\theta = \{\theta_1, \theta_2, \ldots\}$=set of parameters associated with the weight function.
An example of the Gibbs weight function is:

$$w(x|\gamma, \theta, \Phi) = \phi(\gamma, x)^{\theta_1} \times \frac{\exp(\theta_2 \times \phi(\gamma, x))}{\sum_{x' \in N_\lambda(\gamma|\Phi)} \exp(\theta_2 \times \phi(\gamma, x'))} : \theta_1 \in \{0,1\},$$

$$\theta_2 \in [0, \infty]$$

The parameter $\theta_2$ can be interpreted as the temperature for the Gibb's distribution. When the parameter $\theta_1=0$ the weights are normalized otherwise the weights take the consistency into account.

Value-based product densities may be used in a number of ways. In the recommendation engine post processing, for example, the value-based density may be used to adjust the recommendation score for different objective functions.

Value-Based Product Diversity

Sometimes the business objective of a retailer is to increase diversity of a customer shopping behavior, i.e. if the customer shops in only one department or category of the retailer, then one way to increase the customer's wallet share is to diversify his purchases in other related categories. This can be accomplished in several ways, for example, by increasing (a) cross-traffic across departments, (b) cross-sell across multiple categories, or (c) diversity of the market basket. PeaCoCk graphs may be used to define value-based product diversity of each product. In recommendation engine post-processing, this score may be used to push high diversity score products to specific customers.

For every product $\gamma$, product property $v$, and product level $l$ above the level of product $\gamma$, value based product diversity is defined as the variability in the product density along different categories at level $l$:

$$D_v(\gamma|\lambda_{scope}=u_l,\Phi,\theta)=D_v(\gamma|m,\Phi,\theta): \forall m \in \{1, \ldots, M_l\}$$

Diversity should be low (say zero) if all the neighbors of the products are in the same category as the product itself, otherwise the diversity is high. An example of such a function is:

$$\Delta D_v(\gamma|l, \Phi, \theta) = 1 - \frac{D_v(\gamma|\Phi, m(\gamma), \theta)}{\sum_{m=1}^{M_l} D_v(\gamma|\Phi, m, \theta)} : \forall m \in \{1, \ldots, M_l\}$$

Product Bundles

One of the most important types of insight in retail pertains to product affinities or product groupings of products that are "co-purchased" in the same context. In the following discussion describes the application of PeaCoCk in finding, what we call, "Product bundles" in a highly scalable, generalized, and efficient way that they exceed both the quality and efficiency of the results of traditional frequency based market basket approaches. A large body of research in market-basket-analysis is focused on efficiently finding frequent item-sets, i.e. a set of products that are purchased in the same market basket. The support of an item-set is the number of market baskets in which it or its superset is purchased. The confidence of any subset of an item-set is the conditional probability that the subset will be purchased, given that the complimentary subset is purchased. Algorithms have been developed for breadth-first search of high support item-sets. Due to the reasons explained above, the results of such analysis have been largely unusable because this frequency based approach misses the fundamental observation that the customer behavior is a mixture of projections of latent behaviors. As a result, to find one actionable and insightful item-set, the support threshold has to be lowered so that typically millions of spurious item-sets have to be looked at.

PeaCoCk uses transaction data to first create only pair-wise co-occurrence consistency relationships between products. These are then used to find logical bundles of more than two products. PeaCoCk Product bundles and algorithm based item-sets are product sets, but they are very different in the way they are created and characterized.

Definition of a Logical Product Bundle

A PeaCoCk product bundle may be defined as a Soft Clique (completely connected sub-graphs) in the weighted PeaCoCk graph, i.e. a product bundle is a set of products such that the co-occurrence consistency strength between all pairs of products is high. FIG. 4 shows examples of some product bundles. The discussion above explained that the generalization power of PeaCoCk occurs because it extracts only pair-wise co-occurrence consistency strengths from mixture of projections of latent purchase behaviors and uses this to find logical structures instead of actual structures in these PeaCoCk graphs.

PeaCoCk uses a proprietary measure called bundleness to quantify the cohesiveness or compactness of a product bundle. The cohesiveness of a product bundle is considered high if every product in the product bundle is highly connected to every other product in the bundle. The bundleness in turn is defined as an aggregation of the contribution of each product in the bundle. There are two ways in which a product contributes to a bundle in which it belongs: (a) It can either be the principal or driver or causal product for the bundle or (b) it can be the peripheral or accessory product for the bundle. For example, in the bundle shown in FIG. 6, the Notebook is the principal product and the mouse is the peripheral product of the bundle. In PeaCoCk, we quantify a single measure of seedness of a product in a bundle to quantify its contribution. If the consistency measure used implies causality, then high centrality products cause the bundle.

In general, the seedness of a product in a bundle is defined as the contribution or density of this product in the bundle. Thus the bundleness quantification is a two step process. In the first, seedness computation stage, the seedness of each product is computed and in the second, seedness aggregation stage, the seedness of all products is aggregated to compute the overall bundleness.

Seedness Computation

The seedness of a product in a bundle is loosely defined as the contribution or density of a product to a bundle. There are two roles that a product may play in a product bundle:

Influencer or principal product in the bundle—The Authority products

Follower or peripheral product in the bundle—The Hub products

Borrowing terminology from the analysis of Web structure, we use the Klineberg's Hubs and Authority formulation in the seedness computation as follows:

Consider a product bundle: $x = \{x_1, \ldots, x_n\}$ of $\eta$ products. The n×n co-occurrence consistency sub-matrix for this bundle is defined by:

$$\Phi(x) = [\phi_{i,j} = \phi(x_i, x_j)].$$

Note that depending on the consistency measure, this could either be symmetric or non-symmetric. For each product in the bundle, we define two types of scores:

Authority (or Influencer) Score:

$$a(x|\Phi) = (a_1 = a(x_1|x,\Phi), \ldots, a_i = a(x_i|x,\Phi), \ldots, a_n = a(x_n|x,\Phi))$$

Hubness (or Follower) Score:

$$h(x|\Phi) = (h_1 = h(x_1|x,\Phi), \ldots, h_i = h(x_i|x,\Phi), \ldots, h_n = h(x_n|x,\Phi))$$

These scores are initially set to 1 for all the products are iteratively updated based on the following definitions: Authority (Influencer score of a product is high if receives a high support from important hubs (followers) and Hubness score of a product is high if it gives high support to important authorities.

--- a, h = GenerateSeedness(x, $\Phi$, $\epsilon_{min}$)

Initialize $\epsilon \leftarrow$ Inf $a^{(0)} \leftarrow [1, 1, \ldots, 1]; k \leftarrow 0$ $h^{(0)} \leftarrow [1, 1, \ldots, 1]; l \leftarrow 0$ While ($\epsilon \geq \epsilon_{min}$)

-continued

Normalize Hubness and Update Authority Measure $$\hat{h}^{(l)} \leftarrow [\hat{h}_1^{(l)}, \ldots, \hat{h}_n^{(l)}] \text{ where } \hat{h}_i^{(l)} \leftarrow \frac{h_i^{(l)}}{\|h^{(l)}\|_2}$$

$$a^{(k+1)} \leftarrow [a_1^{(k+1)}, \ldots, a_n^{(k+1)}] \text{ where } a_i^{(k+1)} \leftarrow \sum_{j=1}^{n} \phi(x_i | x_j) \hat{h}_j^{(l)}$$

$k \leftarrow k + 1$

Normalize Authority and Update Hubness Measure $$\hat{a}^{(k)} \leftarrow [\hat{a}_1^{(k)}, \ldots, \hat{a}_n^{(k)}] \text{ where } \hat{a}_i^{(k)} \leftarrow \frac{a_i^{(k)}}{\|a^{(k)}\|_2}$$

$$h^{(l+1)} \leftarrow [h_1^{(l+1)}, \ldots, h_n^{(l+1)}] \text{ where } h_i^{(l+1)} \leftarrow \sum_{j=1}^{n} \phi(x_j | x_i) \hat{a}_j^{(k)}$$

$l \leftarrow l + 1$

If ($k \geq 2$) and ($l \geq 2$)

$$\epsilon \leftarrow 1 - \min\left\{\hat{a}^{(k)^T} \hat{a}^{(k)}, \hat{h}^{(l)^T} \hat{h}^{(l)}\right\}$$

---

Algorithm 3: Computing the Hubs (Follower Score) and Authority (Influencer Score) in a Product Bundle The hub and authority measure converge to the first Eigen Vectors of following matrices:

$$a \equiv a^{(\infty)} \leftarrow \text{eig}_1[\Phi(x)\Phi(x)^T]$$

$$h \equiv h^{(\infty)} \leftarrow \text{eig}_1[\Phi(x)^T\Phi(x)]$$

Where $$\Phi(x) = [\phi_{i,j} = \phi(x_i, x_j)]$$

If the consistency matrices are symmetric, the hubs and authority scores are the same. If they are non-symmetric, the hubs and authority measures are different. We only consider symmetric consistency measures and hence would only consider authority measures to quantify bundleness of a product bundle.

Seedness Aggregation

There are several ways of aggregating the seedness values of all the products in the product bundle. PeaCoCk uses a Gibbs aggregation for this purpose:

$$\pi(x|\lambda, \Phi) = \frac{\sum_{i=1}^{n} a(x_i|x, \Phi) \times \exp[\lambda \times a(x_i|x, \Phi)]}{\sum_{i=1}^{n} \exp[\lambda \times a(x_i|x, \Phi)]} : \lambda \in [-\infty, +\infty]$$

Different settings of the temperature parameter λ yield different aggregation functions:

$$\pi(x|\lambda = -\infty, \Phi) = \min_{i=1\ldots n} \{a(x_i|x, \Phi)\}$$

$$\pi(x|\lambda = 0, \Phi) = \operatorname*{avg}_{i=1\ldots n} \{a(x_i|x, \Phi)\} = \frac{1}{n}\sum_{i=1}^{n} a(x_i|x, \Phi)$$

$$\pi(x|\lambda = \infty, \Phi) = \max_{i=1\ldots n} \{a(x_i|x, \Phi)\}$$

Although this defines a wide range of bundleness functions, by the definition of cohesiveness, i.e. every product should be highly connected to every other product in the product bundle, the most appropriate definition of bundleness would be based on the minimum temperature:

$$\text{Bundleness: } \pi(x|\Phi) = \pi(x|\lambda = -\infty, \Phi) = \min_{i=1\ldots n} \{a(x_i|x, \Phi)\}$$

Algorithms for finding Cohesive Product Bundles

Similar to the automated item-set mining, the PeaCoCk affinity analysis engine provides for automatically finding high consistency cohesive product bundles given the above definition of cohesiveness and a market basket coo-occurrence consistency measure. Essentially the goal is to find these optimal soft-cliques in the PeaCoCk graphs. We first define the meaning of optimal in the context of a product bundle and note that this is an NP hard problem. Following this, we describe two broad classes of greedy algorithms: depth first and breadth first methods.

Problem Formulation

The overall problem of finding all cohesive product bundles in a product space may be formulated in terms of the following simple problem: Given A PeaCoCk graph represented by an n×n consistency matrix Φ over product universe U A set of candidate products that may be in the product bundles:

$$C \subseteq U$$

Where, any product outside this candidate set cannot be part of the product bundle A set of foundation products that must be in the product bundles:

$$F \subseteq C \subseteq U$$

Boundary conditions:
F=∅, C=U ⇒ All bundles at the product level of the universe
F=C ⇒ One bundle: F The problem is to find a set of all locally optimal product bundles $x = \{x_1, \ldots, x_n\}$ of size two or more such that:

$$F \subseteq x \subseteq C$$

$$\pi(x|\Phi) \geq \pi(x'|\Phi) : \forall x' \in B\text{Neb}(x|F,C)$$

Where:

$B\text{Neb}(x|F, C)$ = Bundle Neighborhood of bundle $x$

The bundle-neighborhood of a bundle is the set of all feasible bundles that may be obtained by either removing a non-foundation product from it or by adding a single candidate product to it.

$$B\text{Neb}(x|F,C) = B\text{NebGrow}(x|F,C) \cup B\text{NebShrink}(x|F,C)$$

$$B\text{NebGrow}(x|F,C) = \{x' = x \oplus x : \forall x \in C - x\}$$

$$B\text{NebShrink}(x|F,C) = \{x' = x \setminus x : \forall x \in x - F\}$$

In other words, a bundle x is local optima for a given candidate set C if:

$$\pi(x|\Phi) \geq \max_{x \in C-x} \pi(x \oplus x|\Phi)$$

$$\pi(x|\Phi) \geq \max_{x \in x-F} \pi(x \setminus x|\Phi)$$

Figure 13:
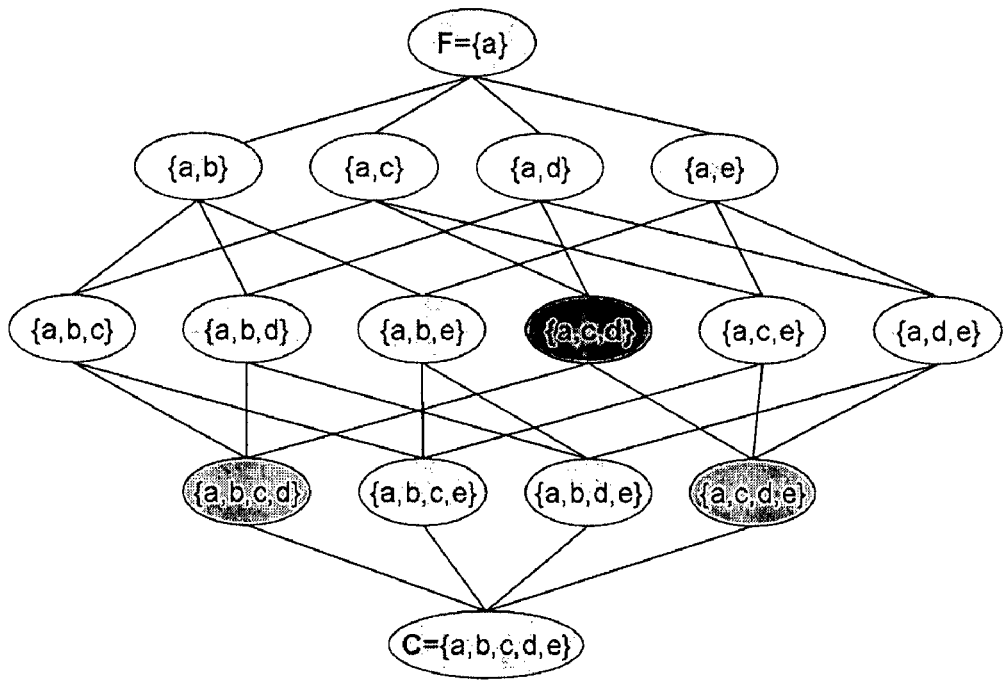
FIG. 13 shows a discrete bundle lattice space used to define a locally optimal product bundle for Algorithms 4 and 5.

The definition of a bundle as a subset of products bounded by a the foundation set F (as a subset of every product bundle) and a candidate set C (as a superset of every product bundle) together with the definition of the neighborhood function defined above results in an abstraction called the Bundle Lattice-Space (BLS). FIG. 13 shows an example of a bundle lattice space bounded by a foundation set and a candidate set. Each point in this space is a feasible product bundle. A measure of bundleness is associated with each bundle. It also shows examples of the BShrink and BGrow neighbors of a product bundle. If the product bundle is locally optimal then all its neighbors should have a smaller bundleness than it has.

The BGrow and BShrink sets may be further partitioned into two subsets each depending on whether the neighboring bundle has a higher or lower bundleness as factored by a slack-parameter θ:

$$BGrow(x|C) = BGrow_+(x|C, \pi_\lambda, \theta) \cup BGrow_-(x|C, \pi_\lambda, \theta)$$
$$Grow_+(x|C, \pi_\lambda, \theta) = \{x' \in BGrow(x|C) | \pi_\lambda(x') \geq \theta \times \pi_\lambda(x)\}$$
$$BGrow_-(x|C, \pi_\lambda, \theta) = \{x' \in BGrow(x|C) | \pi_\lambda(x') < \theta \times \pi_\lambda(x)\}$$

$$BShrink(x|F) = BShrink_+(x|F, \pi_\lambda, \theta) \cup BShrink_-(x|F, \pi_\lambda, \theta)$$
$$BShrink_+(x|F, \pi_\lambda, \theta) = \{x' \in BShrink(x|F) | \pi_\lambda(x') \geq \theta \times \pi_\lambda(x)\}$$
$$BShrink_-(x|F, \pi_\lambda, \theta) = \{x' \in BShrink(x|F) | \pi_\lambda(x') < \theta \times \pi_\lambda(x)\}$$

The condition for optimality may be stated in a number of ways:

Bundle $x$ is Locally Optimal for a given Φ, $C$, $F$, $\pi_\lambda$ if:
$IsOptimal(x|\Phi, C, F, \pi_\lambda)$
$= \pi_\lambda(x|\Phi) \geq \max\{\max_{x \in C-x} \pi_\lambda(x \oplus x|\Phi), \max_{x \in x-F} \pi_\lambda(x \setminus x|\Phi)\}$
$= (BGrow_+(x|C, \pi_\lambda, 1) = \emptyset) \text{ and } (BShrink_+(x|C, \pi_\lambda, 1) = \emptyset)$ For a given candidate set C and foundation set F, there are $O(2^{|C|-|F|})$ possible bundles to evaluate in an exhaustive approach. Finding a locally optimal bundle is NP Complete because it reduces to the Clique problem in the simple case that the Authority measure (used to calculate your bundleness metric) is "1" or "0", depending on whether a node is fully connected to other nodes in the bundle. The Clique problem (determining if a graph has a clique of a certain size K) is NP Complete Depth First Greedy Algorithms Depth first class of algorithms start with a single bundle and apply a sequence of grow and shrink operations to find as many locally optimal bundles as possible. In addition to the consistency matrix, $\Phi$, the candidate set, C, and the foundation set, F, a depth first bundle search algorithm also requires: (1) Root Set, R containing root-bundles to start each the depth search, (2) Explored Set, Z containing the set of product bundles that have already been explored. A typical depth first algorithm starts off by first creating a Root-Set. From this root-set, it picks one root at a time and performs a depth first search on it by adding/deleting an product from it until local optima is reached. In the process, it may create additional roots-bundles and add to the root set. The process finishes when all the roots have been exhausted. Algorithm 4 below describes how PeaCoCk uses Depth first search to create locally optimal product bundles.

---

$B = \text{DepthFirstBundle}(F, C, \Phi, \pi_\lambda, \theta)$

Initialize
    Root: $R = \{r_1 = F\}$
    Set of optimal bundles: $B = \emptyset$
    Set of explored bundles: $Z = \emptyset$
While ($R \neq \emptyset$)
    $x \leftarrow \arg \max_{r \in R} \pi_\lambda(r | \Phi)$ $R \leftarrow R \setminus x; Z \leftarrow Z \cup x$ If $(\text{IsOptimal}(x | \Phi, C, F, \pi_\lambda)) \Rightarrow B \leftarrow B \cup x$ $Z \leftarrow Z \cup \text{BGrow}_-(x | C, \pi_\lambda, 1) \cup \text{BShrink}_-(x | F, \pi_\lambda, 1)$ $R \leftarrow R \cup \text{BGrow}_+(x | C, \pi_\lambda, \theta) \cup \text{BShrink}_+(x | F, \pi_\lambda, \theta)$ $R \leftarrow R \setminus Z$
Return B

---

Algorithm 4: Depth First Bundle Creation

A key observation that makes this algorithm efficient is that for each bundle x, any of its neighbors in the lattice space with bundleness less than the bundleness of x cannot be local optima. This is used to prune out a number of bundles quickly to make the search faster. Efficient implementation for maintaining the explored set Z for quick look-up and the root set R for quick way of finding the maximum makes this very efficient. The parameter $\theta$ controls the stringency of the greediness. It is typically in the range of 0 to infinity with 1 being the typical value to use.

Breadth First Greedy Algorithms

An-other class of greedy algorithms for finding locally optimal bundles is the Breadth First approach. Here, the search for optimal bundles of size k+1 happens only after all the bundles of size k have been explored. The algorithm presented below is similar to the algorithm used in standard market basket analysis. There are two main differences in the PeaCoCk approach and that used for standard market basket analysis:

(1) Quality: the standard market basket analysis algorithm seeks actual high support item-sets while PeaCoCk seeks logical high consistency bundles. This is a very big qualitative difference in the nature, interpretation and usability of the resulting bundles from the two methods. This distinction is already discussed above.

(2) Efficiency: the standard market basket analysis algorithm requires a pass through the data after each iteration to compute the support of each item-set, while PeaCoCk uses the co-occurrence matrix to compute the bundleness without making a pass through the data. This makes PeaCoCk extremely efficient compared to the standard market basket analysis algorithm algorithm.

PeaCoCk's breadth-first class of algorithms for finding locally optimal product bundles start from the foundation set and in each iteration maintains and grows a list of potentially optimal bundles to the next size of product bundles. The standard market basket analysis algorithm monotonic property also applies to a class of bundleness functions where the parameter $\lambda$ is low for example: $\pi_{-\infty}(x | \Phi)$. In other words, for bundleness measures, a bundle may have high bundleness only if all of its subsets of one size less have high bundleness. This property is used in a way similar to the standard market basket analysis algorithm to find locally optimal bundles in the Algorithm 5 described below. In addition to the consistency matrix, $\Phi$, the candidate set, C, and the foundation set, F, a breadth first bundle search algorithm also requires a Potentials Set, $P_s$ of bundles of size s that have a potential to grow into an optimal bundle.

---

$B = \text{BreadthFirstBundle}(F, C, \Phi, \pi_\lambda, \theta, s_{max})$

Initialize
    Size $s \leftarrow 1; P_s \leftarrow C$

Set of optimal bundles: $B \leftarrow \emptyset$
While ($s \leq \min\{s_{max}, |C|\}$)
    $Q_{s+1} \leftarrow \bigcup_{x \in P_s} \text{BGrow}_+(x | C, \pi_\lambda, \theta)$ $P_{s+1} \leftarrow \{x \in Q_{s+1} | \text{BShrink}(x | F) \subseteq P_s\}$ //

All subsets of x are in $P_s$ $s \leftarrow s + 1$ $\forall x \in P_s : \text{If } (\text{IsOptimal}(x | \Phi, C, F, \pi_\lambda)) \Rightarrow B \leftarrow B \cup x$
Return B

---

Algorithm 5: Breadth First Bundle Creation

The Breadth vs. Depth first search methods both have their trade-offs in terms of completeness vs. time/space complexity. While the depth first algorithms are fast, the breadth first algorithms may result in more coverage i.e. find majority of locally optimal bundles.

Business Decisions based on Product Bundles

Product bundles may be used in several retail business decisions as well as in advanced analysis of retail data. Examples of some are given below:

Assortment Promotions—Often retailers create promotions that involve multiple products. For example, "buy product A and get product B half off" or "buy the entire bundle for 5% less." Historically, retailers have used their domain knowledge or market surveys to create these product assortments. Recently, with the advent of market basket analysis, some retailers have started using transaction data to find product bundles that make sense to customers. However, there has not been much success with traditional techniques because they could not find logical or natural product assortments for the reasons described earlier. The product bundles created by Pea-CoCk using the techniques described above may be used very effectively in creating product assortment promotions because they capture the latent intentions of customers in a way that was not possible before.

Cross-sell Campaigns—One of the key customer-centric decisions that a retailer is faced with is how to promote the right product to the right customer based on his transaction history. There are a number of ways of approaching this problem: Customer segmentation, transaction history based recommendation engine, and product bundle based product promotions. As described earlier, a customer typically purchases a projection of an intention at a store during a single visit. If a customer's current or recent purchases partially overlap with one or more bundles, decisions about the right products to promote to the customer may be derived from the products in those product bundles that they did not buy. This can be accomplished via a customer score and query templates associated product bundles as discussed later.

Latent Intentions Analysis—Traditionally, retail data mining is done at products level, there is a higher conceptual level in the retail domain—intentions. PeaCoCk product bundles (and later product phrases) are the higher order structures that may be thought of as proxy for the latent-logical intentions. In a later discussion we describe how a customer's transaction data may be scored against different product bundles. These scores may be used to characterize whether or not the associated intentions are reflected in the customer's transaction data. This opens up a number of possibilities on how to use these intentions. For example, intentions based customer segmentation, intentions based product recommendation, intention prediction based on past intentions, life style/stage modeling for customers, etc.

Business Projection Scores

Product bundles generated in PeaCoCk represent logical product associations that may or may not exist completely in the transaction data i.e. a single customer may have not bought all the products in a bundle as part of a single market basket. These product bundles may be analyzed by projecting them along the transaction data and creating bundle projection-scores, defined by the a bundle set, a market basket, and a projection scoring function:

Bundle-Set denoted by $B=\{b_k\}_{k=1}^{K}$ is the set of K product bundles against which bundle projection scores are computed. One can think of these as parameters for feature extractors.

Market Basket denoted by $x \subseteq U$ is a market basket obtained from the transaction data. In general, depending on the application, it could be either a single transaction basket or a union of recent customer transactions or all of customer transactions so far. One can think of these as the raw input data for which features are to be created.

Projection-Scoring Function denoted by $f(x|b_k, \Phi, \lambda)$ is a scoring function that may use the co-occurrence consistency matrix $\Phi$ and a set of parameters $\lambda$ and creates a numeric score. One can think of these as feature extractors.

PeaCoCk supports a large class of projection-scoring functions, for example:

Overlap Score that quantifies the relative overlap between a market basket and a product bundle $$f_{overlap-A}(x|b_k) = \frac{|x \cap b_k|}{|x \cup b_k|}; \quad f_{overlap-B}(x|b_k) = \frac{|x \cap b_k|}{\min\{|x|, |b_k|\}}$$

Coverage Score: that quantifies the fraction of product bundle purchased in the market basket.

$$f_{coverage}(x|b_k) = \frac{|x \cap b_k|}{|b_k|}; \quad f_{wtd-coverage}(x|b_k, \Phi, \lambda) = \frac{\pi_\lambda(x \cap b_k | \Phi)}{\pi_\lambda(b_k | \Phi)}$$

A market basket can now be represented by a set of K bundle-features:

$$f(x|B) = (f(x|b_1), f(x|b_1), \ldots, f(x|b_k))$$

Such a fixed length, intention level feature representation of a market basket, e.g. single visit, recent visits, entire customer, may be used in a number of applications such as intention-based clustering, intention based product recommendations, customer migration through intention-space, intention-based forecasting, etc.

Bundle based Product Recommendations

There are two ways of making decisions about which products should be promoted to which customer: (1) product-centric customer decisions about top customers for a given product and (2) customer-centric product decisions about top products for a given customer. Product bundles, in conjunction with customer transaction data and projection scores may be used to make both types of decisions. Consider, for example the coverage projection score. If we assume that (1) a product bundle represents a complete intention and (2) that a customer eventually buys either all the products associated with an intention or none of the products, then if a customer has a partial coverage for a bundle, the rest of the products in the bundle may be promoted to the customer. This can be done by first computing a bundle based propensity score for each customer n, product γ combination and is defined as a weighted combination of coverage scores across all available bundles:

$$s(\gamma, n|B) = \delta(\gamma \notin x^{(n)}) \times \frac{\sum_{b \in B} \delta(\gamma \in b) \times w(f_{overlap} * x|b)) \times f_{coverage}(x|b)}{\sum_{b \in B} \delta(\gamma \in b) \times w(f_{overlap}(x|b))}$$

Where:

$w(f_{overlap}(x|b))$=Monotonically increasing weight function of overlap $\delta$(boolean)=1 if boolean argument is true and 0 otherwise To make product centric customer decisions, we sort the scores across all customers for a particular product in a descending order and pick the top customers. To make customer centric product decisions, all products are sorted for each customer in descending order and top products are picked.

Bridge Structures in PeaCoCk Graphs

There are two extensions of the product bundle structures: (1) Bridge structures that essentially contain more than one product bundles that share very small number of products, and (2) Product phases that are essentially bundles extended along time. The following discussion focuses on characterizing, discovering, analyzing, and using bridge structures.

Definition of a Logical Bridge Structure

Figure 5:
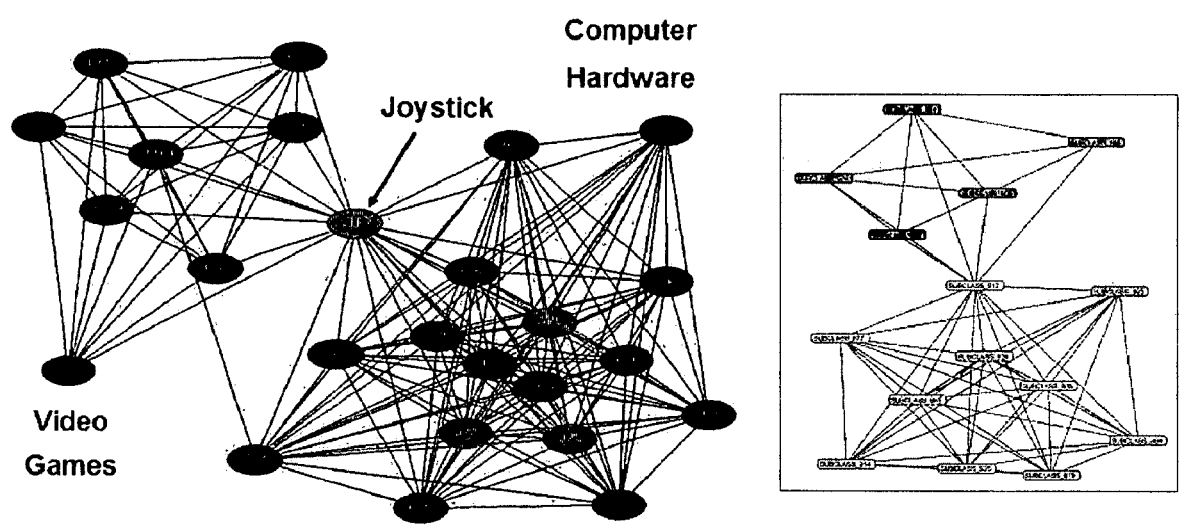
FIG. 5 shows a logical bundle of seven products.

In PeaCoCk a bridge structure is defined as a collection of two or more, otherwise disconnected or sparsely connected product groups, i.e. a product bundle or an individual product, that are connected by a single or small number of bridge product(s). Such structures may be very useful in increasing cross department traffic and strategic product promotions for increased lifetime value of a customer. FIG. 5 shows examples of two bridge structures. A logical bridge structure $G=\{g_0,g\}$ is formally defined by:

Bridge Product(s), $g_0$=the product(s) that bridge various groups in the bridge structure and Bridge Groups: $g=\{g_1, g_2, \ldots\}$=the ORDERED set of groups bridged by the structure.

Groups are ordered by the way they relate to the bridge product (more later)

Each group could be either a single product or a product bundle.

Motivation from Polyseme

Figure 14:
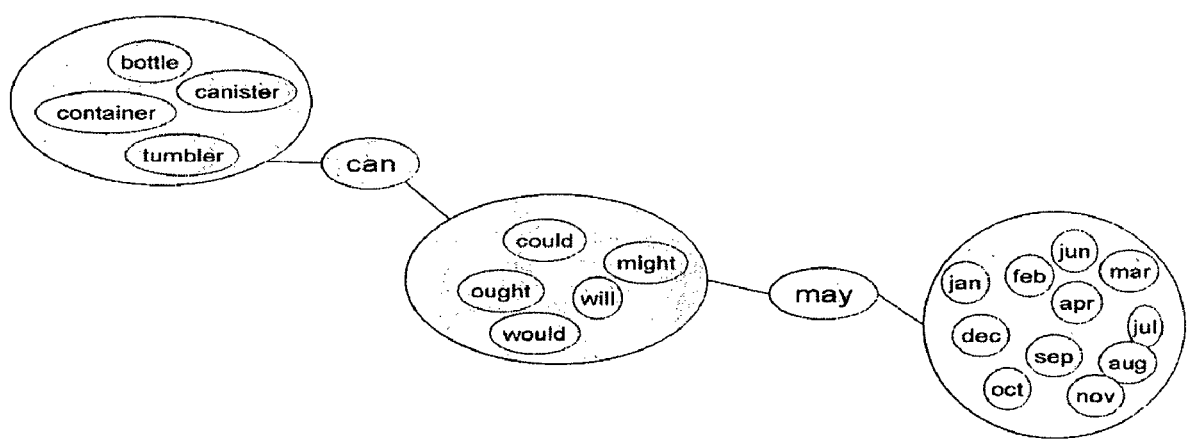
FIG. 14 shows an example of polyseme where a word can have multiple meanings. This is the motivation for bridge structures.

The key motivation for bridge structures in PeaCoCk product graphs comes from polyseme in language: A word may have more than one meaning. The right meaning is deduced from the context in which the word is used. FIG. 14 shows an example of two polysemous words: 'can' and 'may.' The word families shown herein are akin to the product bundles and a single word connecting the two word families is akin to a bridge structure. The only difference is that in FIG. 14 similarity between the meanings of the words is used while in PeaCoCk, consistency between products is used to find similar structures.

Bridgeness of a Bridge Structure

Earlier we defined a measure of cohesiveness for a bundle i.e. the "bundleness" measure. Similarly, for each bridge structure we define a measure called bridgeness that depends on two types of cohesiveness measures:

Intra-Group Cohesiveness is the aggregate of cohesiveness of each group. If the group has only one product, its cohesiveness is zero. But if the group has two or more products (as in a product bundle) then its cohesiveness can be measured in several ways. One way would be to use bundleness of the group as its cohesiveness. But in this definition, we do not use the bundleness measure because the same cannot be done for the other component of the bridgeness measure. Hence, we use a simple measure of intra-group cohesiveness based on the average of the consistency strength of all edges in the group.

Formally, for a given bridge structure: $G=\{g_0,g\}$, and co-occurrence consistency matrix $\Phi$, the intra-group cohesiveness for each group is given by:

$$intra(g_k \mid \Phi) = \begin{cases} 0 & \text{if } |g_k| = 1 \\ \frac{1}{|g_k|(|g_k|-1)} \sum_{x \in g_k} \sum_{x' \in g_k \setminus x} \phi(x, x') & \text{otherwise} \end{cases}$$

The overall intra-group cohesiveness may be defined as weighted combination with weight $w(g_k)$ for group k of the individual intra-group consistencies:

$$intra(g \mid \Phi, k_{\max}) = \frac{\sum_{k=1}^{k_{\max}} w(g_k) intra(g_k \mid \Phi)}{\sum_{k=1}^{k_{\max}} w(g_k)};$$

$$w(g_k) = \begin{cases} \delta(|g_k| > 1) \\ |g_k| \\ |g_k|(|g_k|-1) \end{cases}$$

Inter-Group Cohesiveness is the aggregate of the consistency connections going across the groups. Again, there are several ways of quantifying this but the definition used here is based on aggregating the inter-group cohesiveness between all pairs of groups and then taking a weighted average of all those. More formally, for every pair of groups: $g_i$ and $g_j$, the inter-group cohesiveness is defined as:

$$inter(g_i, g_j \mid \Phi) = inter(g_j, g_i \mid \Phi)$$
$$= \frac{1}{|g_i| \times |g_j|} \sum_{x \in g_i} \sum_{x' \in g_j} \phi(x, x')$$

The overall inter-group cohesiveness may be defined as weighted combination with weight $w(g_i, g_j)$ for group pair i and j:

$$inter(g \mid \Phi, k_{\max}) = \frac{\sum_{i=1}^{k_{\max}-1} \sum_{j=i+1}^{k_{\max}} w(g_i, g_j) inter(g_i, g_j \mid \Phi)}{\sum_{i=1}^{k_{\max}-1} \sum_{j=i+1}^{k_{\max}} w(g_i, g_j)};$$

$$w(g_i, g_j) = \begin{cases} 1 \\ |g_i| \times |g_j| \end{cases}$$

The bridgeness of a bridge structure involving the first $k_{max}$ groups of the bridge structure is defined to be high if the individual groups are relatively more cohesive i.e. their intra-group cohesiveness is higher, than the cohesiveness across the groups, i.e. their inter-group cohesiveness. Again a number of bridgeness measures can be created that satisfy this definition. For example:

$$\text{Bridgeness}(g \mid \Phi, k_{\max}) = 1 - \frac{intra(g \mid \Phi, k_{\max})}{inter(g \mid \Phi, k_{\max})}$$

Algorithms for finding Bridge Structure

A large number of graph theoretic, e.g. shortest path, connected components, and network flow based, algorithms may be used to find bridge structures as defined above. We describe two classes of algorithms to efficiently find bridge structures in the PeaCoCk graph: (1) bundle aggregation algorithm that uses pre-computed bundles to create bridge structures and (2) a successive bundling algorithm that starts from scratch and uses depth first search for successively create more bundles to add to the bridge structure.

(1) Bundle Overlap Algorithm

A bridge structure may be defined as a group of two or more bundles that share a small number of bridge products. An ideal bridge contains a single bridge product shared between two large bundles. Let B be the set of bundles found at any product level using the methods described above, from which to create bridge structures. The basic approach is to start with a root bundle, keep adding more and more bundles to it such that there is a non-zero overlap with the current set of bridge products.

This algorithm is very efficient because it uses pre-computed product bundles and only finds marginally overlapping groups, but it does not guarantee finding structures with high bridgeness and its performance depends on the quality of product bundles used. Finally, although it tries to minimize the overlap between groups or bundles, it does not guarantee a single bridge product.

---

$G = \text{BridgesByBundleAggregation}(B)$

Input $B = \{b_m\}_{m=1}^{M}$ = set of m product bundles

Initialize $G \leftarrow \emptyset$; $k \leftarrow 1$;

Foreach $m = 1 \ldots M$
    $C_m = \{1 \leq m' \neq m \leq M \mid b_m \cap b_{m'} \neq \emptyset\}$
    $l \leftarrow 1$; $g_l \leftarrow b_m$; $g_0^{(l)} \leftarrow b_m$
    While ($C_m \neq \emptyset$)
        $l \leftarrow l + 1$
        $\mu \leftarrow \arg\min_{m' \in C_m} |g_0^{(l)} \cap b_{m'}|$
        $g_0^{(l)} \leftarrow g_0^{(l-1)} \cap b_\mu$; $g_l \leftarrow b_\mu$
        $C_m \leftarrow \{m' \in C_m \setminus \mu \mid g_0^{(l)} \cap b_{m'} \neq \emptyset\}$
    if ($l \geq 2$) //Found a bridge structure
        Foreach $q = 2 \ldots l$
            $G_k \leftarrow \{g_0^{(q)}, g_1, \ldots, g_q\}$; $G \leftarrow G \oplus G_k$; $k \leftarrow k + 1$ Algorithm 6: Creating Bridge Structures from Bundle Aggregation

---

(2) Successive Bundling Algorithm

The bundle aggregation approach depends on pre-created product bundles and, hence, they may not be comprehensive in the sense that not all bundles or groups associated with a group might be discovered as the search for the groups is limited only to the pre-computed bundles. In the successive bundling approach, we start with a product as a potential bridge product, and grow product bundles using depth first approach such that the foundation set contains the product and the candidate set is limited to the neighborhood of the product. As a bundle is created and added to the bridge, it is removed from the neighborhood. In successive iterations, the reduced neighborhood is used as the candidate set and the process continues until all bundles are found. The process is then repeated for all products as potential bridges. This exhaustive yet efficient method yields a large number of viable bridges.

Before we describe the successive bundling algorithm, we define a GrowBundle function, Algorithm 7, used in it. This function takes in a candidate set, a foundation set, and an initial or root set of products and applies a sequence of grow and shrink operations to find the first locally optimal bundle it can find in the depth first mode.

---

$b = \text{GrowBundle}(x_0, C_0, \Phi, \pi_\lambda, \theta)$

Initialize $k \leftarrow |x_0|$; $b_k \leftarrow x_0$; $q_k \leftarrow \pi_\lambda(b_k)$ $C_k \leftarrow \left\{ x' \in C_0 \;\middle|\; \min_{x \in b_k} \{\phi(x, x')\} > 0 \right\}$ //
Connected to ALL products in the bundle While($C_k \neq \emptyset$)
    $\tilde{q} \leftarrow \max_{x \in C_k} \{\pi_\lambda(b_k \oplus x)\}$;

$\tilde{x} \leftarrow \arg\max_{x \in C_k} \{\pi_\lambda(b_k \oplus x)\}$ // Best product to add If $(\tilde{q} \leq \theta \times q_k) \Rightarrow$ Return $b_k$ $k \leftarrow k + 1$; $b_k \leftarrow b_{k-1} \oplus \tilde{x}$; $q_k \leftarrow \tilde{q}$ $C_k \leftarrow \{x' \in C_k \setminus \tilde{x} \mid \phi(\tilde{x}, x') > 0\}$ Return $b_k$ Algorithm 7: Greedy GrowBundle Function

---

The GrowBundle is called successively to find subsequent product bundles in a bridge structures as shown in the Successive bundling Algorithm 8 below. It requires a candidate set C from which the bridge and group products may be drawn (in general this could be all the products at a certain level), the consistency matrix, the bundleness function and bundleness threshold $\theta$ to control the stringency and the neighborhood parameter $\nu$ to control the scope and size of the bridge product neighborhood.

---

$G = \text{BridgesBySuccessiveBundling}(C, \Phi, \pi_\lambda, \theta, \nu)$

Initialize $G \leftarrow \emptyset$

Foreach $\gamma \in C$ //Consider each product as a potential bridge product $g_0 \leftarrow \{\gamma\}$; $l \leftarrow 0$;

$N \leftarrow C \cap N_\nu(\gamma \mid \Phi)$ // Candidate Neighborhood to grow bridge struct While ($N \neq \emptyset$)

-continued

G = BridgesBySuccessiveBundling(C, $\Phi$, $\pi_\lambda$, $\theta$, $\nu$)

$\gamma_0 \leftarrow \arg\max_{x \in N} \phi(\gamma, x)$ //
  Best product to start the next bundle
$x_0 \leftarrow \{\gamma, \gamma_0\}; l \leftarrow l + 1;$
$g_l \leftarrow$ GrowBundle($x_0$, N, $\Phi$, $\pi_\lambda$, $\theta$)
$N \leftarrow N \setminus g_l;$
If ($l > 1$)
  $G_\gamma \leftarrow \{g_0, g_1, \ldots, g_l\}; G \leftarrow G \oplus G_\gamma$ Algorithm 8: Creating Bridge Structures by Successive Bundling Special Bridge Structures So far there are no constraints imposed on how the bridge structures are created except for the candidate set. However, special bridge structures may be discovered by using appropriate constraints on the set of products that the bridge structure is allowed to grow from. One way to create special bridge structure is to define a special candidate sets for different roles in the bridges structure, e.g. bridge product role, group product role, instead of using a single candidate set.

Candidate set for Bridge products: This is the set of products that may be used as bridge products. A retailer might include products that have high price elasticity, or has coupons for these, or they are overstocked, etc. In other words bridge candidate products are those that can be easily promoted without much revenue or margin impact.

Candidate set for each of the product groups: This is the set of products that the retailer wants to find bridges across. For example, a retailer might want to find bridge products between department A and department B, or between products by manufacturer A and those by manufacturer B, or brand A and brand B, or high value products and low value products, etc. For any of these, appropriately chosen candidate set for the two (or more) product groups leads to the special bridge structures.

Algorithm 8 is modified to do special bridges as follows: Instead of sending a single candidate set, now there is one candidate set for the set of bridge products and one candidate set for (possibly each of the) product groups. Using the depth first bundling algorithm, product bundles are created such that they must include a candidate bridge product i.e. the foundation set contains the bridge product, and the remaining products of the bundle come from the candidate set of the corresponding group that are also the neighbors of the potential bridge product. High bridgeness structures are selected from the Cartesian product of bundles across the groups.

G = SpecialBridgesBySuccessiveBundling(C, $\Phi$, $\pi_\lambda$, $\theta$, $\nu$)

Input: C = $\{C_0, C_1, C_2\}$ //Different candidate sets for bridges and groups
Initialize G $\leftarrow \varnothing$
  Foreach $\gamma \in C_0$ //Consider each product as a potential bridge product
    Foreach $l = 1 \ldots 2;$ -continued G = SpecialBridgesBySuccessiveBundling(C, $\Phi$, $\pi_\lambda$, $\theta$, $\nu$)

$B_l \leftarrow$ DepthFirstBundle($\{\gamma\}$, $C_l \cap N_\nu(\gamma | \Phi)$, $\Phi$, $\pi_\lambda$, $\theta$)
Foreach $b_1 \in B_1$
  Foreach $b_2 \in B_2$
    $G \leftarrow G \oplus \{g_0 = \{\gamma\}, g_1 = b_1, g_2 = b_2\}$
Sort all bridges in G in descending order of their bridgeness. Pick top M
Return G Algorithm 9: Creating Special Bridge Structures Business Decisions from Bridge Structures Bridge structures embedded in PeaCoCk graphs may provide insights about what products link otherwise disconnected products. Such insight may be used in a number of ways:

Cross-Department Traffic: Typically, most intentional purchases are limited to a single or small number of departments or product categories. A retailer's business objective might be to increase the customer's wallet share by inciting such single/limited department customers to explore other departments in the store. Bridge structures provide a way to find products that may be used to create precisely such incitements. For example, a customer who stays in a low margin electronics department may be incited to check-out the high margin jewelry department if a bridge product between the two departments, such as a wrist watch or its signage, is placed strategically. Special bridge structures such as the ones described above may be used to identify such bridge products between specific departments.

Strategic Product promotions of increasing Customer value: One of the business objectives for a retailer may be to increase customer's value by moving them from their current purchase behavior to an alternative higher value behavior. This again may be achieved by strategically promoting the right bridge product between the two groups of products. PeaCoCk provides a lot of flexibility in how a low value and high value behavior is characterized in terms of product groups associated with such behavior and then use the special bridge structures to find bridges between the two.

Increasing customer Diversity: Diversity of a customer's market basket is defined by the number of different departments or categories the customer shops in at the retailer. The larger the customer diversity, typically, higher the wallet share for the retailer. Bridge products may be used strategically to increase customer diversity by using special cross-department bridge structures.

Bridge Projection Scores

Both product bundles and bridge structures are logical structures as opposed to actual structures. Therefore, typically, a single customer buys either none of the products or a subset of the products associated with such structures. Earlier we described several ways of projecting a customer against a bundle resulting in various bundle-projection-scores that may be used in either making decisions directly or used for further analysis. Similarly, bridge structures may also be used to create a number of bridge-projection-scores. These scores are defined by a bundle structure, a market basket, and a projection scoring function:

Bridge-structure denoted by $G=\{g_l\}_{l=0}^L$ contains one or more bridge products connecting two or more product groups.

Market Basket denoted by $x \subseteq U$ is a market basket obtained from the transaction data. In general, depending on the application, it could be either a single transaction basket or a union of recent customer transactions or all of customer transactions so far.

Projection-Scoring Function denoted by $f(x|G, \Phi, \lambda)$ is a scoring function that may use the co-occurrence consistency matrix $\Phi$ and a set of parameters $\lambda$ and creates a numeric score.

There are several projection scores that may be computed from a bridge structure and market basket combination. For example:

Bridge-Purchased Indicator: A binary function that indicates whether a bridge product of the bridge structure is in the market basket:

$$f_{indicator}(x | G, 0) = \delta(x \cap g_0 \neq \emptyset)$$

Group-Purchase Indicator: A binary function for each group in the bridge structure that indicates whether a product from that group is in the market basket.

$$f_{indicator}(x | G, \ell) = \delta(x \cap g_\ell \neq \emptyset) : \forall \ell = 1 \ldots L$$

Group-Overlap Scores: For each group in the bridge structure, the overlap of that group in the market basket (as defined for product bundles).

$$f_{overlap-A}(x | G, \ell) = \frac{|x \cap g_\ell|}{|x \cup g_\ell|};$$
$$f_{overlap-B}(x | G, \ell) = \frac{|x \cap g_\ell|}{\min\{|x|, |g_\ell|\}} : \forall \ell = 1 \ldots L$$

Group-Coverage Scores: For each group in the bridge structure, the coverage of that group in the market basket (as defined for product bundles).

$$f_{coverage}(x | G, \ell) = \frac{|x \cap g_\ell|}{|g_\ell|};$$
$$f_{wtd-coverage}(x | G, \ell, \Phi, \lambda) = \frac{\pi_\lambda(x \cap g_\ell | \Phi)}{\pi_\lambda(g_\ell | \Phi)}$$

Group-Aggregate Scores: A number of aggregations of the group coverage and group overlap scores may also be created from these group scores.

Product Phrases or Purchase Sequences

Product bundles are created using market basket context. The market basket context loses the temporal aspect of product relationships, however broad time window it may use. In the following discussion we define an extension of product bundles in another higher order structure known as a product phrase or consistent purchase sequence created using the PeaCoCk framework. Essentially, a product phrase is a product bundle equivalent for purchase sequence context. Traditional frequency based methods extend the standard market basket algorithms to create high frequency purchase sequences. However, because transaction data is a mixture of projections of latent intensions that may extend across time, frequency based methods are limited in finding actionable, insightful, and logical product phrases. The same argument for product bundles also applies to product phrases.

PeaCoCk uses transaction data first to create only pair-wise co-occurrence consistency relationships between products by including both the market basket and purchase sequence contexts. This combination gives a tremendous power to PeaCoCk for representing complex higher order structures including product bundles, product phrases, and sequence of market baskets and quantify their co-occurrence consistency. In the following discussion we define a product phrase and present algorithms to create these phrases.

Definition of a Logical Product Phrase

A product phrase is defined as a logical product bundle across time. In other words, it is a consistent time-stamped sequence of products such that each product is consistently co-occurs with all others in the phrase with their relative time-lags. In its most general definition, a logical phrase subsumes the definition of a logical bundle and uses both market basket as well as purchase sequence contexts, i.e. a combination that is referred to as the Fluid Context in PeaCoCk, to create it.

Formally, a product phrase $\langle x, \Delta t \rangle$ is defined by two sets:

Product Set: $x = \{x_1, x_2, \ldots, x_n\}$ containing the set of products in the phrase.

Pair-wise Time Lags: $\Delta t = \{\Delta t_{ij} : 1 \leq i < j \leq n\}$ contains time-lags between all product pairs. Time lags are measured in a time resolution unit which could be days, weeks, months, quarters, or years depending on the application and retailer. The time-lags must satisfy the following constraints:

$$\Delta t_{ij} = \sum_{k=i}^{j-1} \Delta t_{k,k+1} \pm \varepsilon_{j-i} : \forall\, 1 \leq i < j \leq n$$

The slack parameter $\varepsilon_{\Delta i}$ determines how strictly these constraints are imposed depending on how far the products are in the phrase. Also, note that this definition includes product bundles as a special case where all time-lags are zero:

$$\langle x, 0 \rangle \text{ i.e. } \Delta t_{ij} = 0 : \forall\, 1 \leq i < j \leq n$$

Figure 15:
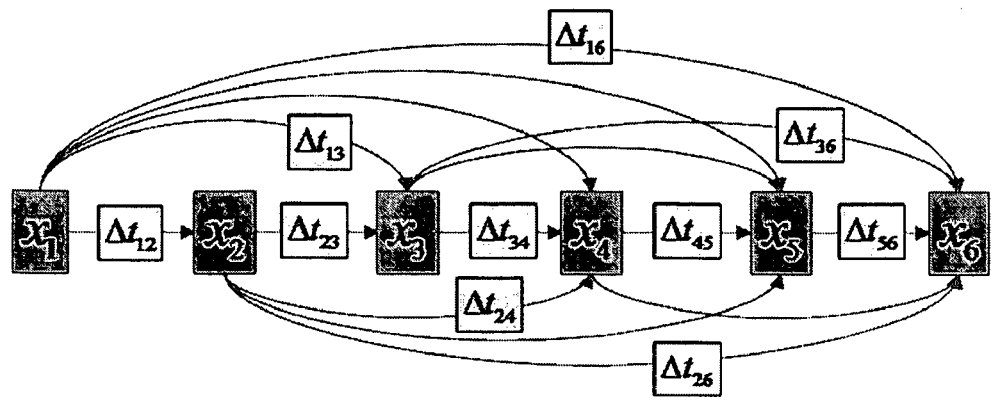
FIG. 15 shows an example of a product bundle with six products and time-lags between all pairs of products in the bundle.

FIG. 15 shows a product phrase with six products and some of the associated time-lags.

Fluid Context

The context rich PeaCoCk framework supports two broad types of contexts: market basket context and purchase sequence context. For exploring higher order structures as general as product phrases, as defined above, we need a combination of both these context types into a single context framework. This combination is known as the Fluid Context. Essentially fluid context is obtained by concatenating the two-dimensional co-occurrence matrices along the time-lag dimension. The first frame in this fluid context video is the market basket context ($\Delta \tau = 0$) with a window size equal to the time resolution. Subsequent frames are the purchase sequence contexts with their respective $\Delta \tau$'s. Fluid context is created in three steps:

Co-occurrence Count: Using the market basket and purchase sequence contexts, the four counts for all time-lags are computed as described earlier:

$$\eta(\alpha, \beta \mid \Delta\tau): \text{Co-occurence count}$$
$$\eta(\alpha, \bullet \mid \Delta\tau): \text{From Margin}$$
$$\eta(\bullet, \beta \mid \Delta\tau): \text{To Margin}$$
$$\eta(\bullet, \bullet \mid \Delta\tau): \text{Totals}$$

Temporal Smoothing: All the counts, i.e. co-occurrence, margins, and totals, are smoothed using a low-pass filter or a smoothing kernels with different shapes, i.e. rectangular, triangular, Gaussian, that replaces the raw count with a weighted average based on neighboring counts:

$$\hat{\eta}(\Delta t) = \frac{\sum_{\Delta t=\Delta\tau-\sigma}^{\Delta\tau+\sigma} w_\sigma(|\Delta\tau - \Delta t|)\eta(\Delta t)}{\sum_{\Delta t=\Delta\tau-\sigma}^{\Delta\tau+\sigma} w_\sigma(|\Delta\tau - \Delta t|)};$$

$$w_\sigma(t) = \begin{cases} 1 & \text{Rectangular window} \\ (1+\sigma-t) & \text{Triangular Window} \\ \exp[-0.5(t/\sigma)^2] & \text{Gaussian Window} \end{cases}$$

Consistency Calculation: The smoothed counts are then used to compute consistencies using any of the consistency measures provided above.

A fluid context is represented by a three dimensional matrix:

$$\Phi: U \times U \times \Delta T \to R: [\phi(\alpha, \beta \mid \Delta\tau)]: \forall \alpha, \beta \in U, \Delta\tau \in \Delta T = \{0, \ldots, \Delta T\}$$

Cohesiveness of a Product Phrase: "Phraseness"

Cohesiveness of a phrase is quantified by a measure called phraseness which is akin to the bundleness measure of cohesiveness of a product bundle. The only difference is that in product bundles, market basket context is used and in phrases, fluid context is used. The three-stage process for computing phraseness is similar to the process of computing bundleness:

Extract Phrase-Sub-matrix from Fluid Context Matrix: Given a fluid context matrix $\Phi$ and a phrase: $\langle x, \Delta t \rangle$ the non-symmetric phrase sub-matrix is given by:

$$\Phi(\langle x, \Delta t \rangle) = [\phi_{ij} = \phi(x_i, x_j \mid \Delta t_{ij})]_{1 \leq i,j \leq n}$$

Compute Seedness of each product: The seedness of each product in a phrase is computed using the same hubs and authority based Algorithm 3 used to compute the seedness in product bundles. Note however, that since the phrase sub-matrix is not symmetric, the hubness and authority measures of a product are different in general for a phrase. The seedness measure is associated with authority. The hubness of a product in the phrase indicates a follower role or tailness measure of the product.

$$a \equiv a^{(\infty)} \leftarrow eig_1[\Phi(\langle x, \Delta t \rangle)\Phi(\langle x, \Delta t \rangle)^T]$$
$$h \equiv h^{(\infty)} \leftarrow eig_1[\Phi(\langle x, \Delta t \rangle)^T \Phi(\langle x, \Delta t \rangle)]$$

Aggregate Phraseness: For the purposes of an overall cohesiveness of a phrase we don't distinguish between the seedness or tailness measure of a product and use the maximum or average of the two in aggregation.

$$\pi_\lambda(\langle x, \Delta t \rangle) \mid \Phi) = \frac{\sum_{i=1}^{n} q_i \times \exp[\lambda \times q_i]}{\sum_{i=1}^{n} \exp[\lambda \times q_i]}: \lambda \in [-\infty, +\infty]$$

$$q_i = \begin{cases} \max\{a(x_i \mid \langle x, \Delta t \rangle, \Phi), h(x_i \mid \langle x, \Delta t \rangle, \Phi)\}: \forall i = 1 \ldots n \\ \frac{a(x_i \mid \langle x, \Delta t \rangle, \Phi) + h(x_i \mid \langle x, \Delta t \rangle, \Phi)}{2}: \forall i = 1 \ldots n \end{cases}$$

Algorithms for finding Cohesive Product Phrases

Techniques described earlier for finding product bundles using market basket context based PeaCoCk graphs may be extended directly to find phrases by replacing the market basket context with fluid context and including additional search along the time-lag.

Insights and Business Decisions from Product Phrases

Product phrases may be used in a number of business decisions that span across time. For example:

Product Prediction: For any customer, if his transaction history is known, product phrases may be used to predict what product the customer might buy next and when. This is used in PeaCoCk's recommendation engine, as described later.

Demand Forecasting: Because each customer's future purchase can be predicted using purchase sequence analysis, aggregating these by each product gives a good estimate of when, which product might be sold more. This is especially true for grocery type retailers where the shelf-life of a number of consumables is relatively small and inventory management is a key cost affecting issue.

Career-path Analysis: Customers are not static entities: their life style and life stage change over time and so does their purchase behavior. Using key product phrases and product bundles, it is possible to predict where the customer is and which way he is heading.

Identifying Trigger products with long coat-tails: Often the purchase of a product might result in a series of purchases with or after this purchase. For example, a PC might result in a future purchase of a printer, cartridge, scanner, CD's, software, etc. Such products are called trigger products. High consistency, high value phrases may be used to identify key trigger products that result in the sale of a number of high-value products. Strategic promotion of these products can increase the overall life-time value of the customer.

PeaCoCk Recommendation Engine

Product neighborhoods, product bundles, bridge structures, and product phrases are all examples of product affinity applications of the PeaCoCk framework. These applications seek relationships between pairs of products resulting in a PeaCoCk graph and discover such higher order structures in it. Most of these applications are geared towards discovering actionable insights that span across a large number of customers. The following discussion describes a highly (a) customer centric, (b) data driven, (c) transaction oriented purchase behavior application of the PeaCoCk framework, i.e. the Recommendation Engine. Several sophisticated retailers, such as Amazon.com, have been using recommendation engine technology for several years now. The Holy Grail for such an application is to offer the right product to the right customer at the right time at the right price through the right channel so as to maximize the propensity that the customer actually take-up the offer and buys the product. A recommendation engine allows retailers to match their content with customer intent through a very systematic process that may be deployed in various channels and customer touch points.

The PeaCoCk framework lends itself very naturally to a recommendation engine application because it captures customer's purchase behavior in a very versatile, unique, and scalable manner in the form of PeaCoCk graphs. In the following discussion we introduce the various dimensions of a recommendation engine application and describe how increasingly complex and more sophisticated recommendation engines can be created from the PeaCoCk framework that can tell not just what is the right product but also when is the right time to offer that product to a particular customer.

Definition of a Recommendation Engine Application

Typically, a recommendation engine attempts to answer the following business question: Given the transaction history of a customer, what are the most likely products the customer is going to buy next? In PeaCoCk we take this definition to one step further and try to answer not just what product the customer will buy next but also when is he most likely to buy it. Thus, the recommendation engine has three essential dimensions:
1. Products—that are being considered for recommendation
2. Customers—to who one or more products are recommended; and
3. Time—at which recommendation of specific products to specific customers is made.

A general purpose recommendation engine should therefore be able to create a purchase propensity score for every combination of product, customer, and time, i.e. it takes the form of a three dimensional matrix:

Recommendation Propensity Score = $\rho(u, t | x, \Theta)$
Where:
$u$ = product to be recommended
$t$ = time at which recommendation is made
$x = \{\langle t_1, x_1 \rangle, \ldots, \langle t_L, x_L \rangle\}$ = customer transaction history
$\Theta$ = recommendation engine model parameters Such as recommendation system can be used to answer any of the following questions:
  What are the best products to recommend to a customer at a certain time, e.g. say today or next week?
  What are the best customers to whom a particular product should be recommended at a certain time?
  What is the best time to recommend a particular product to a particular customer?

These questions can be answered by fixing the two out of the three dimensions, the propensity score by the third dimension and picking the top scoring combination. The real challenge is in coming up with accurate propensity scores quickly for real-time deployments such as the web.

Recommendation Process

Figure 16:
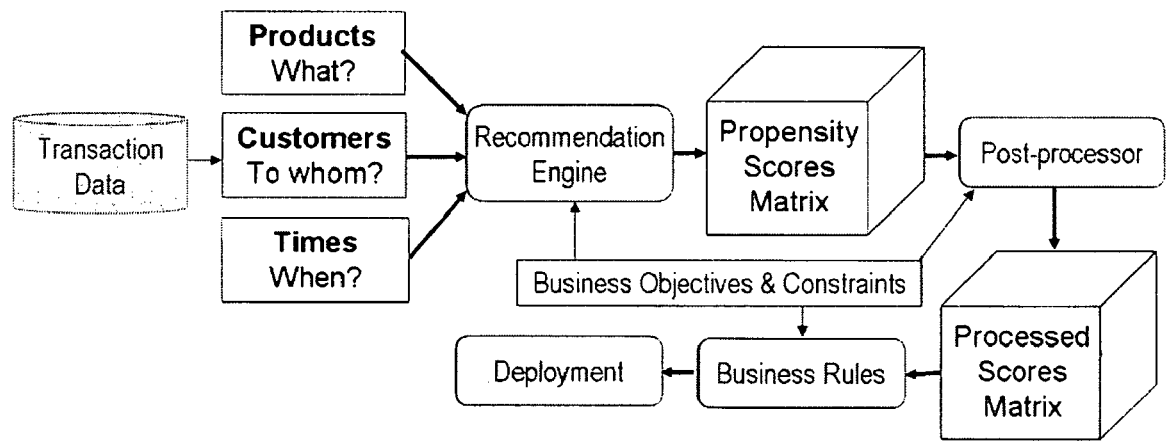
FIG. 16 shows the Recommendation Engine process.

FIG. 16 shows the recommendation process starting from transaction data to deployment. There are four main stages in the entire process.
(1) Recommendation Engine—takes the raw customer transaction history, the set of products in the recommendation pool and the set of times at which recommendations have to be made. It then generates a propensity score matrix described above with a score for each combination of customer, product, and time. Business constraints, e.g. recommend only to customers who bought in the last 30 days or recommend products only from a particular product category, may be used to filter or customize the three dimensions.
(2) Post-Processor—The recommendation engine uses only customer history to create propensity scores that capture potential customer intent. They do not capture retailer's intent. The post-processor allows the retailers to adjust the scores to reflect some of their business objectives. For example, a retailer might want to push the seasonal products or products that lead to increased revenue, margin, market basket size, or diversity. PeaCoCk provides a number of post-processors that may be used individually or in combination to adjust the propensity scores.
(3) Business Rules Engine—Some business constraints and objectives may be incorporated in the scores but others are implemented simply as business rules. For example, a retailer might want to limit the number of recommendations per product category, limit the total discount value given to a customer, etc. Such rules are implemented in the third stage where the propensity scores are used to create top R recommendations per customer.
(4) Channel Specific Deployment—Once the recommendations are created for each customer, the retailer has a choice to deliver those recommendations using various channels. For example, through direct mail or e-mail campaigns, through their web-site, through in-store coupons at the entry Kiosk or point of sale, or through a salesman. The decision about the right channel depends on the nature of the product being recommended and the customer's channel preferences. These decisions are made in the deployment stage.

Before we describe the recommendation engine and the post-processing stages, let us consider some important deployment issues with any recommendation engine.

Deployment Issues

There are several important issues that affect the nature of the deployment and functionality of a recommendation engine: (1) Recommendation Mode—products for a customer or customers for a product?; (2) Recommendation Triggers—Real-time vs. Batch mode?; and (3) Recommendation Scope—what aspects of a customer's transaction should be considered.

(1) Recommendation Modes: Customer vs. Product vs. Time

PeaCoCk recommendation engine can be configured to work in three modes depending on the business requirements.

Product-Centric Recommendations answers questions such as "What are the top customers to which a particular product should be offered at a specific time?" Such decisions may be necessary, for example, when a retailer has a limited number of coupons from a product manufacturer and he wants to use these coupons efficiently i.e. give these coupons to only those customers who actually use the coupons and therefore increase the conversion rate.

Customer-Centric Recommendations answers questions such as "What are the top products that a particular customer should be offered at a specific time?" Such decisions may be necessary, for example, when a retailer has a limited budget for a promotion campaign that involves multiple products and there is a limit on how many products he can promote to a single customer. Thus, the retailer may want to find that set of products that a particular customer is most likely to purchase based on his transaction history and other factors.

Time Centric Recommendations: answers questions such as "What are the best product and customer combinations at a specific time?" Such decisions may be necessary for example, when a retailer has a pool of products and a pool of customers to choose from and he wants to create an e-mail campaign for say next week and wants to limit the number of product offers per customer and yet optimize the conversion rate in the overall joint space.

The PeaCoCk definition of the recommendation engine allows all the three modes.

(2) Recommendation Triggers: Real-time vs. Batch-Mode

A recommendation decision might be triggered in a number of ways. Based on their decision time requirements, triggers may be classified as:

(a) Real-time or Near-Real time triggers require that the recommendation scores are updated based on the triggers. Examples of such triggers are:

Customer logs into a retailer's on-line store. Web page tailored based on transaction history. May be pre-computed but deployed in real-time.

Customer adds a product to cart. Transaction history is affected so the propensity scores need to be re-computed and new sets of recommendations need to be generated.

Customer checks-out in store or web-site. Transaction history change requires that the propensity scores be re-computed and recommendations for next visit be generated.

(b) Batch-mode Triggers require that the recommendation scores are updated based on pre-planned campaigns. Example of such a trigger is a weekly Campaign where E-mails or direct mail containing customer centric offers are sent out. A batch process may be used to generate and optimize the campaigns based on recent customer history.

(3) Recommendation Scope: Defining History Propensity scores depend on the customer history. There are a number of ways in which a customer history might be defined. Appropriate definition of customer history must be used in different business situations. Examples of some of the ways in which customer history may be defined are given below:

Current purchase—For anonymous customers, the customer history is not available. In such cases, all we have is their current purchase and recommendations are based on these products only.

Recent purchases—Even when the customer history is known, for certain retailers, such as home improvement, the purchase behavior might be highly time-localized i.e. future purchases might just depend on recent purchases where recent may be say last three months.

Entire history as a market basket—In some retail domains such as grocery, the time component might not be as important and only what the customers bought in the past is important. In such domains, an entire customer history weighted by recent products may be used while ignoring the time component.

Entire history as a sequence of market baskets—In some retail domains such as electronics, the time interval between successive purchases of specific products, e.g. cartridge after printer, might be important. In such domains, the customer history may be treated as a time-stamped sequence of market baskets to create precise and timely future recommendations.

Products browsed—So far we have considered only products purchased as part of customer history. There are two other ways in which a customer interacts with products. The customer may just browse the product to consider for purchasing such as in clothing, the customer might try-it-on or read the table of contents before buying a book or sampling the music before buying a CD or read the reviews before buying a high end product. The fact that the customer took time at least to browse these products shows that he has some interest in them and, therefore, even if he does not purchase them, they can still be used as part of the customer history along with the products he did purchase.

In the recommendation engines presented below, the goal is cross-sell of products that the customer did not purchase in the past. That is why the past purchased products are deliberately removed from the recommendation list. It is trivial to add them in, as discussed in one of the post-processing engines, later.

Figure 17:
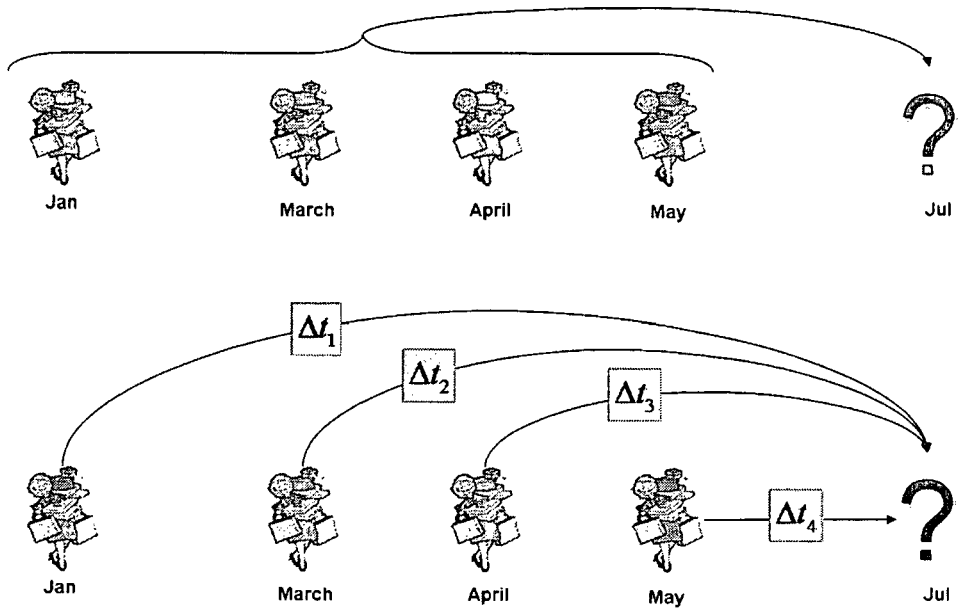
FIG. 17 shows two types of recommendation engine modes depending on how customer history is interpreted: The Market Basket Recommendation Engine (top) and the Purchase Sequence Recommendation Engine (bottom)

At the heart of the recommendation scoring is the problem of creating a propensity or likelihood score for what a customer might buy in the near or far away future based on his customer history. In the following discussion, we present two types of recommendation engines based on (a) the nature of the context used, (b) interpretation of customer history, and (c) temporal-scope of the resulting recommendations: The (1) Market Basket Recommendation Engine (MBRE) and (2) Purchase Sequence Recommendation Engine (PSRE). FIG. 17 shows the difference between the two in terms of how they interpret customer history. The MBRE treats customer history as a market basket comprising of products purchased in recent past. All traditional recommendation engines also use the same view. However, the way PeaCoCk creates the recommendations is different from the other methods. The PSRE treats customer history as what it is i.e. a time-stamped sequence of market baskets.

Market Basket Recommendation Engine

When either the customer's historical purchases are unknown and only current purchases can be used for making recommendations, or when the customer history is to be interpreted as a market basket and when recommendations for the near future have to be generated, then PeaCoCk's Market Basket Recommendation Engine may be used. In MBRE customer history is interpreted as a market basket, i.e. current visit, union of recent visits, history weighted all visit. Any future target product for which the recommendation score has to be generated is considered a part of the input market basket that is not in it yet.

Note that the propensity score for MBRE $p(u,t|x,\Phi)=\rho(u|x,\Phi)$ recommends products that the customer would buy in the near future and, hence, the time dimensions is not used here.

Creating the MBRE Recommendation Model

The market basket recommendation is based on coarse market basket context. A window parameter c denotes the time window of each market basket. Earlier we have described how market basket consistency matrix is created from the transaction data, given the window parameter and product level. This counts matrix is then converted into a consistency matrix using any of the consistency measures available in the PeaCoCk library. This matrix serves as the recommendation model for an MBRE. In general this model depends on the (a) choice of the window parameter, (b) choice of the consistency measure, and (c) any customizations, e.g. customer segment, seasonality, applied to the transaction data.

Generating the MBRE Recommendation Score

Given the input market basket customer history, x, the recommendation model in the form of the market basket based co-occurrence matrix, $\Phi$, the propensity score $\rho(u|x,\Phi)$ for target product u may be computed in several ways, for example:

(1) Gibb's Aggregated Consistency Score: The simplest class of scoring functions simply aggregates the consistencies between the products in the market basket with the target product. PeaCoCk uses a general class of aggregation function known as the Gibb's aggregation based on Gibb's distribution that weigh the different products in the market basket according to their consistency strength with the target product.

$$\rho_\lambda(u|x,\Phi) = \delta(u \notin x)\frac{\sum_{x \in x}\phi(x,u) \times \exp[\lambda \times \phi(x,u)]}{\sum_{x \in x}\exp[\lambda \times \phi(x,u)]}$$

$$\rho_0(u|x,\Phi) = \frac{\delta(u \notin x)}{|x|}\sum_{x \in x}\phi(x,u)$$

$$\rho_\infty(u|x,\Phi) = \delta(u \notin x)\max_{x \in x}\{\phi(x,u)\}$$

The parameter $\lambda \in [0,\infty]$ controls the degree to which the higher consistency products are favored. While these scores are fast and easy to compute they assume independence among the products in the market basket.

(2) Single Bundle Normalized Score: Transaction data is a mixture of projections of multiple intentions. In this score, we assume that a market basket represents a single intention and treat it as an incomplete intention whereby adding the target product would make it more complete. Thus, a propensity score may be defined as the degree by which the bundleness increases when the product is added.

$$\rho_\lambda(u|x,\Phi) = \delta(u \notin x)\frac{\pi_\lambda(u \oplus x|\Phi)}{\delta(\pi_\lambda(x|\Phi)=0)+\pi_\lambda(x|\Phi)}$$

(3) Mixture-of-Bundles Normalized Score: Although the single bundle normalized score accounts for dependence among products, it still assumes that the market basket is a single intention. In general, a market basket is a mixture of bundles or intentions. The mixture-of-bundles normalized score goes beyond the single bundle assumption. It first finds all the individual bundles in the market basket and then uses the bundle that maximizes the single bundle normalized score. It also compares these bundles against single products as well as the entire market basket, i.e. the two extremes.

$$p_\lambda(u \mid x, \Phi) = \delta(u \notin x) \max_{b \in B(x|\Phi)} \left\{ \frac{\pi_\lambda(u \oplus b \mid \Phi)}{\delta(\pi_\lambda(b \mid \Phi) = 0) + \pi_\lambda(b \mid \Phi)} \right\}$$

$$B(x \mid \Phi) = \{x\} \cup \text{Bundles}(x \mid \Phi) \cup S(x)$$

$$S(x) = \{\{x\} \mid \forall\, x \in x\} \;//\; \text{set of all single element subsets of } x$$

Purchase Sequence Recommendation Engine

In the market basket based recommendation engine, the timing of the product is not taken into account. Both the input customer history and the target products are interpreted as market baskets. For retailers where timing of purchase is important, the PeaCoCk framework provides the ability to use not just what was bought in the past but also when it was bought and use that to recommend not just what will be bought in the future by the customer but also when it is to be bought. As shown in FIG. 17, the purchase sequence context uses the time-lag between any past purchase and the time of recommendation to create both timely and precise recommendations.

Creating the PSRE Recommendation Model

The PSRE recommendation model is essentially the Fluid Context matrix described earlier. It depends on (a) the time resolution (weeks, months, quarters, . . . ), (b) type of kernel and kernel parameter used for temporal smoothing of the fluid context counts, (c) consistency matrix used, and of course (d) customization or transaction data slice used to compute the fluid co-occurrence counts.

Generating the PSRE Recommendation Score

Given the input purchase sequence customer history:

$$\tilde{x} = (\langle x_1, t_1 \rangle, \ldots, \langle x_L, t_L \rangle) = \langle x, \Delta t \rangle$$

$$x = \{x_1, \ldots, x_L\}; \; \Delta t = \{\Delta t_{ij} = t_j - t_i\}_{1 \leq i < j \leq L}$$

and the fluid context matrix (recommendation model) matrix, $\Phi$, the propensity score $p(u,t|\bar{x},\Phi)$ for target product u at time t may be computed in several ways, similar to the MBRE:

(1) Gibb's Aggregated Consistency Score: The simplest class of scoring functions used in MBRE is also applicable in the PSRE.

$$p_\lambda(u, t \mid \tilde{x}, \Phi) = \delta(u \notin x) \frac{\sum_{\ell=1}^{L} \phi(x_\ell, u \mid \Delta(t, t_\ell)) \times \exp[\lambda \times \phi(x_\ell, u \mid \Delta(t, t_\ell))]}{\sum_{l=1}^{L} \exp[\lambda \times \phi(x_l, u \mid \Delta(t, t_l))]}$$

$$p_0(u, t \mid \tilde{x}, \Phi) = \frac{\delta(u \notin x)}{L} \sum_{l=1}^{L} \phi(x_l, u \mid \Delta(t, t_l))$$

$$p_\infty(u, t \mid \tilde{x}, \Phi) = \delta(u \notin x) \max_{l=1\ldots L} \{\phi(x_l, u \mid \Delta(t, t_l))\}$$

Note how the time-lag between a historical purchase at time t, and the recommendation time: t, given by $\Delta(t,t_l)=t_l-t$, is used to pick the time-lag dimensions in the fluid context matrix. This is one of the most important applications of the fluid context's time-lag dimension. Although, it is fast to compute and easy to interpret, the Gibb's aggregate consistency score assumes that all past products and their times are independent of each other, which is not necessarily true.

(2) Single-Phrase Normalized Score: Transaction data is a mixture of projections of multiple intentions spanning across time. In this score, we assume that a purchase history represents a single intention and treat it as an incomplete intention whereby adding the target product at the decision time t would make it more complete. Thus, a propensity score may be defined as the degree by which the phraseness increases when the product is added at the decision time.

$$p_\lambda(u, t \mid \tilde{x}, \Phi) = \delta(u \notin x) \frac{\pi_\lambda(\tilde{x} \oplus \langle u, t \rangle \mid \Phi)}{\delta(\pi_\lambda(\tilde{x} \mid \Phi) = 0) + \pi_\lambda(\tilde{x} \mid \Phi)}$$

(3) Mixture-of-Phrases Normalized Score: Although the single bundle normalized score accounts for dependence among products, it still assumes that the entire purchase history is a single intention. In general a purchase sequence is a mixture of phrases or intentions across time. The mixture-of-phrases normalized score goes beyond the single phrase assumption. It first finds all the individual phrases in the purchase sequence and then uses the phrase that maximizes the single phrase normalized score. It also compares the score against all the single element phrases as well as the entire phrase, i.e. the two extreme cases.

$$p_\lambda(u, t \mid \tilde{x}, \Phi) = \delta(u \notin x) \max_{p \in P(\tilde{x}|\Phi)} \left\{ \frac{\pi_\lambda(p \oplus u \mid \Phi)}{\delta(\pi_\lambda(p \mid \Phi) = 0) + \pi_\lambda(p \mid \Phi)} \right\}$$

$$P(\tilde{x} \mid \Phi) = \{\tilde{x}\} \cup \text{Phrases}(\tilde{x} \mid \Phi) \cup S(\tilde{x})$$

$$S(\tilde{x}) = \{\{\langle x_l, t_l \rangle\}_{l=1}^L\} \text{ // set of all single element subsets of } \tilde{x}$$

Post-Processing Recommendation Scores

The recommendation propensity scores obtained by the recommendation engines as described above depend only on the transaction history of the customer. They do not incorporate retailer's business objective yet. In the following discussion we present various possible business objectives and ways to post-process or adjust the propensity scores obtained from the recommendation engines to reflect those business objectives. The post-processing combines the recommendation scores with adjustment coefficients. Based on how these adjustment coefficients are derived, there are two broad types of score adjustments:

(1) First order, transaction data driven score adjustments in which the adjustment coefficients are computed directly from the transaction data. Examples are seasonality, value, and loyalty adjustments.

(2) Second order Consistency matrix driven score adjustments in which the adjustment coefficients are computed from the consistency matrices. Examples are density, diversity, and future customer value adjustments.

Some of the important score adjustments are described below:

(a) First Order: Seasonality Adjustment

In any retailer's product space, some products are more seasonal than others and retailer's might be interested in adjusting the recommendation scores such that products that have a higher likelihood of being purchased in a particular season are pushed up in the recommendation list in a systematic way. This is done in PeaCoCk by first computing a Seasonality Score for each product, for each season. This score is high if the product is sold in a particular season more than expected. There are a number of ways to create the seasonality scores. One of the simple methods is as follows:

Lets say seasons are defined by a set of time zones for example each week could be a time zone, each month, each quarter, or each season (summer, back-to-school, holidays, etc.). We can then compute a seasonal value of a product in each season as well as its expected value across all seasons. Deviation from the expected value quantify the degree of seasonality adjustment. More formally:

Let $S = \{s_1, \ldots, s_K\}$ be K seasons. Each season could simply be a start-day and end-day pair.

Let $\{V(u|s_k)\}_{k=1}^K$ denote value, e.g. revenue, margin, etc., of a product u across all seasons.

Let $\{N(s_k)\}_{k=1}^K$ be the normalizer, e.g. number of customers/transactions for each season.

$$\text{Let } V(u) = \sum_{k=1}^K V(u \mid s_k)$$

be the total value of the product u across all seasons.

$$\text{Let } N = \sum_{k=1}^K N(s_k)$$

be the total normalizer across all seasons.

Then the deviation from the expected value of a product in a season is given by:

$$\Delta_{\text{diff}} V(u \mid s_k) = f\left(\frac{V(u \mid s_k)}{N(s_k)} - \frac{V(u)}{N}\right) : \text{Difference (Additive) Deviation}$$

$$\Delta_{\text{ratio}} V(u \mid s_k) = f\left(\log\left[\frac{V(u \mid s_k) \times N}{V(u) \times N(s_k)}\right]\right) : \text{Ratio (Multiplicative) Deviation}$$

The function f applies some kind of bounding on the deviations around the zero mark. For example, a lower/higher cut-off or a smooth sigmoid, etc.

A product is deemed seasonal if some aggregate of magnitudes of these deviations is large, for example:

$$\sigma_\lambda(u) = \frac{\sum_{k=1}^K |\Delta V(u \mid s_k)| \times \exp(\lambda \times |\Delta V(u \mid s_k)|)}{\sum_{k=1}^K \exp(\lambda \times |\Delta V(u \mid s_k)|)}$$

Now we have two parameters to create seasonality adjustments: The seasonal deviation of a product from the expected:

$\Delta V(u|s_k)$ and the seasonality coefficient at $\sigma_\lambda(u)$ that indicates whether or not the product is seasonal. Because the unit of the recommendation score does not match the unit of the seasonality adjustment, we may use adjustments in the relative scores or ranks as follows:

Let $\rho_\lambda(u,t|\bar{x}, \Phi) = \rho(u,t)$ be the recommendation score for product u at time t.

Let $x_\rho(u,t)$ be the recommended relative score or rank of product u compared to all other products in the candidate set C for which recommendation is generated. For example:

$$x_\rho^{max}(u, t) = \frac{\rho(u, t)}{\max_{v \in C \backslash x}\{\rho(v, t)\}};$$

$$x_\rho^{z-score}(u, t) = \frac{\rho(u, t) - \mu(\{\rho(v, t) : \forall v \in C\})}{\sigma(\{\rho(v, t) : \forall v \in C\})}$$

$$x_\rho^{rank}(u, t) = \frac{1}{|C|}\sum_{v \in C} \delta(\rho(u, t) \geq \rho(v, t))$$

Let s(t) be the season for time t.

Let $x_{s-V}(u,s(t))$ be the seasonal relative score or rank of product u with respect to its value v compared to all other products. For example:

$$x_{s-V}^{max}(u, s(t)) = \frac{\Delta V(u, s(t))}{\max_{v \in C \backslash x}\{\rho(v, s(t))\}};$$

$$x_{s-V}^{z-score}(u, s(t)) = \frac{\Delta V(u, s(t)) - \mu(\{\Delta V(v, s(t)); \forall v \in C\})}{\sigma(\{\Delta V(v, s(t)) : \forall v \in C\})}$$

$$x_{s-V}^{rank}(u, s(t)) = \frac{1}{|C|}\sum_{v \in C} \delta(\Delta V(u, s(t)) \geq \Delta V(v, s(t)))$$

Then these scores $x_\rho(u,t)$ and $x_{s-V}(u,s(t))$ may be combined in several ways. For example:

$$x_{combined}(u, t | \gamma) = (1 - \alpha(\gamma_s, \sigma(u))) \times x_\rho(u, t) + \alpha(\gamma_s, \sigma(u)) \times x_{s-V}(u, s(t))$$

Here $\alpha(\gamma_s, \sigma(u)) \in [0,1]$ is the combination coefficient that depends on a user defined parameter $\gamma_s \in [0,1]$ that indicates the degree to which seasonality adjustment has to be applied and the seasonality coefficient $\sigma(u)$ of the product u.

(b) First Order: Value Adjustment

A retailer might be interested in pushing in high-value products to the customer. This up-sell business objective might be combined with the recommendation scores by creating a value-score for each product and the value property. i.e. revenue, margin, margin percent, etc. These value-scores are then normalized, e.g. max, z-score, rank, and combined with the recommendation score to increase or decrease the overall score of a high/low value product.

(c) First Order: Loyalty Adjustment

The recommendation scores are created only for the products that the customer did not purchase in the input customer history. This makes sense when the goal of recommendation is only cross-sell and expand customer's wallet share to products that he has not bought in the past. One of the business objectives, however, could be to increase customer loyalty and repeat visits. This is done safely by recommending the customer those products that he bought in the recent past and encourage more purchases of the same. For retailers where there are a lot of repeat purchases, for example grocery retailers, this is particularly useful.

The simplest way to do this is to create a value-distribution of each product that the customer purchased in the past. Compare this to the value-distribution of the average customer or the average value distribution of that product. If a customer showed higher value than average on a particular product then increase the loyalty-score for that product for that customer. More formally, let:

Consider all custonier's history: $X = \{\tilde{x}^{(n)}\} : \tilde{x}^{(n)} = \{\langle x_1^{(n)}, t_1^{(n)} \rangle, \ldots, \langle x_{L_n}^{(n)}, t_{L_n}^{(n)} \rangle\}$ Compute the weight of each product e.g. history decaying weighting:

$$w_\ell^{(n)}(t, \lambda) = \frac{\exp[\lambda \times (t - t_\ell^{(n)})]}{\sum_{k=1}^{L_n} \exp[\lambda \times (t - t_k^{(n)})]}$$

Compute the average weighted value of each product u and the product value V(u):

$$V(u \mid X, \lambda) = \frac{\sum_{n=1}^{N} \sum_{\ell=1}^{L_n} \delta(u = x_\ell^{(n)}) w_\ell^{(n)}(t, \lambda) V(x_\ell^{(n)})}{\sum_{n=1}^{N} \sum_{\ell=1}^{L_n} \delta(u = x_\ell^{(n)}) w_\ell^{(n)}(t, \lambda)}$$

For any specific customer with purchase history: $\tilde{x} = \{\langle x_1, t_1 \rangle, \ldots, \langle x_L, t_L \rangle\}$, product value is given by:

$$V(u \mid \tilde{x}, \lambda) = \frac{\sum_{\ell=1}^{L} \delta(u = x_\ell) w_\ell(t, \lambda) V(x_\ell)}{\sum_{\ell=1}^{L} \delta(u = x_\ell) w_\ell(t, \lambda)}$$

Compute the deviation of a product value from the expected:

$$\Delta V_{diff}(u \mid \tilde{x}, \lambda) = f\left(\frac{V(u \mid \tilde{x}, \lambda) - V(u \mid X, \lambda)}{V(u \mid X, \lambda)}\right)$$

These deviations are used as loyalty coefficients. If a retailer is making R recommendations, then he may decide to use all of them based on history weighting or any fraction of them based on loyalty coefficients and the rest based on recommendation scores.

(d) Second order: Density Adjustment

Figure 18:
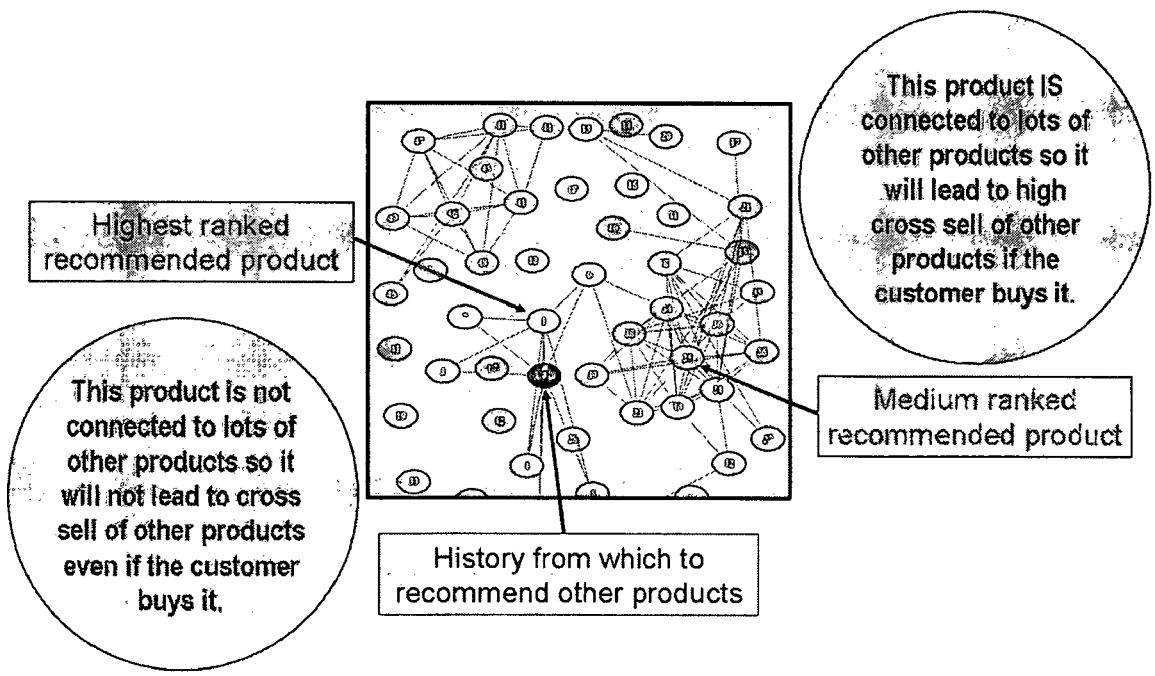
FIG. 18 shows the motivation for using density score for post-processing the recommendation score if the business goal is to increase the market basket size.

FIG. 18 shows a recommendation example, where product 0 represents customer history and products 1, 2, 3, etc. represent the top products recommended by a recommendation engine. If the retailer recommends the first product, it does not connect to a number of other products; but if he recommends the medium ranked $25^{th}$ product, then there is a good chance that a number of other products in its rather dense neighborhood might also be purchased by the customer. Thus, if the business objective is to increase the market basket size of a customer then the recommendation scores may be adjusted by product density scores.

Earlier we introduced a consistency based density score for a product that uses the consistencies with its neighboring products to quantify how well this product goes with other products. Recommendation score is therefore adjusted to push high density products for increased market basket sizes.

(e) Second order: Diversity Adjustment

If the business objective is to increase the diversity of a customer's market basket along different categories or departments, then the diversity score may be used in the post-processing. Earlier, we described how to compute the diversity score of a product. There are other variants of the diversity score where it is specific to a particular department i.e. if the retailer wants to increase the sale in a particular department then products that have high consistency with that department get a higher diversity score. Appropriate variants of these diversity scores may be used to adjust the recommendation scores.

(f) Second order: Life-time Value Adjustment

There are some products that lead to the sale of other products either in the current or future visits. If the goal of the retailer is to increase the customer lifetime value, then such products should be promoted to the customer. Similar to the density measure, computed from market basket context, a life-time value for each product is computed from the purchase sequence context. These scores may be used to push such products that increase the life-time value of customers.

Combining multiple Customizations in PeaCoCk

Above, we discussed the use of a single consistency matrix in either creating insights such as bridges, bundles, and phrases or generating decisions, such as using recommendation engine. PeaCoCk also allows combining multiple consistency matrices as long as they are at the same product level and are created with the same context parameters. This is an important feature that may be used for either:

(1) Dealing with Sparsity: It may happen that a particular customer segment may not have enough customers and the counts matrix does not have statistically significant counts to compute consistencies. In such cases a bake-off model may be used where counts from the overall co-occurrence counts matrix based on all the customers are combined linearly with the counts of this segment's co-occurrence matrix resulting in statistically significant counts.

(2) Creating Interpolated Solutions: A retailer might be interested in comparing a particular segment against the overall population to find out what is unique in this segment's co-occurrence behavior. Additionally, a retailer might be interested in interpolating between a segment and the overall population to create more insights and improve the accuracy of the recommendation engine if it is possible.

The segment level and the overall population level analysis from PeaCoCk may be combined at several stages each of which has their own advantages and disadvantages.

(1) Counts Combination: Here the raw co-occurrence counts from all customers (averaged per customer) can be linearly combined with the raw co-occurrence counts from a customer segment. This combination helps in sparsity problems in this early stage of PeaCoCk graph generation.

(2) Consistency Combination: Instead of combining the counts, we can combine the consistency measures of the co-occurrence consistency matrices. This is useful in both trying alternative interpolations of the insight generation, as well as the recommendation engines.

(3) Recommendation Scores: For recommendation engine application, the recommendation score may be computed for a customer based on the overall recommendation model as well as the recommendation model based on this customer's segment based recommendation model. These two scores may be combined in various ways to come up with potentially more accurate propensity scores.

Thus PeaCoCk provides a lot of flexibility in dealing with multiple product spaces both in comparing them and combining them.

Dealing with Data Sparsity in PeaCoCk

PeaCoCk is data hungry, i.e. the more transaction data it gets, the better. A general rule of thumb in PeaCoCk is that as the number of products in the product space grows, the number of context instances should grow quadratically for the same degree of statistical significance. The number of context instances for a given context type and context parameters depends on: (a) number of customers, (b) number of transactions per customer, and (c) number of products per transactions. There might be situations where there is not enough such as: (a) Number of customers in a segment is small, (2) Retailer is relatively new has only recently started collecting transaction data, (3) A product is relatively new and not enough transaction data associated with the product, i.e. product margin, is available, (4) analysis is done at a fine product resolution with too many products relative to the transaction data or number of context instances, or (5) sparse customer purchases in the retailer, e.g. furniture, high-end electronics, etc. have very few transactions per customer. There are three ways of dealing with such spartisy in the PeaCoCk framework.

(1) Product Level Backoff Count Smoothing—If the number of products is large or the transaction data is not enough for a product for one or more of the reasons listed above then PeaCoCk uses the hierarchy structure of the product space to smooth out the co-occurrence counts. For any two products at a certain product resolution, if either the margin or co-occurrence counts are low, then counts from the coarser product level are used to smooth the counts at this level. The smoothing can use not just the parent level but also grand-parent level if there is a need. As the statistical significance at the desired product level increases due to, say, additional transaction data becoming available over a period of time, the contribution of the coarser levels decreases systematically.

(2) Customization Level Backoff Smoothing—If the overall customers are large enough but an important customer segment, i.e. say high value customers or a particular customer segment or a particular store or region, does not have enough customers then the co-occurrence counts or consistencies based on all the customers may be used to smooth the counts or consistencies of this segment. If there is a multi-level customer hierarchy with segments and sub-segments and so on then this approach is generalized to use the parent segment of a sub-segment to smooth the segment counts.

(3) Context Coarseness Smoothing—If the domain is such that the number of transactions per customer or number of products per transaction is low, then the context can be chosen at the right level of coarseness. For example, if for a retail domain a typical customer makes only two visits to the store per year then the window parameter for the market basket window may be as coarse as a year or two years and the time-resolution for the purchase sequence context may be as coarse as a quarter or six months. The right amount of context coarseness can result in statistical significance of the counts and consistencies.

Any combination of these techniques may be used in the PeaCoCk framework depending on the nature, quantity, and quality (noise-to-signal ratio) of the transaction data.

Technical Implementation

Exemplary Digital Data Processing Apparatus

Data processing entities such as a computer may be implemented in various forms.? One example is a digital data processing apparatus, as exemplified by the hardware components and interconnections of a digital data processing apparatus. As is known in the art, such apparatus includes a processor, such as a microprocessor, personal computer, workstation, controller, microcontroller, state machine, or other processing machine, coupled to a storage.? In the present example, the storage includes a fast-access storage, as well as nonvolatile storage.? The fast-access storage may comprise random access memory (?RAM?), and may be used to store the programming instructions executed by the processor.? The nonvolatile storage may comprise, for example, battery backup RAM, EEPROM, flash PROM, one or more magnetic data storage disks such as a hard drive, a tape drive, or any other suitable storage device.? The apparatus also includes an input/output, such as a line, bus, cable, electromagnetic link, or other means for the processor to exchange data with other hardware external to the apparatus.

Despite the specific foregoing description, ordinarily skilled artisans (having the benefit of this disclosure) will recognize that the invention discussed above may be implemented in a machine of different construction, without departing from the scope of the invention.? As a specific example, one of the components may be eliminated; furthermore, the storage may be provided on-board the processor, or even provided externally to the apparatus.

Logic Circuitry

In contrast to the digital data processing apparatus discussed above, a different embodiment of this disclosure uses logic circuitry instead of computer-executed instructions to implement processing entities of the system. Depending upon the particular requirements of the application in the areas of speed, expense, tooling costs, and the like, this logic may be implemented by constructing an application-specific integrated circuit (ASIC) having thousands of tiny integrated transistors.? Such an ASIC may be implemented with CMOS, TTL, VLSI, or another suitable construction.? Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

Signal-Bearing Media

Wherever the functionality of any operational components of the disclosure is implemented using one or more machine-executed program sequences, these sequences may be embodied in various forms of signal-bearing media.? Such a signal-bearing media may comprise, for example, the storage or another signal- bearing media, such as a magnetic data storage diskette, directly or indirectly accessible by a processor.? Whether contained in the storage, diskette, or elsewhere, the instructions may be stored on a variety of machine-readable data storage media.? Some examples include direct access storage, e.g. a conventional hard drive, redundant array of inexpensive disks (?RAID?), or another direct access storage device (?DASD?), serial-access storage such as magnetic or optical tape, electronic non-volatile memory, e.g. ROM, EPROM, flash PROM, or EEPROM, battery backup RAM, optical storage e.g. CD-ROM, WORM, DVD, digital optical tape, or other suitable signal-bearing media including analog or digital transmission media and analog and communication links and wireless communications.? In one embodiment, the machine-readable instructions may comprise software object code, compiled from a language such as assembly language, C, etc.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A method for semi-supervised insight discovery, the method being implemented by one or more data processors and comprising:
   seeking, by at least one data processor, pair-wise relationships between large numbers of entities, in a variety of domain specific contexts, from appropriately filtered and customized transaction data;
   representing, by at least one data processor, the pair-wise relationships between the entities in a graph structure containing a set of nodes representing entities, and a set of edges representing strength of relationships between pairs of nodes;
   discovering, by at least one data processor, insights in the form of relationship patterns of interest that may be projected or scored on individual or groups of transactions or customers; and
   using, by at least one data processor, said insights to make data-driven-decisions for a variety of business goals;
   said graph structure comprising any of the following types of structures:
      a sub-graph comprising a subset of a graph, created by picking a subset of nodes and edges from an original graph, a sub-graph comprising any of:
         node based sub-graphs which are created by selecting a subset of the nodes and by keeping only those edges between selected nodes; and
         edge based sub-graphs which are created by pruning a set of edges from the graph and removing all nodes that are rendered disconnected from the graph;
      a neighborhood of a target product comprising a sub-graph that contains the target product and all the products that are connected to the target product with consistency strength above a predefined threshold to show the top most affiliated products for a given target product;
      a bundle structure comprising a sub-set of products wherein each product in the bundle has a high consistency connection with all the other products in the bundle, wherein each product in a bundle is assigned a product density with respect to the bundle which is high if the product has high consistency connection with other products in the bundle and low otherwise; and
      a bridge structure comprising a collection of two or more, otherwise disconnected, product groups that are bridged by one or more bridge product(s).

2. The method of claim 1, said transactions comprising transactions in a retail domain among customers buying products at retailers in successive visits, each visit resulting in a transaction of a set of one or more products; wherein retail transaction data comprise a time stamped sequence of market baskets.

3. The method of claim 2, said transaction data comprising a mixture of interspersed customer purchases, said purchases comprising both of intentional purchases, which comprise a logical or signal part of said transaction data because there is a predictable pattern in intentional purchases of a customer, and emotion driven impulsive purchases, which add noise to the intentional purchase patterns of customers.

4. The method of claim 3, further comprising:
   identifying, by at least one data processor, purchase patterns embedded in said transaction data that are associated with intentional behavior.

5. The method of claim 4, further comprising:
   finding, by at least one data processor, patterns that associate a right kind of impulsive buying purchases with specific intentional purchases.

6. The method of claim 2, wherein said products comprise goods and services sold by a retailer, wherein the set of all products and their associated attributes, including hierarchies, descriptions, and properties, comprise a product space.

7. The method of claim 2, wherein a set of all customers, their organization in various segments, and all additional information known about customers comprises a customer space.

8. The method of claim 2, wherein said retail domain comprises any of the following relationships: first order, explicit purchase-relationships between customers and products; second order, implicit consistency-relationships between two products; and second order, implicit similarity-relationships between two customers.

9. The method of claim 1, further comprising:
   inferring, by at least one data processor, implicit product-product consistency relationships and customer-customer similarity relationships by viewing products in terms of customers and by viewing customers in terms of products.

10. The method of claim 1, further comprising:
    using, by at least one data processor, a weighted edge between each pair of nodes to represent the consistency with which products in particular categories are purchased together, wherein edges with weights below a predetermined threshold are ignored.

11. The method of claim 10, further comprising:
    projecting, by at least one data processor, said graph on a two-dimensional plane for visualization purposes, wherein nodes that have higher consistency strength between them are closer to each other than nodes that have lower consistency strength between them.

12. The method of claim 1, wherein said graph comprises an internal representation of pair-wise relationships between entities.

13. The method of claim 1, wherein the graph comprises any of the following parameters:
    customization parameters which define the scope of a graph by identifying a transaction data slice used to build said graph;
    context parameters which define the nature of relationships between products and customers in said graphs; and
    consistency parameters which define the strength of relationships between products in product graphs.

14. The method of claim 1, further comprising: mining, by at least one data processor, said graphs to find insights or actionable patterns in a graph structure; and creating, by at least one data processor, marketing decisions from said insights or actionable patterns.

15. The method of claim 1, said bundle structure further comprising any of: a product phrase which comprises a sequence of products purchased consistently across time; and a product bundle which comprises a product phrase in which a time-lag between successive products is zero; wherein consistent product phrases forecast customer purchases based on their past purchases to recommend a right product at a right time.

16. The method of claim 1, further comprising:
defining, by at least one data processor, a template pattern for a structure; and searching, by at least one data processor, for template patterns in said graphs by seeking logical structures in said graphs.

17. The method of claim 1, further comprising:
projecting, by at least one data processor, logical bundles to their atomic pair-wise levels;
strengthening, by at least one data processor, only the relationships between pairs within an actual market basket;
discarding, by at least one data processor, transaction data; and
finding, by at least one data processor, structures in graphs directly.

18. A retail mining method for extracting actionable insights and data-driven decisions from transaction data, the method being implemented by one or more data processors and comprising:
data pre-processing by at least one data processor, wherein raw transaction data are filtered and customized; said filtering cleaning said data by removing data elements that are to be excluded from analysis; said customization creating different slices of said filtered transaction data that may be analyzed separately and whose results may be compared for further insight generation;
graph generation, by at least one data processor, to create graphs that capture all pair-wise relationships between entities in a variety of contexts, said graph generation step comprising:
context-instance creation wherein a number of context instances are created from said transaction data slice;
co-occurrence counting wherein, for each pair of products, a co-occurrence count is computed as the number of context instances in which two products co-occurred; and
co-occurrence consistency, wherein, once all co-occurrence counting is done, information theoretic consistency measures are computed for each pair of products, resulting in a graph; and
insight discovery and decisioning, by at least one data processor, from said graphs, wherein said graphs serve as a model or internal representation of knowledge extracted from transaction data, said insight discovery and decisioning step further comprising any of: product related insight discovery, wherein graph theory and machine learning algorithms are applied to said graphs to discover patterns of interest, including product bundles, bridge products, product phrases, and product neighborhoods; wherein said patterns may be used to make decisions; and customer related decisioning, wherein a graph is used as a model to decisions;
said graphs comprising any of the following types of structures:
a sub-graph comprising a subset of a graph, created by picking a subset of nodes and edges from an original graph, a sub-graph comprising any of:
node based sub-graphs which are created by selecting a subset of the nodes and by keeping only those edges between selected nodes; and
edge based sub-graphs which are created by pruning a set of edges from the graph and removing all nodes that are rendered disconnected from the graph;
a neighborhood of a target product comprising a sub-graph that contains the target product and all the products that are connected to the target product with consistency strength above a predefined threshold to show the top most affiliated products for a given target product;
a bundle structure comprising a sub-set of products wherein each product in the bundle has a high consistency connection with all the other products in the bundle, wherein each product in a bundle is assigned a product density with respect to the bundle which is high if the product has high consistency connection with other products in the bundle and low otherwise; and
a bridge structure comprising a collection of two or more, otherwise disconnected, product groups that are bridged by one or more bridge product(s).

19. The method of claim 18, wherein said transaction data comprise a time-stamped sequence of market baskets and reflect a mixture of both intentional and impulsive customer behavior.

20. The method of claim 19, wherein a transaction data record comprises one line-item for each product purchased by each customer in each visit; wherein each line-item comprises any of the following fields: customer ID, transaction date, and SKU level product ID, and any of the following associated values: revenue, margin, quantity, and discount information.

21. The method of claim 18 wherein said transaction data comprise any of the following retail data objects: product objects comprising atomic-level object in a product space; line item objects comprising each line (atomic level object) in said transaction data; transaction objects comprising a collection of all line items associated with a single visit by a customer; and customer objects comprising a collection of all transactions associated with a customer; wherein each of said objects is further associated with one or more properties that may be used to filter, customize, or analyze the results of various retail applications.

22. The method of claim 18, wherein said products comprise any of the following product properties: given or direct product properties that are provided in a product dictionary; and computed or indirect product properties that are summary properties which can be computed from transaction data using standard summarizations.

23. The method of claim 18, wherein said transactions comprise any of the following transaction properties: direct or observed properties which are part of the transaction data itself; and indirect or derived properties.

24. The method of claim 18, wherein said customers comprise any of the following customer properties: demographic properties about each customer that may be collected during an application process or a survey or from an external marketing database; segmentation properties comprising segment assignments of each customer using various segmentation schemes; and computed properties comprising customer properties computed from customer transaction history.

25. The method of claim 18, said filtering step further comprising: applying, by at least one data processor, a series of filters based on products, line items, transactions, and customers object types in said transaction data, said filters comprising any of: a product filter that allows a retailer to limit products for an analysis in either of: a product scope list that allows said retailer to create a list of in-scope products, wherein only products that are in said list are used in analyses; and a product stop list that allows said retailer to create a list of out-of-scope products that must not be used in analyses; a line item filter, wherein rules based on line item properties are defined to include or exclude certain line items in analyses; a transaction filter by which entire transactions may be filtered in or out of analyses based on transaction level properties, wherein rules based on transaction properties may be used to include or exclude certain transactions from analysis; and a customer filter, wherein transaction data from a particular customer may be included or excluded from analysis, wherein rules based on customer properties may be defined to include or exclude certain customers from analysis.

26. The method of claim 18, said customization step further comprising either of:
customizing, by at least one data processor, analyses by different customer properties; and
customizing, by at least one data processor, analyses by different transaction properties.

27. The method of claim 18, further comprising:
extracting, by at least one data processor, a context instance from said transaction data;
performing, by at least one data processor, a co-occurrence count to count how many times a product pair co-occurred in a context instance; and
using, by at least one data processor, said co-occurrence count to create pair-wise relationships between products.

28. The method of claim 18, further comprising:
using, by at least one data processor, context to define the nature of relationship between two entities by way of their juxtaposition in said transaction data, wherein types of available contexts depend on the domain and nature of said transaction data.

29. The method of claim 28, further comprising:
for every context, using, by at least one data processor, a process to quantify pair-wise co-occurrence consistencies for all product pairs for each level at which analysis is to be done, said process comprising:
creating context instances from said transaction data;
counting a number of times two products co-occurred in said context instances; and
creating information theoretic measures to quantify consistency between said context instances.

30. The method of claim 18, further comprising:
using, by at least one data processor, context in the retail domain, where said transaction data comprise a time-stamped sequence of market baskets, wherein context comprises either of market basket context and purchase sequence context.

31. The method of claim 30, said market basket context instance comprising a set of products purchased on one or more consecutive visits.

32. The method of claim 18, further comprising:
using, by at least one data processor, consistency to quantify the strength of relationships between pairs of products, wherein consistency comprises the degree to which two products are more likely to be co-purchased in a context than they are likely to be purchased independently.

33. An article comprising a tangible computer-readable storage medium embodying instructions that when performed by one or more computer processors result in operations for semi-supervised insight discovery comprising:
seeking pair-wise relationships between large numbers of entities, in a variety of domain specific contexts, from appropriately filtered and customized transaction data;
representing the pair-wise relationships between the entities in a graph structure containing a set of nodes representing entities, and a set of edges representing strength of relationships between pairs of nodes;
discovering insights in the form of relationship patterns of interest that may be projected or scored on individual or groups of transactions or customers; and
using said insights to make data-driven-decisions for a variety of business goals;
said graph structure comprising any of the following types of structures:
a sub-graph comprising a subset of a graph, created by picking a subset of nodes and edges from an original graph, a sub-graph comprising any of:
node based sub-graphs which are created by selecting a subset of the nodes and by keeping only those edges between selected nodes; and
edge based sub-graphs which are created by pruning a set of edges from the graph and removing all nodes that are rendered disconnected from the graph;
a neighborhood of a target product comprising a sub-graph that contains the target product and all the products that are connected to the target product with consistency strength above a predefined threshold to show the top most affiliated products for a given target product;
a bundle structure comprising a sub-set of products wherein each product in the bundle has a high consistency connection with all the other products in the bundle, wherein each product in a bundle is assigned a product density with respect to the bundle which is high if the product has high consistency connection with other products in the bundle and low otherwise; and
a bridge structure comprising a collection of two or more, otherwise disconnected, product groups that are bridged by one or more bridge product(s).

34. An article comprising a tangible computer-readable storage medium embodying instructions that when performed by one or more computer processors result in operations for extracting actionable insights and data-driven decisions from transaction data comprising:
data pre-processing, wherein raw transaction data are filtered and customized; said filtering cleaning said data by removing data elements that are to be excluded from analysis; said customization creating different slices of said filtered transaction data that may be analyzed separately and whose results may be compared for further insight generation;
graph generation to create graphs that capture all pair-wise relationships between entities in a variety of contexts, said graph generation step comprising:
context-instance creation wherein a number of context instances are created from said transaction data slice;
co-occurrence counting wherein, for each pair of products, a co-occurrence count is computed as the number of context instances in which two products co-occurred; and
co-occurrence consistency, wherein, once all co-occurrence counting is done, information theoretic consistency measures are computed for each pair of products, resulting in a graph; and
insight discovery and decisioning from said graphs, wherein said graphs serve as a model or internal representation of knowledge extracted from transaction data, said insight discovery and decisioning step further comprising any of: product related insight discovery, wherein graph theory and machine learning algorithms are applied to said graphs to discover patterns of interest, including product bundles, bridge products, product phrases, and product neighborhoods; wherein said patterns may be used to make decisions; and customer related decisioning, wherein a graph is used as a model to decisions;

said graphs comprising any of the following types of structures:

a sub-graph comprising a subset of a graph, created by picking a subset of nodes and edges from an original graph, a sub-graph comprising any of:

node based sub-graphs which are created by selecting a subset of the nodes and by keeping only those edges between selected nodes; and edge based sub-graphs which are created by pruning a set of edges from the graph and removing all nodes that are rendered disconnected from the graph;

a neighborhood of a target product comprising a sub-graph that contains the target product and all the products that are connected to the target product with consistency strength above a predefined threshold to show the top most affiliated products for a given target product;

a bundle structure comprising a sub-set of products wherein each product in the bundle has a high consistency connection with all the other products in the bundle, wherein each product in a bundle is assigned a product density with respect to the bundle which is high if the product has high consistency connection with other products in the bundle and low otherwise; and a bridge structure comprising a collection of two or more, otherwise disconnected, product groups that are bridged by one or more bridge product(s).

* * * * *